US011771532B2

(12) United States Patent
Morris

(10) Patent No.: US 11,771,532 B2
(45) Date of Patent: Oct. 3, 2023

(54) DIRECT DENTAL BRIDGE

(71) Applicant: Christopher Morris, Brampton (CA)

(72) Inventor: Christopher Morris, Brampton (CA)

( * ) Notice: Subject to any disclaimer, the term of this patent is extended or adjusted under 35 U.S.C. 154(b) by 475 days.

(21) Appl. No.: 16/062,956

(22) PCT Filed: Dec. 16, 2016

(86) PCT No.: PCT/CA2016/051506
§ 371 (c)(1),
(2) Date: Jun. 15, 2018

(87) PCT Pub. No.: WO2017/100948
PCT Pub. Date: Jun. 22, 2017

(65) Prior Publication Data
US 2018/0368955 A1 Dec. 27, 2018

Related U.S. Application Data

(60) Provisional application No. 62/360,083, filed on Jul. 8, 2016, provisional application No. 62/392,777, filed
(Continued)

(51) Int. Cl.
A61C 13/00 (2006.01)
A61C 9/00 (2006.01)
(Continued)

(52) U.S. Cl.
CPC ............ A61C 13/0003 (2013.01); A61C 5/80 (2017.02); A61C 9/00 (2013.01); A61C 13/275 (2013.01);
(Continued)

(58) Field of Classification Search
CPC ......... A61C 13/0003; A61C 5/80; A61C 9/00; A61C 13/275
See application file for complete search history.

(56) References Cited

U.S. PATENT DOCUMENTS 2,213,963 A 9/1940 Myerson
2,213,964 A 9/1940 Myerson
(Continued)

FOREIGN PATENT DOCUMENTS

CN 102475581 A 5/2012
GB 191418247 A 7/1915
(Continued)

OTHER PUBLICATIONS

Chafaie, A. and Portier, R. 2004 "Anterior Fiber-reinforced Composite Resin Bridge: A Case Report" *Pediatric Dentistry* 26: 530-534.
(Continued)

*Primary Examiner* — Ralph A Lewis

(57) ABSTRACT

An impression taker captures an impression of preparation cut in abutment teeth. The impression taker includes; a rigid body supporting a first arm and a second arm. The first arm has a first longitudinal end configured to take an impression of a preparation cut in a first abutment tooth, and the second arm has a second longitudinal end configured to take an impression in a second abutment tooth. In addition, a reinforcement combination supports a dental bridge and an elongate proximal bar supports a dental bridge. The impression taker and the reinforcement bar combination can be used to produce a direct dental bridge.

7 Claims, 37 Drawing Sheets

Related U.S. Application Data on Jun. 13, 2016, provisional application No. 62/389,993, filed on Mar. 15, 2016, provisional application No. 62/386,919, filed on Dec. 16, 2015.

(51) Int. Cl.

| | | |
|---|---|---|
| *A61C 13/275* | (2006.01) | |
| *A61C 5/80* | (2017.01) | |
| *A61C 3/10* | (2006.01) | |
| *A61C 8/00* | (2006.01) | |
| *A61C 19/04* | (2006.01) | |

(52) U.S. Cl.
CPC .............. *A61C 3/10* (2013.01); *A61C 8/0001* (2013.01); *A61C 19/04* (2013.01)

(56) References Cited

U.S. PATENT DOCUMENTS

| | | | |
|---|---|---|---|
| 3,641,670 A | | 2/1972 | Karageorge |
| 4,380,435 A | | 4/1983 | Raeder et al. |
| 4,431,417 A | | 2/1984 | Weissman |
| 4,457,714 A | | 7/1984 | Klein |
| 4,661,067 A | | 4/1987 | Harvey, Sr. et al. |
| 4,713,005 A | * | 12/1987 | Marshall .............. A61C 13/225 433/180 |
| 4,764,116 A | | 8/1988 | Shoher et al. |
| 4,775,320 A | * | 10/1988 | Marshall .............. A61C 13/225 433/214 |
| 4,820,157 A | | 4/1989 | Salvo |
| 4,877,400 A | | 10/1989 | Holsclaw |
| 4,894,012 A | | 1/1990 | Goldberg et al. |
| 4,950,162 A | * | 8/1990 | Korber ................. A61C 13/275 433/178 |
| 4,957,439 A | | 9/1990 | Shoher et al. |
| 5,000,687 A | | 3/1991 | Yarovesky et al. |
| 5,055,047 A | * | 10/1991 | Names ................. A61C 8/0001 433/214 |
| 5,074,791 A | * | 12/1991 | Shoher .................. A61C 13/26 433/180 |
| 5,194,001 A | | 3/1993 | Salvo |
| 5,575,651 A | | 11/1996 | Weissman |
| 5,772,438 A | | 6/1998 | Deom |
| 5,934,907 A | * | 8/1999 | Marshall .............. A61C 13/275 433/180 |
| 6,039,569 A | | 3/2000 | Prasad et al. |
| 6,050,820 A | | 4/2000 | Lans et al. |
| 6,200,136 B1 | | 3/2001 | Prasad et al. |
| 6,345,984 B2 | | 2/2002 | Karmaker et al. |
| 10,772,711 B2 | * | 9/2020 | Morris ............... A61C 13/0003 |
| 2003/0183964 A1 | | 10/2003 | Daskalon et al. |
| 2004/0265782 A1 | | 12/2004 | Duray et al. |
| 2005/0127544 A1 | | 6/2005 | Brodkin et al. |
| 2006/0051723 A1 | * | 3/2006 | Morris ................. A61C 13/275 433/180 |
| 2007/0003904 A1 | | 1/2007 | Duray et al. |
| 2007/0281282 A1 | * | 12/2007 | Delmonico ............ A61C 13/26 433/180 |
| 2008/0096166 A1 | | 4/2008 | Morris |
| 2008/0318186 A1 | | 12/2008 | Delmonico et al. |
| 2015/0257984 A1 | | 9/2015 | Shchori et al. |

FOREIGN PATENT DOCUMENTS

| | | |
|---|---|---|
| WO | WO 98/58597 A1 | 12/1998 |
| WO | WO 2005/058179 A2 | 6/2005 |

OTHER PUBLICATIONS

Garoushi, et al. 2006 "Fiber-reinforced composites in fixed partial dentures" *Libyan Journal of Medicine* 1(1): 73-82.

Garoushi, S. and Vallittu, P.K. 2006 "Chairside fabricated fiber-reinforced composite fixed partial denture" *Libyan Journal of Medicine*: 40-42.

Garoushi, S. et al. 2011 "Resin-Bonded Fiber-Reinforced Composite for Direct Replacement of Missing Anterior Teeth: A Clinical Report" *International Journal of Dentistry* 2011(845420): 1-5.

Khetarpal, et al. 2013 "Creating a Single-Visit, Fibre-Reinforced, Composite Resin Bridge by Using a Natural Tooth Pontic: A Viable Alternative to a PFM Bridge" *Journal of Clinical and Diagnostic Research* 7(4): 772-775.

Li, et al. 2004 "Fibre reinforced composite dental bridge. Part I: experimental investigation" *Biomaterials* 25: 4987-4993.

Pfeiffer, et al. 2006 "Effect of pontic height on the fracture strength of reinforced interim fixed partial dentures" *Dental Materials* 22:1093-1097.

\* cited by examiner

Proximal Bar Fracture Test on 13.5mm Span

| Sample Number | Load at Max. Load (kN) | Load at Max. Load (lbf) | Displacement at Max. Load (mm) | Load at Cursor Point 1 (kN) | Load at Cursor Point 1 (lbf) | Displacement at Cursor Point 1 (mm) | Dimension on Left (mm) | Dimension on Middle (mm) | Dimension on Right (mm) |
|---|---|---|---|---|---|---|---|---|---|
| 1 | 0.693 | 156 | 0.370 | 0.693 | 156 | 0.366 | 2.46 x 1.10 | 1.91 x 6.13 | 2.45 x 1.11 |
| 2 | 0.789 | 177 | 0.330 | 0.789 | 177 | 0.331 | 2.46 x 1.13 | 6.17 x 1.94 | 2.45 x 1.12 |
| 3 | 0.801 | 180 | 0.360 | 0.801 | 180 | 0.362 | 2.47 x 1.11 | 6.16 x 1.95 | 2.46 x 1.14 |
| 4 | 0.648 | 146 | 0.320 | 0.648 | 146 | 0.322 | 2.46 x 1.13 | 6.22 x 1.95 | 2.40 x 1.15 |
| Mean | 0.733 | 165 | 0.345 | 0.733 | 179 | 0.346 | NA | NA | NA |
| S.D. | 0.074 | 17 | 0.024 | 0.074 | 17 | 0.022 | NA | NA | NA |

K

L

M

DIRECT DENTAL BRIDGE

CROSS REFERENCE TO RELATED APPLICATIONS

This application is the U.S. National Phase of International Application No. PCT/CA2016/051506, filed Dec. 16, 2016, designating the U.S. and published in English as WO 2017/100948 A1 on Jun. 22, 2017. Any and all applications for which a foreign or domestic priority claim is identified here or in the Application Data Sheet as filed with the present application are hereby incorporated by reference under 37 CFR 1.57.

BACKGROUND OF THE INVENTION

Field of the Invention

The present invention relates to dental restorations, and more particularly direct dental restorations to replace at least one missing tooth.

Description of the Related Art

If a single tooth, or less frequently two adjacent teeth are lost, and there are healthy teeth on either side of edentulous space created by the lost one or two teeth, then a fixed dental prosthesis called a bridge can be used to fill the edentulous space by fixing the prosthesis to the healthy teeth (termed abutment teeth) and placing a span containing artificial replacement teeth termed pontics between the abutment teeth.

Bridges can be indirect or direct bridges.

An indirect bridge is fabricated in a laboratory on an impression model of the patient's teeth. Once the indirect bridge is made in the laboratory, it is sent back to the dental office where the dentist cements it in place in the patient's mouth. An indirect bridge requires two visits to the dentist—a first visit to cut or grind abutment teeth and to make the impression model and a second visit to fix the indirect bridge made in the laboratory. Problems with indirect bridges include the financial cost of the bridge to the patient and cumulative time of the restoration with the two visit process requiring two sittings, two injections and time in the chair.

The cost for a laboratory fabricated bridge in industrialized countries is so high that the majority of citizens who lose a tooth cannot afford to have it replaced with a fixed laboratory fabricated bridge and as a result choose to leave the space without a tooth or teeth and attempt to chew and masticate with their remaining teeth.

A direct bridge is a bridge that is built directly on the healthy abutment teeth in the mouth of the patient. The objective of placing a bridge directly in the mouth is to save chair time and to cost the patient less money and also to cut less of the abutment tooth away when making the bridge. A direct bridge can often be fixed in a single visit to the dentist.

To create a bridge directly in the mouth, the dentist must install a reinforcement or framework that spans the abutment teeth and must create a pontic form to fill the edentulous space. Preformed bars or frameworks that decrease the amount of time needed to create the direct bridge provide a significant advantage to the dentist, as blood and saliva can egress onto the abutment teeth and edentulous space that need to be kept dry to optimize results.

Dental fibers have been used as low cost reinforcements for inexpensive direct bridges that most people can afford. The dental fibers were used as reinforcements spanning from abutment to abutment and placed within a pontic tooth to give the span strength against fracture forces of chewing. To make the direct bridge the dentist used composite resin filling materials with the fibers imbedded within the resin to build and create the pontic and bridge.

Yet despite the availability of these fibers, the majority of dentists around the world do not fabricate low cost fiber reinforced direct bridges. The reasons dentists do not provide these fiber reinforced direct bridges is that they do not provide a wide pontic support, are too difficult to cut to size, and are too time consuming to place in the mouth as a treatment upon which the dentist can effectively replace laboratory processed bridges.

Preformed bars or frameworks that span two abutment teeth have been previously described, for example in U.S. Pat. Nos. 4,457,714, 4,820,157, 4,894,012, 4,950,162, 5,772,438, 6,200,136, 6,039,569, 6,345,984 and U.S. Patent Application Publication Nos. 2004/0265782, 2006/0051723, 2007/0003904 and 2008/0096166.

However, despite the incredible demand and need and interest from dentists for direct bridges, no such preformed bar or framework has been commercially successful and widely adopted by dentists for use as a reinforcement for direct bridges.

Accordingly, there is a continuing need for alternative direct dental bridge devices and methods.

SUMMARY OF THE INVENTION

In an aspect there is provided, an impression taker for capturing an impression of preparation cut in abutment teeth, the impression taker comprising; a rigid body supporting a first arm and a second arm, the first arm having a first longitudinal end configured to take an impression of a preparation cut in a first abutment tooth; the second arm having a second longitudinal end configured to take an impression in a second abutment tooth.

In another aspect there is provided, a reinforcement combination for supporting a dental bridge, the reinforcement combination comprising: an elongate proximal bar comprising: a central planar pad, a first insertion arm extending in a mesial direction from the perimeter of the pad, a second insertion arm extending in a distal direction from the perimeter of the pad, a first mating surface formed on the first insertion arm and a second mating surface formed on the second insertion arm; a third mating surface formed on a first elongate torque bar, the first mating surface and the third mating surface having complimentary shapes; and a fourth mating surface formed on a second elongate torque bar, the second mating surface and the fourth mating surface having complimentary shapes.

In yet another aspect there is provided, an elongate proximal bar for supporting a dental bridge, the elongate proximal bar comprising: a central planar pad, a first insertion arm extending in a mesial direction from the perimeter of the pad, a second insertion arm extending in a distal direction from the perimeter of the pad; and a plurality of friction-enhancing surface features formed on the proximal bar, the plurality of friction-enhancing surface features providing a plurality of flat surfaces oriented at a non-parallel angle with a longitudinal axis of the proximal bar.

In other aspects, methods of use of one or both of the impression taker and the reinforcement combination to produce a direct dental bridge are also provided.

BRIEF DESCRIPTION OF THE DRAWINGS

FIG. 4 shows results of a three-point bend test of a proximal bar.

DETAILED DESCRIPTION OF PREFERRED EMBODIMENTS

Figure 1:
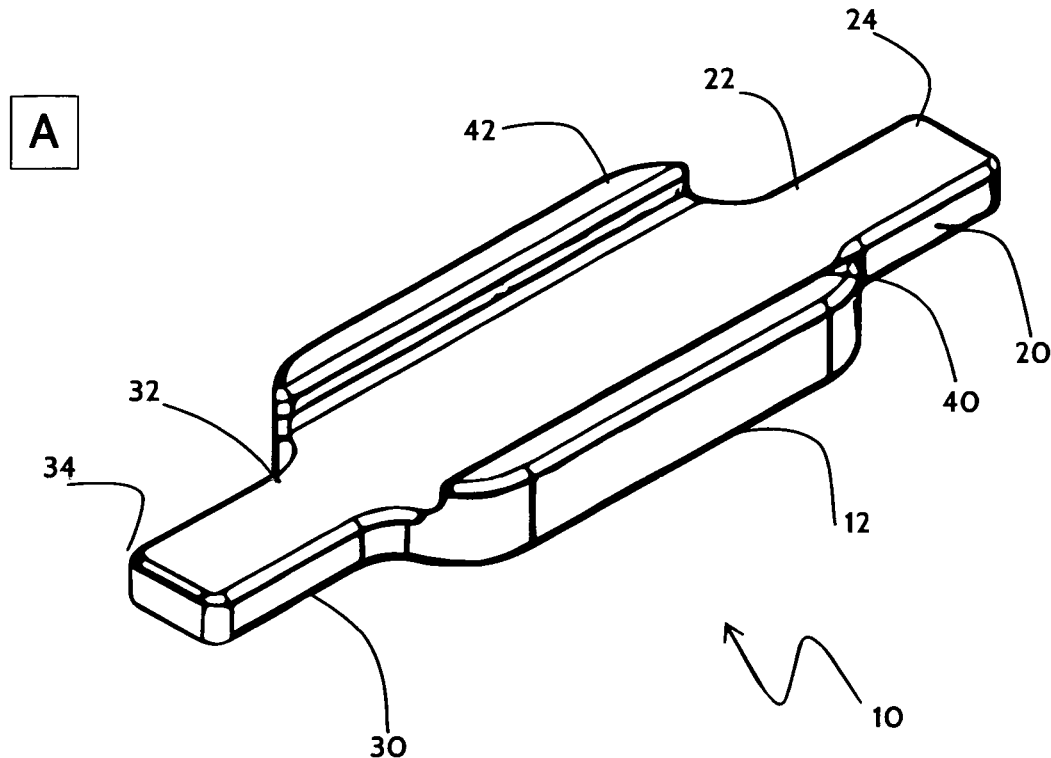
FIG. 1 shows (A) perspective, (B) top, and (C) lateral cross-section views of a proximal bar component of a reinforcement bar assembly for producing a direct dental bridge.
Figure 1:
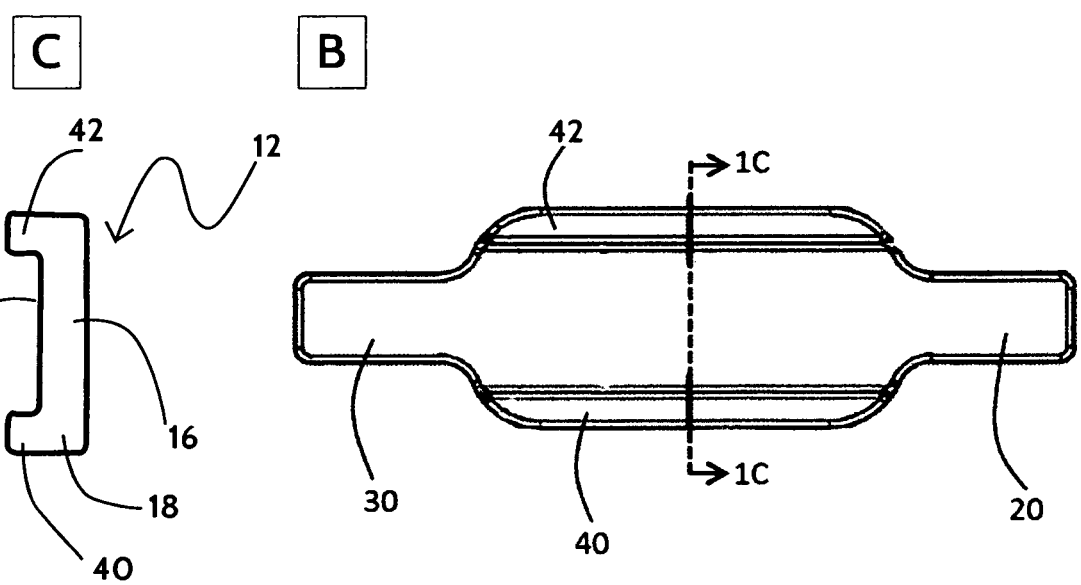

Now referring to the drawings, devices and methods for creating a direct dental bridge to replace at least one missing tooth are described. The direct dental bridge can be used to replace a missing posterior tooth or a canine anterior tooth. Posterior teeth are premolars (also called bicuspids) and molars, as compared to incisors and canines, which are anterior teeth.

FIGS. 1 to 4 relate to a reinforcement bar combination for a dental bridge that is described in co-pending and co-owned International Application No. PCT/CA2016/050840 (filed 15 Jul. 2016). As features shown in FIGS. 1 to 4 provide a platform for further development of new and inventive reinforcement bar combinations, description of FIGS. 1 to 4 is repeated here for completeness.

FIG. 1 shows (A) perspective, (B) top, and (C) lateral cross-section views of a proximal bar 10 of a reinforcement bar assembly for supporting a direct dental bridge. The proximal bar is an elongate structure having a longitudinal axis that is oriented in a mesiodistal direction when producing the direct dental bridge. A mesial direction is towards the anterior midline in a dental arch, while a distal direction is towards the tooth furthest from the anterior midline (ie., a direction towards a wisdom tooth) in each quadrant. Each tooth includes a mesial surface and a distal surface. When producing the direct dental bridge the proximal bar 10 spans a first cavity preparation in a distal surface of a mesial abutment tooth to a second cavity preparation in the mesial surface of a distal abutment tooth. Facing mesial and distal surfaces of adjacent teeth are generally referred to as proximal surfaces. Accordingly, the corresponding first and second cavity preparations in facing distal and mesial surfaces of the abutment teeth can be more generally referred to as first and second cavity preparations in the proximal surfaces of the abutment teeth, and proximal bar 10 is sized longitudinally to span the first and second cavity preparations and the edentulous space therebetween. First and second cavity preparations in the proximal surfaces of the abutment teeth may also be referred to as distal and mesial proximal preparations, respectively.

The proximal bar 10 comprises a central planar pad 12 bound by a first surface 14 and an opposing second surface 16 joined at a perimeter 18. The first surface 14 is generally parallel to the second surface 16. When creating the direct dental bridge the first surface 14 and the second surface 16 are both aligned transverse to a coronoapical axis of at least one abutment tooth with the first surface 14 facing a coronal direction and the second surface 16 facing an apical direction.

A first insertion arm 20 extends horizontally from the perimeter 18 of the central planar pad 12. The first insertion arm 20 has a first end 22 that is integrally connected to the perimeter 18 of the central planar pad 12 and a second end 24 that is free to be inserted or fit within a cavity preparation in a proximal surface of an abutment tooth. The first insertion arm 20 is substantially co-planar with the central planar pad 12. When producing the direct dental bridge the first insertion arm 20 extends in a mesial direction from the perimeter 18 of the central planar pad 12 so that a portion of the first insertion arm 20 at or near its second end 24 fits and finds abutting support within a cavity preparation within the proximal surface (the distal surface) of the mesial abutment tooth.

A second insertion arm 30 extends horizontally from the perimeter 18 of the central planar pad 12. The second insertion arm 30 has a first end 32 that is integrally connected to the perimeter 18 of the central planar pad 12 and a second end 34 that is free to be inserted or fit within a cavity preparation in a proximal surface of an abutment tooth. The second insertion arm 30 is substantially co-planar with the central planar pad 12 and with the first insertion arm 20. When producing the direct dental bridge the second insertion arm 30 extends in a distal direction from the perimeter 18 of the central planar pad 12 so that a portion of the second insertion arm 30 at or near its second end 34 fits and finds abutting support within a cavity preparation within the proximal surface (the mesial surface) of the distal abutment tooth.

A first vertical extension 40 extends substantially vertically from and substantially perpendicularly to the first surface 14 of central planar pad 12. The first vertical extension 40 is substantially co-extensive with the central planar pad 12 along its longitudinal dimension. When producing the direct dental bridge the first vertical extension extends in a coronal direction from the first surface 14 or coronal facing surface of the central planar pad 12.

A second vertical extension 42 extends substantially vertically from and substantially perpendicularly to the first surface 14 of central planar pad 12. The second vertical extension 42 is substantially co-extensive with the central planar pad 12 along its longitudinal dimension. When producing the direct dental bridge the second vertical extension 42 extends in a coronal direction from the first surface 14 or coronal facing surface of the central planar pad 12.

The vertical extensions, shown in FIG. 1, function as vertical walls of vertical sidewalls and therefore the term vertical extension may be used interchangeably with the terms vertical wall or vertical sidewall.

The first vertical sidewall 40 and the second vertical sidewall 42 are substantially co-extensive and substantially parallel and are symmetrically positioned with reference to a longitudinal line of symmetry of the central planar pad 12. The first and second vertical sidewalls have a lateral spacing greater than the width of the first and second horizontal insertion arms. The first and second vertical sidewalls combine with the first surface 14 of the central planar pad 12 to form a channel or trough with a U-shaped lateral cross-section providing an open trough defining first and second open longitudinal ends that are contiguous and communicative with first and second insertion arms, respectively.

The proximal bar 10 only inserts into the cavity preparation in the proximal surfaces of the abutment teeth from about 1 mm to about 2 mm. Therefore, the proximal bar cannot be relied upon to resist torque or twisting forces that may be exerted upon a dental bridge structure.

To provide reinforcement of a dental bridge against fracture due to torque or twisting forces two torque bars are aligned with the proximal bar and abutment teeth with each torque bar extending from within an occlusal cavity preparation of the abutment tooth to within and between the first and second vertical sidewalls of the proximal bar 10.

Figure 2:
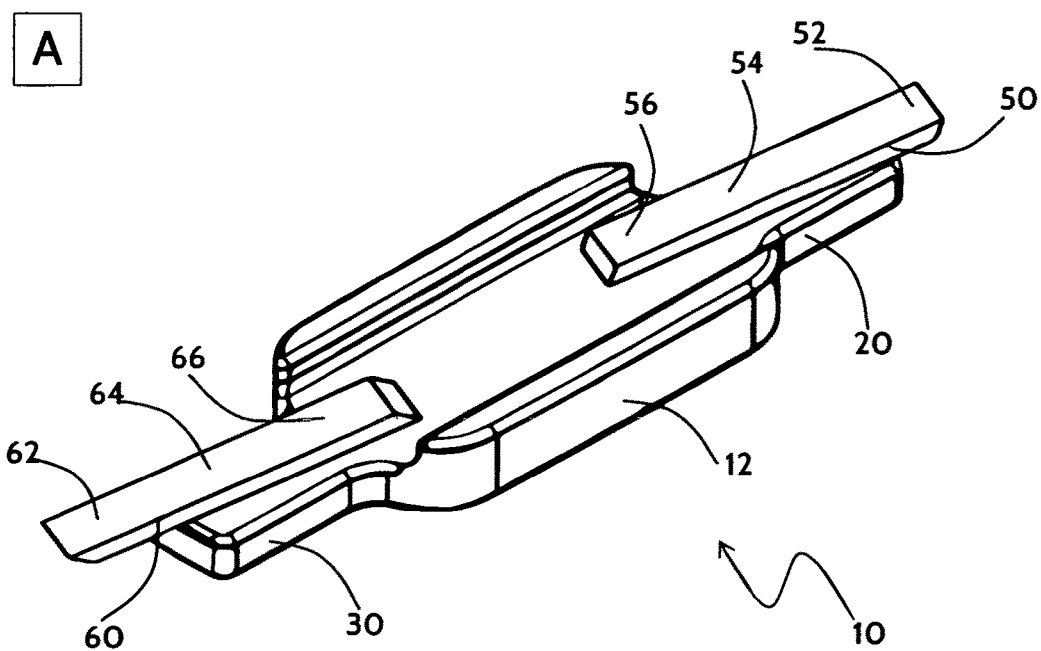
FIG. 2 shows (A) perspective, (B) top, and (C) lateral cross-section views of the proximal bar shown in FIG. 1 aligned with two torque bars to provide a reinforcement bar assembly for producing a direct dental bridge.
Figure 2:
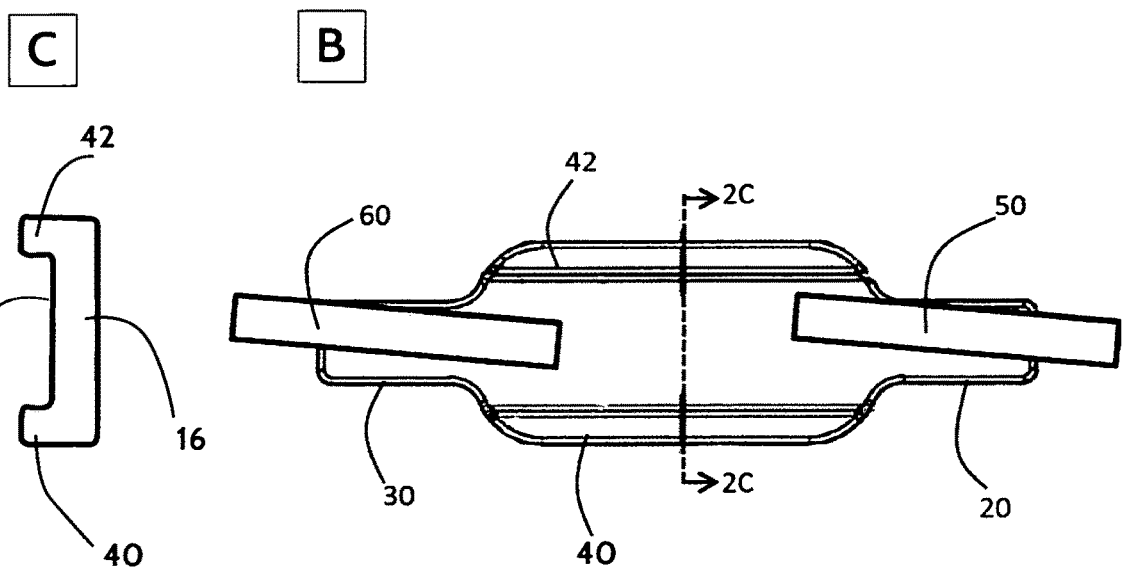

FIG. 2 shows (A) perspective, (B) top, and (C) lateral cross-section views of the proximal bar shown in FIG. 1 aligned with two torque bars to provide a reinforcement bar assembly for producing a direct dental bridge.

A first elongate torque bar 50 is a straight bar having at least one longitudinal flat side for abutting support from the first insertion arm 20 and a portion of the coronal facing surface of the central planar pad 12. The first elongate torque bar 50 is defined by a first free end section 52 for contact with and receiving abutting support from an occlusal cavity preparation of a mesial abutment tooth, a central body section 54 for contact with and receiving abutting support from the first insertion arm 20, and a second free end section 56 for contact with and receiving abutting support from the central planar pad 12. The first and second vertical sidewalls act as guards or walls to constrain angular motion the first elongate torque bar 50. Typically, the first elongate torque bar 50 is aligned with the proximal bar 10 so that it overlaps with less than the full longitudinal distance of the coronal facing surface of the central planar pad 12.

A second elongate torque bar 60 is a straight bar having at least one longitudinal flat side for abutting support from the second insertion arm 30 and a portion of the coronal facing surface of the central planar pad 12. The second elongate torque bar 60 is defined by a first free end section 62 for contact with and receiving abutting support from an occlusal cavity preparation of a distal abutment tooth, a central body section 64 for contact with and receiving abutting support from the second insertion arm 30, and a second free end section 66 for contact with and receiving abutting support from the central planar pad 12. The first and second vertical sidewalls act as guards to constrain angular motion the second elongate torque bar 60. Typically, the second elongate torque bar 60 is aligned with the proximal bar 10 so that it overlaps with less than the full longitudinal distance of the coronal facing surface of the central planar pad 12.

The first and second elongate torque bars can be positioned in varied longitudinal overlap with the proximal bar depending on the requirements of a direct restoration as angles or alignment of occlusal cavity preparation and edentulous space may be specific to each direct dental bridge restoration. The first and second elongate torque bars can be independently positioned to longitudinally overlap the proximal bar, where each of the first and second torque bars is independently limited to a longitudinal overlap that is less than the full longitudinal distance of the proximal bar, more typically independently limited to a longitudinal overlap that is less than 80% of the full longitudinal distance of the proximal bar, the full longitudinal distance of the proximal bar being the longest distance from a free end of the first horizontal insertion arm to a free end of the second horizontal insertion arm. The first and second elongate torque bars can be independently positioned to overlap one of the first or second insertion arms and the central planar pad, but limited to a longitudinal overlap that is less than the full longitudinal distance of the proximal bar. Each of the first and second elongate torque bars can independently overlap with any portion of the longitudinal distance of the coronal facing surface of the central planar pad 12. Typically, the first elongate torque bar longitudinal overlap is confined to the first insertion arm and the central planar pad so that the first elongate torque bar contacts and receives abutting support from the first insertion arm and the central planar pad, but not the second insertion arm. Typically, the second elongate torque bar longitudinal overlap is confined to the second insertion arm and the central planar pad so that the second elongate torque bar contacts and receives abutting support from the second insertion arm and the central planar pad, but not the first insertion arm.

The first and second elongate torque bars can be varied in angular orientation to and longitudinal overlap with the proximal bar depending on the requirements of a direct restoration as angles or alignment of occlusal cavity preparation and edentulous space may be specific to each direct dental bridge restoration. Angular orientation of each of the first and second torque bar can independently deviate up to about 60 degrees from the longitudinal axis of the proximal bar and up to about 20 degrees from the plane of the coronal facing surface of the proximal bar. The first and second vertical sidewalls of the proximal bar 10 act as guards or walls to limit angular orientation of the first and second elongate torque bars when installing a reinforcement bar assembly. The first and second vertical sidewalls can also act as guards or walls to constrain angular motion of the first and/or second elongate torque bars, with the vertical sidewalls providing a resistive force when torque or twisting forces are exerted upon a direct dental bridge.

Figure 3:
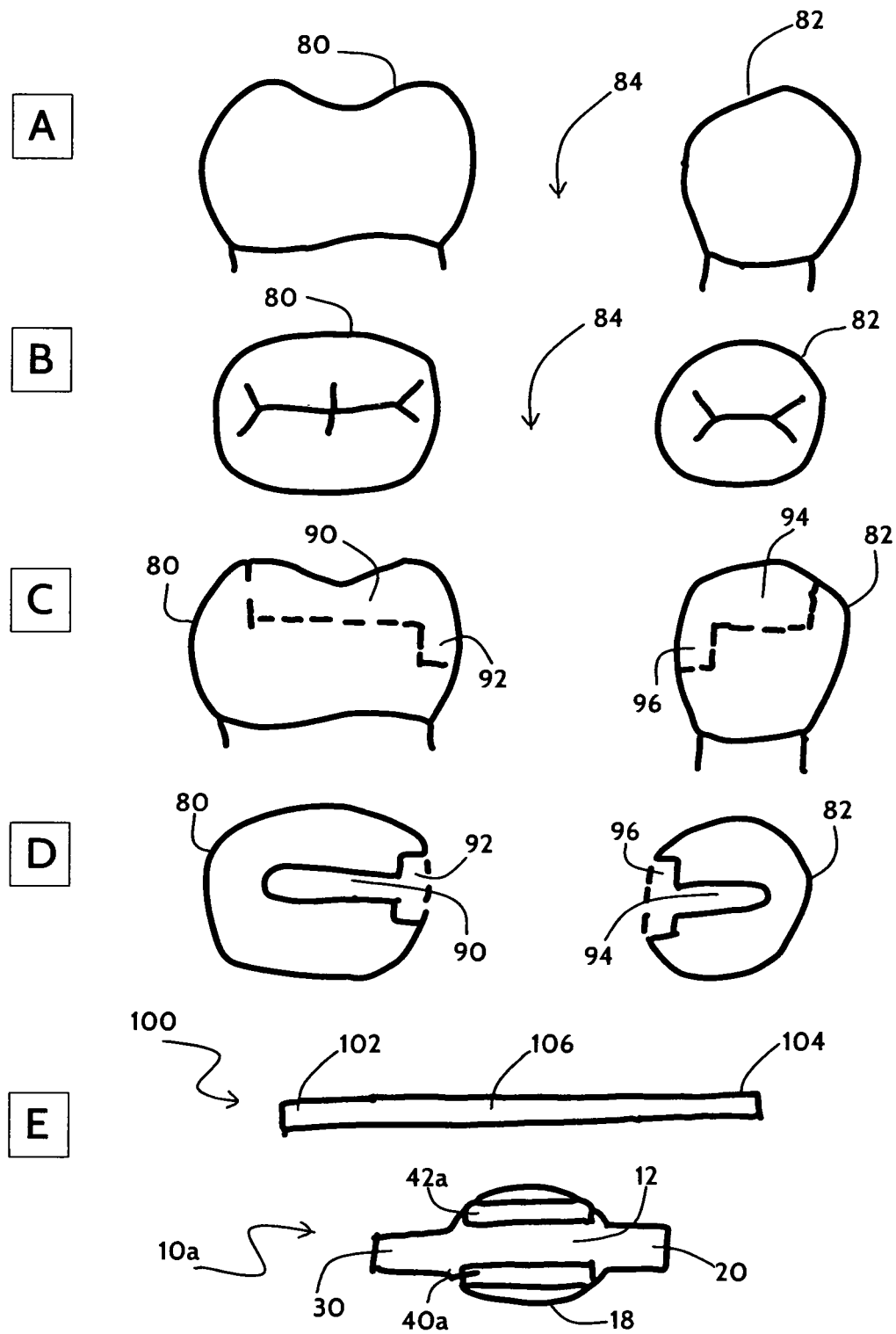
FIG. 3 shows a sequence of views (A to Q) schematically illustrating experimental development of the reinforcement bar assembly shown in FIG. 2.
Figure 3:
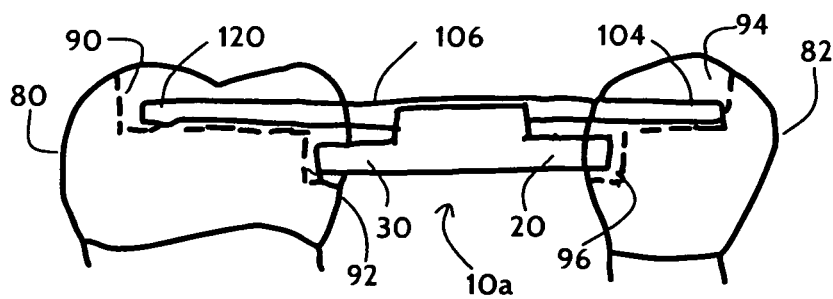
Figure 3:
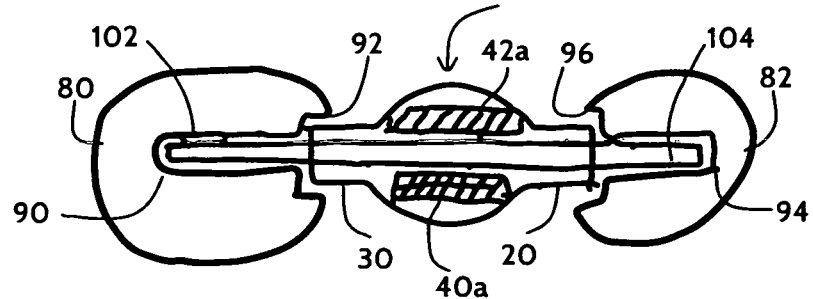
Figure 3:
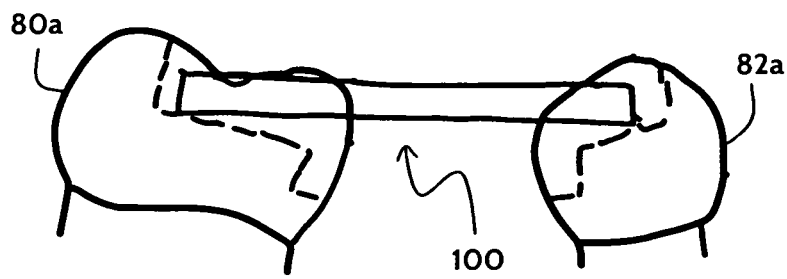
Figure 3:
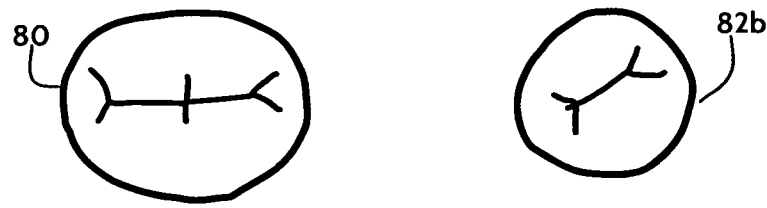
Figure 3:
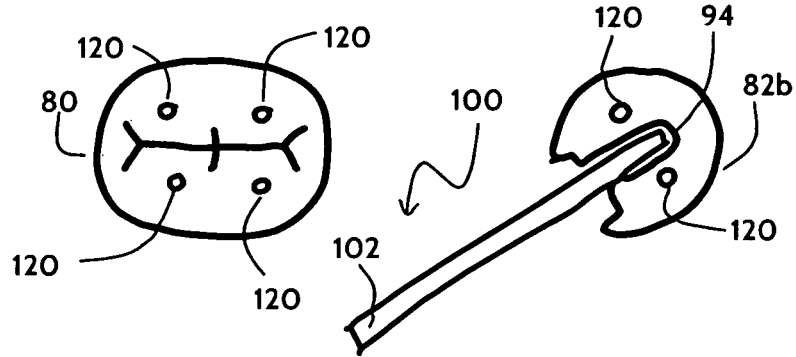
Figure 3:
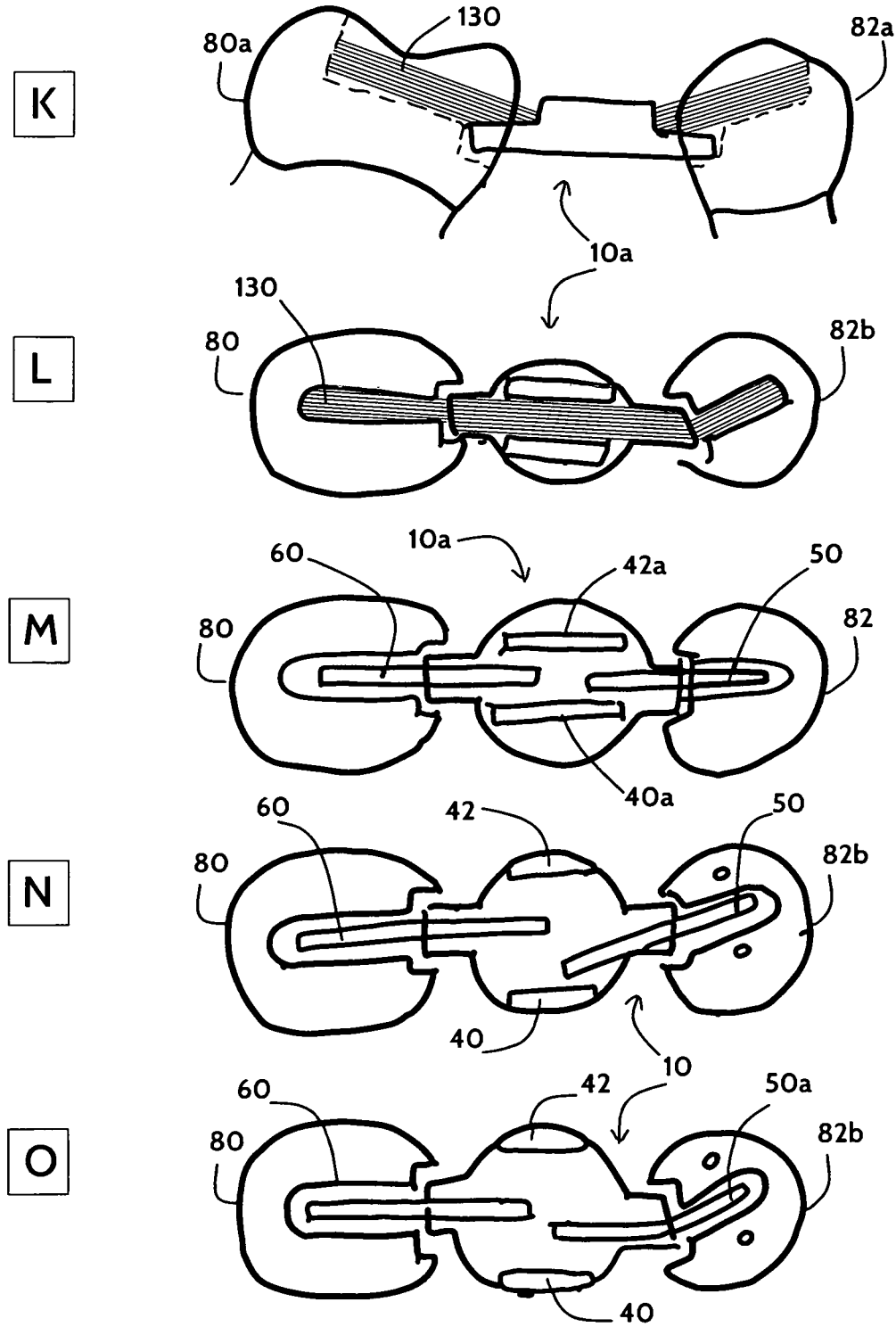
Figure 3:
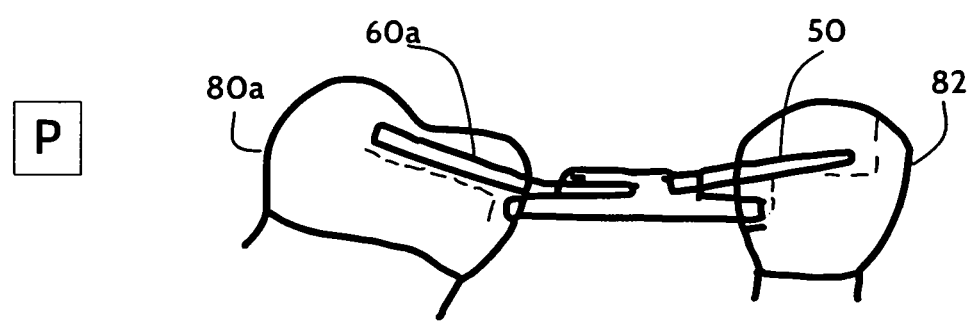
Figure 3:
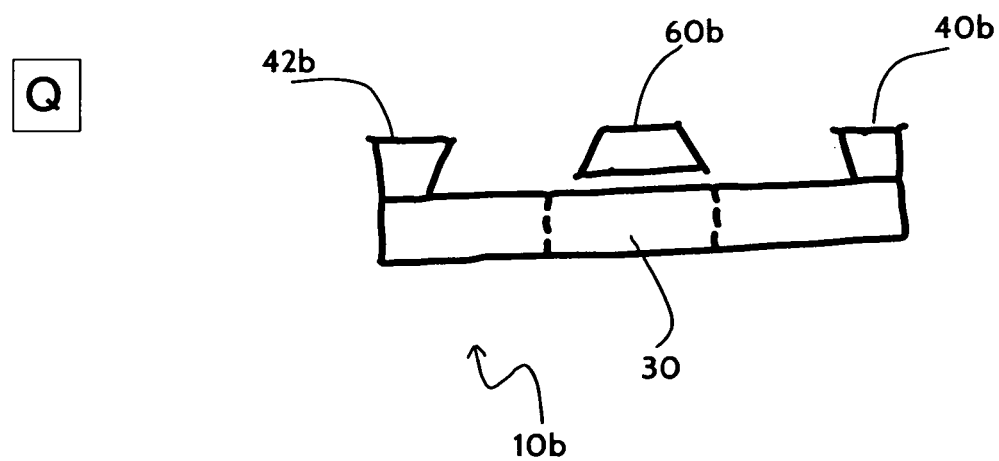

FIG. 3 shows a sequence of views (A to P) schematically illustrating experimental development of the reinforcement bar assembly shown in FIG. 2.

FIG. 3A shows the side view of crowns of a molar 80 on the left and a bicuspid tooth 82 on the right and an edentulous space 84 in between. The molar 80 and bicuspid 82 teeth are termed abutments or abutment teeth. The molar 80 is the distal abutment tooth and the bicuspid 82 is the mesial abutment tooth. An edentulous space is a space where a natural tooth is missing and extends between the proximal surfaces of the abutment teeth.

FIG. 3B shows a top view (coronal view) of the same two abutment teeth shown in FIG. 3A—the molar 80 and the bicuspid 82. A reinforcement bar assembly that spans the edentulous space 84 can be used to reinforce composite resin in such a manner that the composite resin can be used to produce a permanent composite resin direct dental bridge replacing the missing tooth with a replacement tooth called a pontic.

FIG. 3C shows a side view of proximal and occlusal cuts, also called preparations, into the abutment teeth. A distal occlusal cavity preparation 90 and a distal proximal cavity preparation 92 are formed in the molar 80, while a mesial occlusal cavity preparation 94 and a mesial proximal cavity preparation 96 are formed in the bicuspid 82. Occlusal and proximal preparations are cut by a dentist using a rotary tool such as a dental drill actuating rotation of a suitable dental burr.

FIG. 3D shows a top view (coronal view) of the proximal and occlusal cuts, also called preparations, into the abutment teeth. Each proximal and occlusal cuts receives an end portion of a reinforcement bar. A combination or assembly of reinforcements bars supports application and shaping of composite resin to form a direct dental bridge to span and fill the edentulous space 84. The reinforcement bar assembly provides a framework or scaffold to reinforce the composite resin and support a prosthetic tooth called a pontic which replaces the missing tooth.

FIG. 3E shows a top view (coronal view) of a reinforcement bar combination that was cut to a suitable size and shape and used to make the direct dental bridge for patients. The reinforcement bar combination comprises a single occlusal bar 100 and a single proximal bar 10*a*. The occlusal bar 100 is a long straight bar that is cut by the dentist to span the longitudinal distance between distal and mesial occlusal preparations (90, 94), the occlusal bar 100 having a first end 102 that is received in distal occlusal preparation 90, a second end 104 that is received in mesial occlusal preparation 94, and a central portion 106 that receives abutting support the proximal bar 10*a*. The proximal bar 10*a* shown in FIG. 3E is a modification of the proximal bar 10 shown in FIG. 1 with both the first vertical sidewall 40*a* and the second vertical sidewall 42*a* laterally offset from the perimeter 18 of the central planar pad 12. The proximal bar 10*a* has the first and second vertical sidewalls, 40*a* and 42*a*, situated closer to the longitudinal line of symmetry of the proximal bar 10 so as to provide a grip on the occlusal bar to better support or resist torque forces applied to the dental bridge and transferred to the occlusal bar. The reinforcement bar combination shown in FIG. 3E requires that the direct bridge comprise a single proximal bar and a single occlusal bar extending from abutment tooth to abutment tooth.

The purpose of the occlusal bar spanning mesial to distal occlusal preparations is to provide additional support and reinforcement for the pontic tooth against occlusal forces directed to the pontic. The occlusal bar provides this support by being simultaneously fixed in the occlusal preparations of both the abutment teeth and spanning through the pontic to give the pontic strength against fracture.

The purpose of the occlusal bar and the proximal bar being used together was to use the strength of the combination of the two bars to provide the strength to the pontic.

FIG. 3F shows a side view and FIG. 3G shows a top view of the occlusal bar 100 and the proximal bar 10*a* sized and placed to fit into the occlusal and proximal preparations, respectively, cut in the abutment teeth. Case studies and experiments have shown that the reinforcement bar combination as shown in FIGS. 3F and 3G can be successfully used for abutment teeth that are aligned with each other. However, in practice many teeth that serve as abutments are either tipped or rotated. FIGS. 3H, 3I and 3G show examples of tipped and rotated teeth from which it is apparent that the reinforcement bar combination of occlusal and proximal bars as shown in FIGS. 3F and 3G cannot function as intended since the occlusal bar 100 cannot be aligned to sit within both mesial and distal occlusal preparations.

FIG. 3H shows a tipped molar 80*a* abutment tooth and a tipped bicuspid 82*a* abutment tooth. The occlusal bar 100 cannot sit in the distal and mesial occlusal preparations as intended due to the tipping of the abutments.

FIG. 3I shows an ideal alignment molar 80 abutment tooth and a rotated bicuspid 82*b* abutment tooth.

FIG. 3J shows the position of the nerve pulp horns 120 as the small circles in the bicuspid and molar abutment teeth. FIG. 3J also shows that the occlusal preparation in any abutment has to be cut down the center of the tooth between the pulp horns 120 to avoid hitting the pulp horn 120 of the nerve when cutting the tooth. FIG. 3J also shows the straight occlusal bar 100 in place in the mesial occlusal preparation 94 of the bicuspid showing how it would be positioned in the mesial occlusal preparation 94 causing an alignment problem for the occlusal bar 100 with respect to molar 80 making it difficult to be used in a direct bridge.

Experimentation and attempts to employ the occlusal bar to reinforce direct bridges in the mouth has established that the occlusal bar inserted into and spanning from mesial occlusal preparation to distal occlusal preparation cannot be employed in many cases due to even slight tipping and rotation of the teeth out of and away from a perfect straight line.

The straight line available in real life between two abutment teeth is determined by the position of the nerves in the abutment teeth and the nerve horns sticking up into the cuspal areas of the abutment teeth. These pulp horns dictate the width of each occlusal preparation and the direction of the line of the occlusal preparation and thus the positioning of the occlusal bar and the straight line or longitudinal axis position of the occlusal bar when placed within these preparations.

Experiments and case studies involving numerous attempts to place a single occlusal bar from abutment tooth to abutment tooth in the mouth of patients to build direct bridges led to the discovery that the straight line direction of each of the occlusal preparations are so tightly defined by the pulp horns that it is rare in the mouth that the straight line direction of the occlusal preparations of both abutment teeth will be lined up so precisely that a single occlusal bar can be placed in both occlusal preparations simultaneously to span the edentulous space and sit in each occlusal preparation and provide a suitable reinforcement.

Since the straight occlusal bars could not be used in the vast majority of direct bridges, attempts were made to fabricate direct bridges in the mouth using bendable fibers. Fibers could be used to reinforce a direct bridge with the proximal bar as the fibers could bend and twist to fit the directions of the available occlusal preparations of each abutment and through the channel or trough defined by vertical sidewalls of the proximal bar.

Therefore, to overcome the problems of tipped and rotated teeth experiments were conducted using bendable fibers as occlusal reinforcements in combination with the proximal bar 10a instead of a straight and ridged occlusal bar 100.

FIGS. 3K and 3L show the proximal bar 10a in place in mesial and distal preparations and bendable fibers 130 used as an occlusal bar to adapt to the occlusal preparations of tipped and rotated teeth and also inserted between the vertical sidewalls of the proximal bar 10a to reinforce a direct bridge.

Ribbond (polyethylene), Fiber-Kor, Splint-It from Pentron Corporation and E-Fiber from Preat Corporation (fiber glass) which are commercially available to dentists, were tested for use as the bendable fiber occlusal bar 130 in combination with the proximal bar 10a for producing a direct dental bridge. This technique of direct dental bridge construction using fibers as the occlusal bar was functional and the bridging and reinforcing are successful, but problems and disadvantages of using fibers were observed.

An example of a problem observed by using bendable fibers is that polyethylene fibers are not reliably strong because the dentist had to impregnate the polyethylene fibers with dental resin chair side and could not reliably and consistently achieve complete impregnation and thorough wetting of these fibers.

Another problem with using bendable fibers to replace the occlusal bar was difficulty in compacting and placing and curing the fibers to lay flat in the bottom (ie., along the apical or gingival surface) of the occlusal preparations and within the space between the first and second vertical sidewalls of the proximal bar. The fibers tended not to lay down and they were difficult to manage and cure exactly where they are desired to be in the bottom of the occlusal preparations. The fibers would extend up into the occlusal surface so that when the bridge is completed the fibers are exposed and part of the occlusal surface. More specifically, experiments with glass fibers (which were chosen for being stronger more reliable than polyethylene fibers) revealed that these glass fibers are difficult to work with and difficult to push into place and cure in place in the occlusal preparations.

Another problem with using bendable fibers is that since the fibers are not easily controlled to lay flat in the occlusal preparations and are in or close to the occlusal surface the fibers are at risk of being more exposed as the patient uses the bridge and wears down the composite resin.

Faced with the above problems with using the bendable fibers, further experimentation of reinforcement bar combinations were conducted. Case studies showed that the proximal bar 10a was actually supporting the pontic on its own very well.

Furthermore, three-point bend tests of the proximal bar 10a independently conducted by Acuren Materials Testing found the proximal bars were able to withstand over 150 lbs of occlusal force before breaking. FIG. 4 shows the results of the proximal bar three-point bend tests conducted by Acuren, Moreover, case studies confirmed that the proximal bar was more than adequately strong to withstand the occlusal forces applied to it. Therefore, the concept that combination of 2 reinforcement bars—a proximal bar and an occlusal bar—acting together to resist occlusal forces, where the occlusal bar is a continuous fiber from mesial occlusal preparation to distal occlusal preparation may not be needed or necessary for resisting occlusal forces.

Therefore, experiments established that the concept of a single occlusal bar or fiber span reinforcement spanning from mesial occlusal preparation to distal occlusal preparation to assist in the resisting of occlusal forces to provide a combined strength with the proximal bar may be eliminated.

However, the proximal bar only inserts into the abutment tooth about 1 mm and therefore the proximal bar cannot be relied upon to resist torque or twisting forces at the join or isthmus between the pontic and the abutment tooth. Thus, further analysis established that while eliminating a reinforcement structure that spanned from occlusal preparation to occlusal preparation may not critically reduce resistance to occlusal forces, it could leave torque forces placed across the isthmus of where the pontic joins the abutment tooth without sufficient resistance.

Without wishing to be bound by theory, based on recognition that the proximal bar sufficiently withstands occlusal forces but cannot be relied upon to sufficiently resist torque or twisting forces at the isthmus, a hypothesis was developed that the occlusal bar can function as a reinforcement against fracture due to torque or twisting forces at the isthmus between the pontic and the abutment tooth. The hypothesis was further developed to investigate replacement of the single occlusal bar with two shorter bars. Case studies have shown that the function of the single occlusal bar can be accomplished by two separate short occlusal bars at each end of the direct bridge. More specifically, case studies established that resisting torque forces across the isthmus could be accomplished with two separate short ceramic bars that extended between the occlusal preparation of one abutment to and into the trough or channel defined by vertical sidewalls of the proximal bar. Again, without wishing to be bound by theory, twisting or torque forces could be successfully resisted by each of the two short occlusal bars which extended from within the occlusal preparation of the abutment tooth to within and between the vertical sidewalls of the proximal bar. Since these short occlusal bars are believed to counter or resist torque forces, these bars are called torque reinforcement bars or torque bars.

Torque bars can come in different sizes depending on the size of the abutment tooth it is placed into. For example, lateral cross-section dimensions for a torque bars for a molar may be 1.6 mm by 1.0 mm and for a bicuspid may be 1.2 mm by 1.0. Thus, torque bars may be categorized in kits as molar torques bars and bicuspid torque bars, with molar torque bars typically having a greater lateral cross-sectional area than bicuspid torque bars. Lateral cross-sectional shapes of torque bars may be varied including circular, trapezoid and other polygonal shapes.

FIG. 3M shows a top view (coronal view) of the proximal bar 10a and the first elongate torque bar 50 and the second elongate torque bar 60 configured and positioned in proximal and occlusal cuts of ideally aligned molar 80 and bicuspid 80 abutment teeth. However, this combination of reinforcement bar configuration and arrangement between two abutment teeth so that both occlusal preparation and both proximal preparation are co-aligned and parallel is not frequent clinically. Rather one or both abutment teeth being tipped or rotated presents much more frequently in practice. In order to accommodate a range of angular orientations of misaligned abutment teeth and consequent angular orientations of a straight elongate torque bar relative to a proximal bar, the lateral spacing between the first and second vertical sidewalls can be increased to a lateral spacing shown for proximal bar 10 in FIG. 3N or FIG. 1, for example, as compared to the lateral spacing shown for proximal bar 10a in FIG. 3M, for example. As the lateral spacing between the vertical sidewalls of the proximal bar is increased the torque bars can fit between the vertical sidewalls in numerous cases of small irregularities of orientation that are so common in abutment teeth.

FIG. 3N shows the vertical sidewalls of the proximal bar moved to the furthest lateral position possible on the proximal bar 10—the first and second vertical sidewalls, 40 and 42, are located at opposing lateral sides of the perimeter 18 of the central planar pad 12. FIG. 3N shows that by spacing the vertical sidewalls laterally a straight elongate torque bar 50 can be used to fit between the vertical sidewalls with a range of angular orientations and thus be used to strengthen the isthmus against torque forces even when an abutment tooth is rotated from an ideal alignment, for example rotated bicuspid 82b. Depending on the degree of rotational deviation from ideal alignment of an abutment tooth, a bent torque bar may be provided to accommodate the rotational deviation. In cases where the abutment tooth is severely rotated, the torque bar can be provided in a variety of bent shapes to be selected as needed by the particular rotation of the abutment tooth.

FIG. 3O shows a bent elongate torque bar 50a being used to provide reinforcement at the isthmus when configuring a three bar reinforcement combination for a severely rotated abutment tooth, such as rotated bicuspid 82b.

Tipped and rotated teeth, especially tipped molars, are very common. Torque bars can be prefabricated in a variety of angles so that they can used in cases of tipped and rotated teeth.

FIG. 3P shows the bent torque bar 60a used for a tipped molar 80a.

Torque bars can be provided in sets of multiple types of bars, including straight bars and a variety of bent bars where the dentist can select the angle of the torque bar bend that best suits the alignment of the abutment teeth.

FIG. 3Q shows a longitudinal end cross-section view of a proximal bar 10b and torque bar 60b where the vertical sidewalls 40b, 42b are to the furthest lateral position possible on the proximal bar 10b and the inner surfaces of the vertical sidewalls are angled inwards to form a dovetailed trough. FIG. 3Q also shows the torque bar 60b is widest at the base and while the torque bar sits loosely between the vertical sidewalls before application of composite resin, once the composite resin is applied and cured to form a direct bridge, the composite resin surrounding the torque bar will apply forces to the dove tailed angles of the vertical sidewalls during an application of force to the direct bridge. Proximal bar 10b differs from proximal bar 10 in that a lateral cross-section of the trough formed by the first and second vertical sidewalls of proximal bar 10b shows a dovetailed shape. Elongate torque bar 60b differs from elongate torque bar 60 in its lateral cross-section shape, the lateral cross-section of torque bar 60b having an acute trapezoid shape, and more specifically an isosceles trapezoid shape to match the dovetailed trough of proximal bar 10b.

Experiments illustrated in FIG. 3 have established a clear advantage of using two torque bars instead of a single occlusal bar to provide reinforcement for rotated or tipped abutment teeth.

Another advantage of using two torque bars instead of a single occlusal bar is that the torque bars can be provided in different sizes for different abutment teeth. A molar is larger than a bicuspid and so a larger stronger torque bar can be provided for a molar, for example with dimensions of a rectangular bar 1.6 mm wide and 1.2 mm high. The bicuspid bar would be smaller, for example 1.2 mm wide by 1.2 mm high. The torque bars need to be long enough (mesiodistal direction) to extend far into the occlusal preparation of the abutment tooth and then extend into the trough of the proximal bar, for example to about the middle of the proximal pad.

Another advantage of using two torque bars instead of a single occlusal bar is that it allows for bent torque bars to be provided to fit into occlusal preparations of tipped and severely rotated teeth so that when these cases are found in the mouth a dentist can place a torque bar that sits flat in the floor of the occlusal preparation and bends at the isthmus and then extends along flat surface of the proximal bar to between the vertical sidewalls.

Proximal bars and torque bars may be used in any desired combination to produce a direct dental bridge. Methods to produce direct dental bridges comprise steps of positioning a proximal bar to span from a mesial proximal preparation to a distal proximal preparation and positioning at least one torque bar in an occlusal preparation and covering the proximal bar and torque bar with a restorative material. The step of positioning at least one torque bar can include a first torque bar contacting a mesial occlusal preparation but not contacting a distal occlusal preparation, and a second torque bar contacting a distal occlusal preparation, but not contacting a mesial occlusal preparation. The step of positioning the proximal bar can be preceded by a step of cutting the proximal bar to be suitably sized to span and fit into mesial and distal proximal preparations.

Presently dentists are required to cut and size reinforcement bars for direct bridges by trial and error to slowly cut and trim to fit the proximal preparations of the abutment teeth. This is time consuming and not very precise.

The proximal preparation cannot be cut very deep in the mesiodistal dimension of a tooth as the nerve of the tooth is about 2.5 mm in from the surface of the tooth. Therefore, the proximal preparation which receives the proximal bar can only be cut 1 to 1.5 mm deep in the mesiodistal dimension leaving a ledge for the proximal bar of 1 to 1.5 mm deep.

To cut and trim the proximal bar to precisely fit this ledge by trial and error is very difficult. It is advantageous that as much of the ledge formed by the proximal preparation can be under the proximal bar and provide the most available support from this ledge to support the proximal bar. Therefore precise cutting to fit the proximal preparations is significant for both improving the support from the tooth and for saving chair time.

To help cut the proximal bar to a suitable length a device has been developed to take an impression of proximal preparation and then deliver and fix this impression to the proximal bar for trimming to size.

Figure 5:
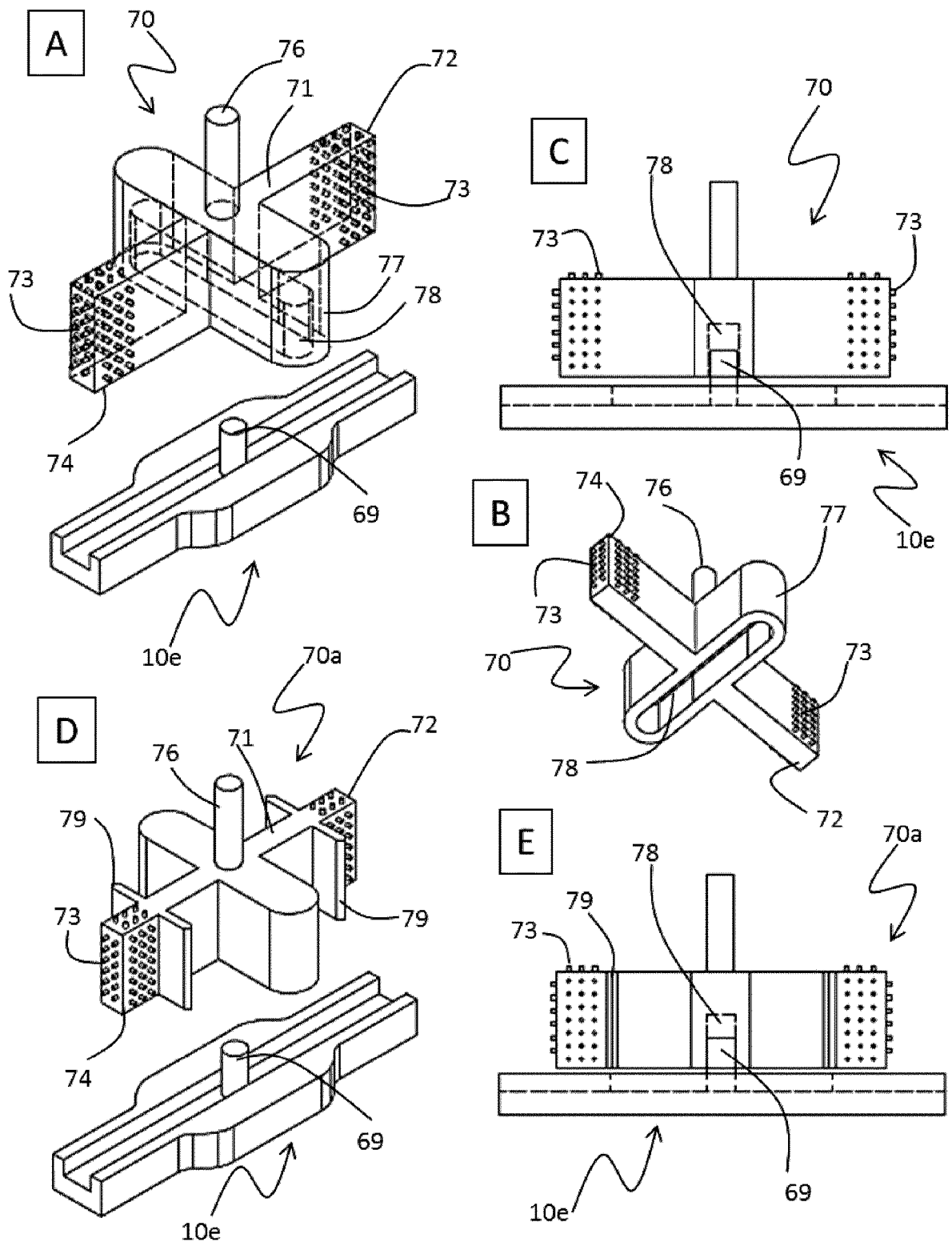
FIG. 5 shows (A) top perspective, (B) bottom perspective, and (C) side plan views of an impression taker bar; and (D) top perspective and (E) side plan views of a variant of the impression taker bar.

An impression taker bar 70 and its variant 70a are shown in FIG. 5. The terms impression taker and impression carrier may be used interchangeably and generally refer to an impression registration device. The impression taker bar is useful for registering an impression of the shape of mesial and distal proximal preparations and providing a carrier for transferring the impression information to the proximal bar for cutting the proximal bar to a suitable size and shaping ends of the proximal bar in accordance with the impression information. The impression taker bar 70 comprises an elongate bar 71 defining a longitudinal axis. The elongate bar 71 has a first longitudinal end 72 and a second longitudinal end 74. Both first and second longitudinal ends, 72 and 74, are configured to provide surface features 73 that promotes adherence of a moldable material 75 (shown in FIG. 6). Surface features 73 provide an uneven, rough or non-flat surface profile/relief so as to promote adherence of the moldable material to the first and second longitudinal ends. Surface features may be recessed (providing depressions or low relief in the surface) or extruded (providing elevations or high relief in the surface) or combinations thereof. Surface features may be characterized as friction-increasing or friction-enhancing elements. Surface features 73 may include, for example, nibs, pegs, ridges, spikes, blades, vanes, fins, protrusions, bolts, filaments, dimples, cavities, bores, gratings, serrations, corrugations, cross-hatches or any other suitable shape or textured pattern to provide a desired surface profile/relief.

As shown in FIG. 5, in order to correctly position the impression taker bar 70 with the proximal bar (shown as proximal bar 10*e*; a variant of proximal bar 10 shown in FIG. 1) for the step of cutting the proximal bar, central post 69 is inserted within and engages slot 78. Central post 69 extends in a coronal direction from a central location of the coronal facing surface of proximal bar 10*e*. The impression taker bar 70 forms a central chamber 77 at a central location along the longitudinal distance of elongate bar 71. Central chamber defines a slot 78 with the opening of the slot provided at an apical orientation of the impression taker bar 70. A handle 76 is also formed at a central location along the longitudinal distance of the elongate bar 71 extending in a coronal orientation, such that handle 76 and slot 78 are provided at opposing coronal and apical surfaces of the impression taker bar 70. FIG. 5A shows a perspective wireframe view of impression taker bar 70 from a coronal orientation with slot 78 shown in dashed lines, while FIG. 5B shows a perspective solid view of the impression taker bar 70 from an apical orientation. FIG. 5C shows a lateral-side (buccal-lingual) plan view of the impression taker bar 70 reversibly coupled with the proximal bar 10*e* by insertion of central post 69 within slot 78. Central post 69 extends in a coronal direction from a central location of the coronal facing surface of proximal bar 10*e*, while slot 78 provides an opening along an apical facing surface of the impression taker bar 70. Coupling of central post 69 and slot 78 provides for juxtaposition of the apical surface of the impression taker bar 70 with the proximal bar 10*e* and provides correct longitudinal alignment of the impression taker bar 70 and the proximal bar 10*e* to provide an accurate template for the step of cutting the proximal bar. Additionally, coupling of central post 69 and slot 78 allows for rotation and/or sideways translational movement relative to each other to allow for optimized positioning of the impression taker bar 70 with the proximal bar 10*e* prior to the cutting step.

FIG. 5D shows a perspective view from a coronal orientation of a variant 70*a* of the impression taker bar 70. The variant impression taker bar 70*a* is equivalent to the impression taker bar 70 except for addition of blocking plates 79 positioned near each of first and second longitudinal ends 72 and 74. Blocking plates 79 extend laterally from longitudinal bar 71 close to a longitudinal end with the portion of elongate bar 71 in between the blocking plate and longitudinal end providing surface features 73. The blocking plate 79 provides a barrier for resisting flow of moldable material from within a proximal preparation towards the center of the longitudinal bar 71. Blocking plate 79 can function as a cap or cover to help maintain moldable material with a proximal preparation during the stage of registering the impression information of mesial and distal proximal preparations. FIG. 5E shows a lateral-side (buccal-lingual) plan view of the impression taker bar 70*a* reversibly coupled with the proximal bar 10*e* by insertion of central post 69 within slot 78 in an equivalent manner as shown for impression taker bar 70 in FIG. 5C.

Figure 6:
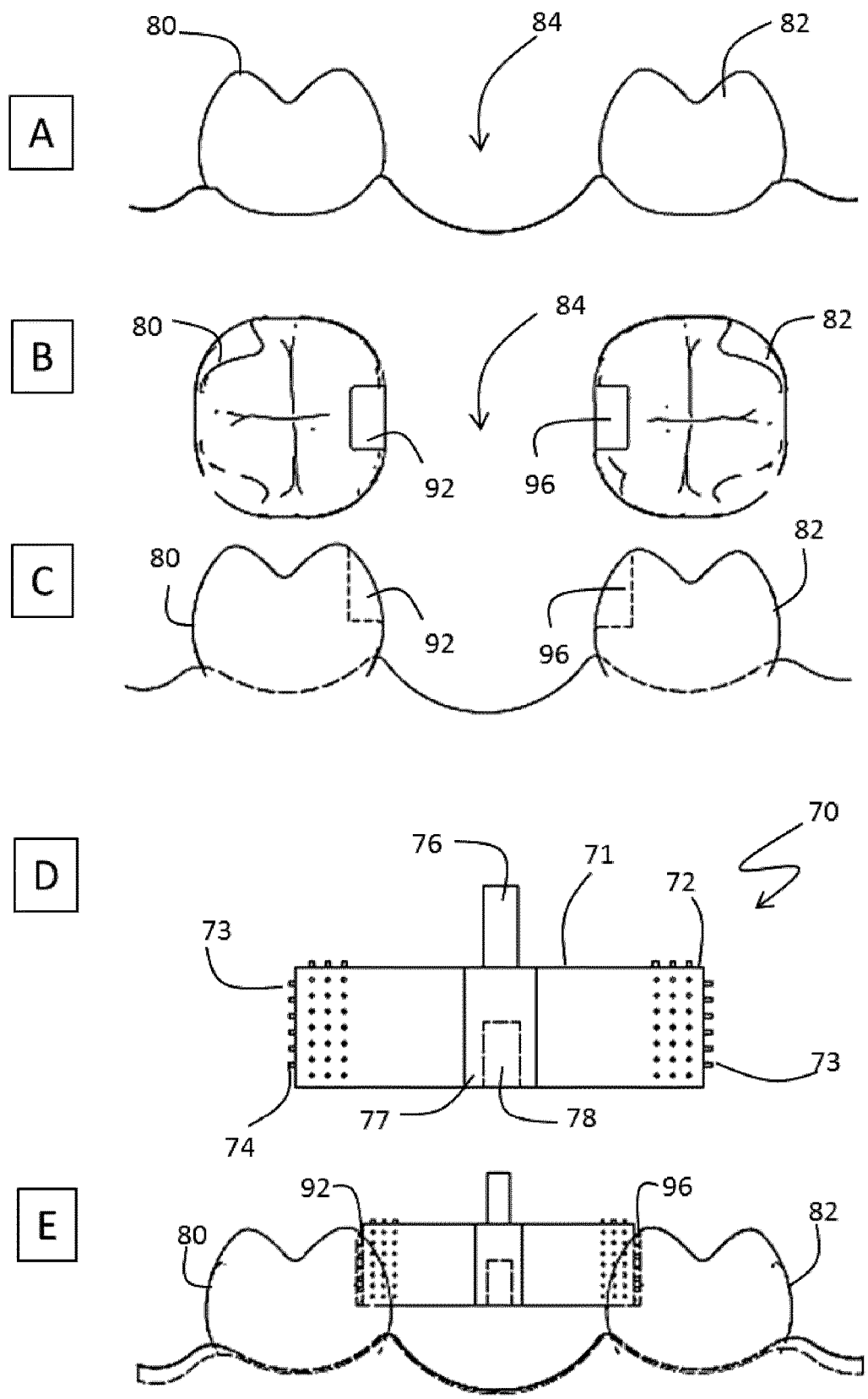
FIG. 6 shows a sequence of views (A to P) schematically illustrating operation of the impression taker bar to improve cutting of a reinforcement bar to span preparations cut into two abutment teeth.
Figure 6:
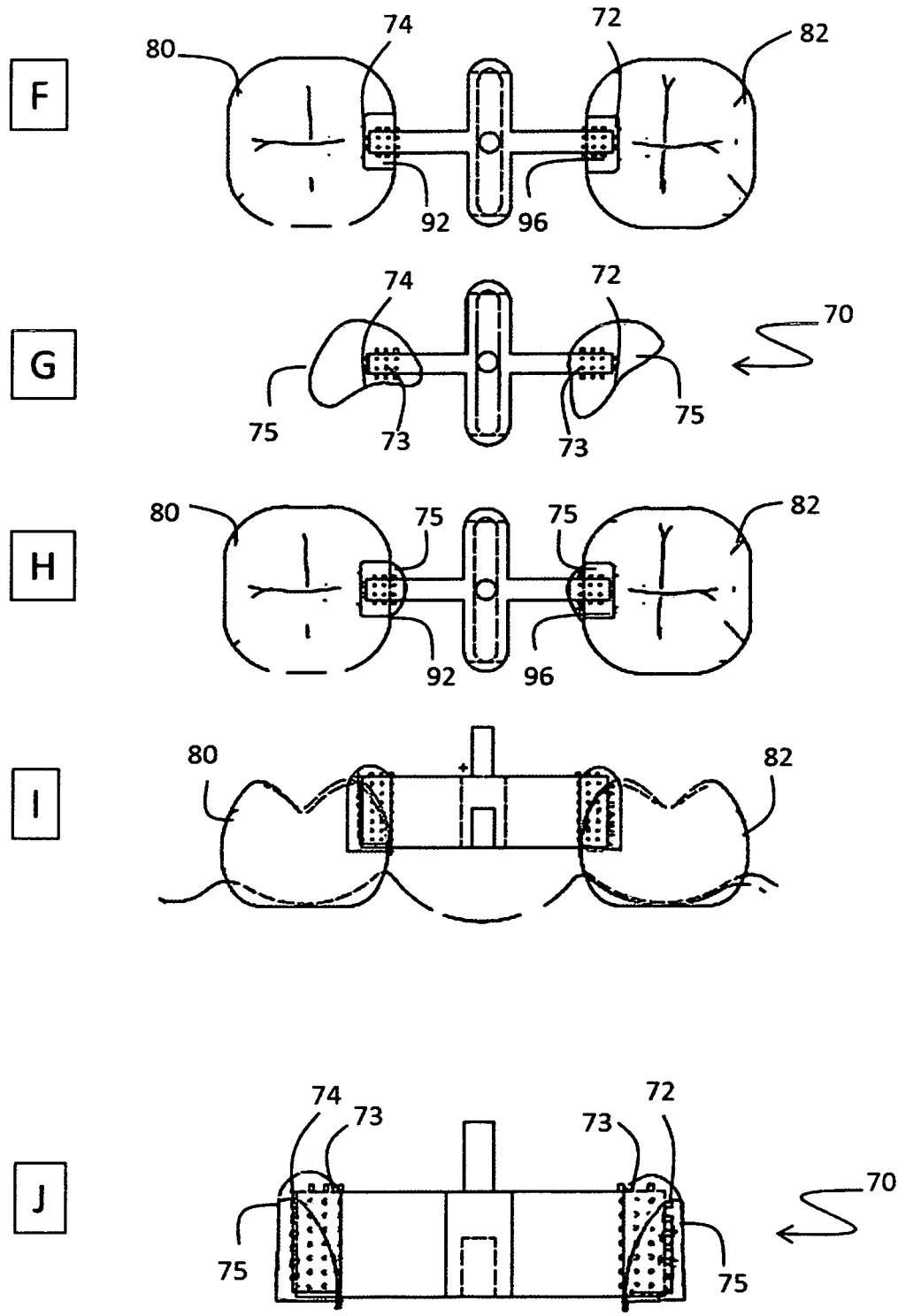
Figure 6:
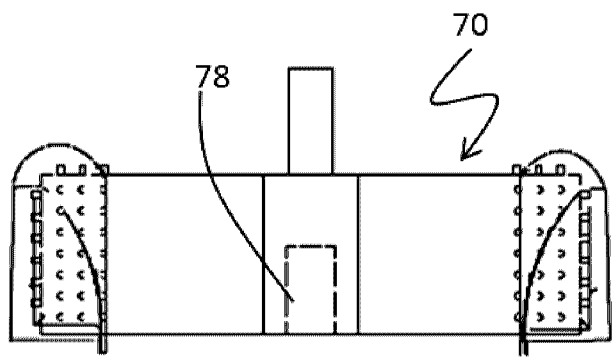
Figure 6:
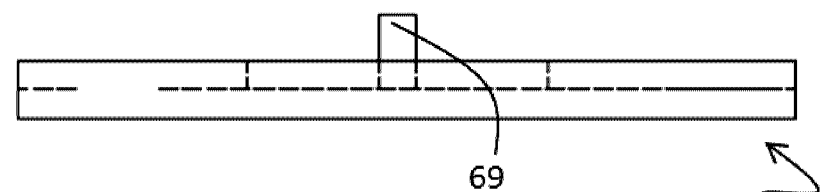
Figure 6:
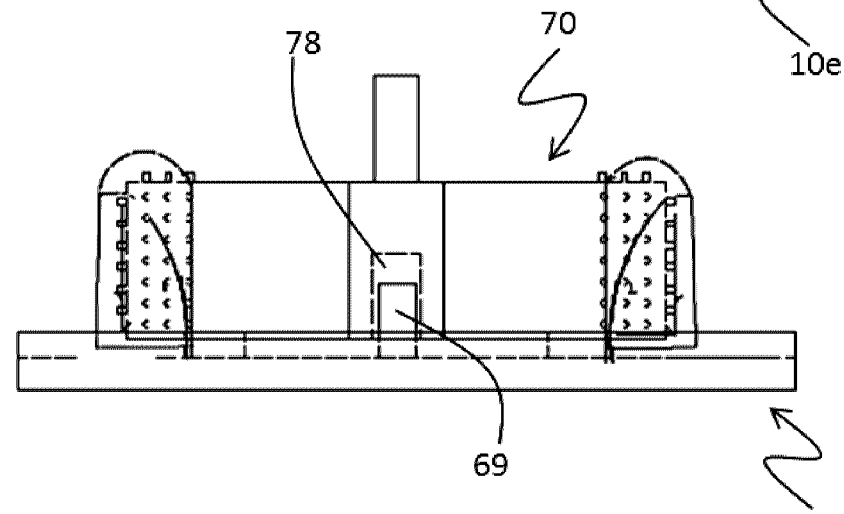
Figure 6:
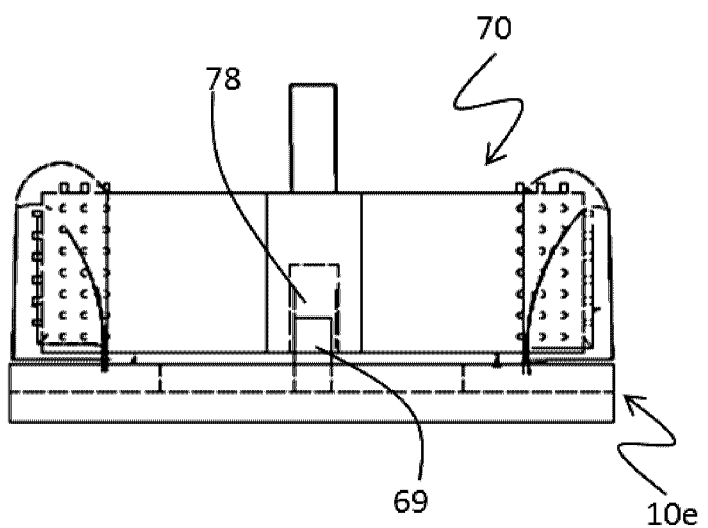
Figure 6:
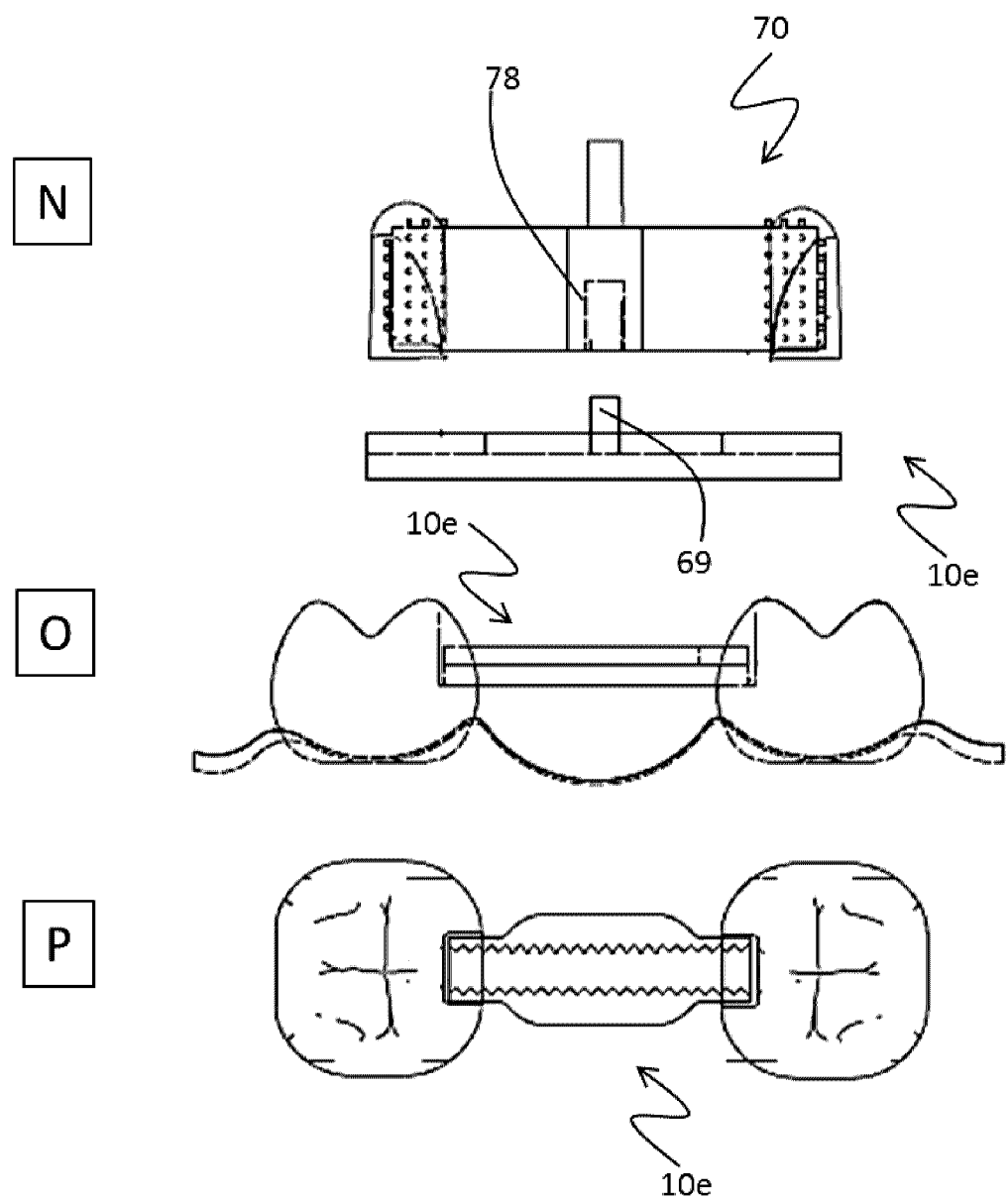

FIG. 6 shows a sequence of views (A to P) schematically illustrating operation of the impression taker bar 70 as a template for cutting of the proximal bar 10*e* to provide an improved fit of the insertion arms, and more specifically the longitudinal ends, of proximal bar 10*e* within mesial and distal proximal preparations.

FIG. 6A shows the side view of crowns of a molar 80 on the left and a bicuspid tooth 82 on the right and an edentulous space 84 in between. The molar 80 and bicuspid 82 teeth are termed abutments or abutment teeth. The molar 80 is the distal abutment tooth and the bicuspid 82 is the mesial abutment tooth. An edentulous space is a space where a natural tooth is missing and extends between the proximal surfaces of the abutment teeth.

FIG. 6B shows a top view (coronal view) of the same two abutment teeth shown in FIG. 6A—the molar 80 and the bicuspid 82—modified to form a distal proximal cavity preparation in molar 80 and to form a mesial proximal cavity preparation in the bicuspid 82. Proximal preparations are cut by a dentist using a rotary tool such as a dental drill actuating rotation of a suitable dental burr.

FIG. 6C shows a side view of proximal preparations, also called proximal cuts, into the abutment teeth. The distal proximal cavity preparation 92 is formed in the molar 80, while the mesial proximal cavity preparation 96 is formed in the bicuspid 82. Each proximal preparation is shaped to receive an end portion of a proximal bar. A combination or assembly of a proximal bar with one or more torque bars supports application and shaping of composite resin to form a direct dental bridge to span and fill the edentulous space 84.

FIG. 6D shows a lateral-side plan view (buccal view) of the impression taker bar 70. Once the proximal preparations are formed the impression taker bar 70 of suitable size is selected from a plurality or assortment of incrementally sized impression taker bars. The selected impression taker bar 70 is placed as shown in FIG. 6E with longitudinal ends 72 and 74 seated within proximal preparations 96 and 92, respectively, to assess and confirm that the selected impression taker bar 70 provides a suitable fit. Alternatively, the selected impression taker bar 70 can be cut to an approximate size to span the abutment teeth with longitudinal ends of the selected impression taker bar 70 suitably seated in both proximal preparations.

FIG. 6F shows a top view (coronal view) of the same arrangement shown in FIG. 6E—an assessment step to confirm that the selected impression taker bar 70 can be suitably positioned to have longitudinal ends seated in the proximal preparations.

As shown in FIG. 6G the selected impression taker bar 70 is then removed from the abutment teeth and moldable material 75 is placed on the each of the longitudinal ends, 72 and 74, with surface features 73 facilitating adherence of moldable material 75 to the longitudinal ends, 72 and 74. The central portion of the elongate bar 71 is devoid of moldable material as impression information is captured at the longitudinal ends that are seated in corresponding proximal preparations of abutment teeth. The selected impression taker bar 70 carrying moldable material 75 on both of its longitudinal ends is again positioned to span proximal preparations with longitudinal ends, 72 and 74, seated within proximal preparations 96 and 92, respectively. FIG. 6H shows a top view (coronal view) and FIG. 6I shows a lateral-side view (buccal view) of the selected impression taker bar 70 positioned to span the mesial and distal proximal preparations with moldable material 75 conforming to the shape of each of the proximal preparations.

Once the moldable material 75 is sufficiently cured or set to maintain the shape of the proximal preparations it is removed from the abutment teeth and as shown in FIG. 6J carries the impression information at its longitudinal ends and can be used as a template for cutting a corresponding proximal bar to size and shape suitable for the proximal preparations. Depending on the moldable material used the curing step could simply involve sufficient time to allow the moldable material to set or may include exposure to a curing activator such as UV radiation or heat.

As shown in FIG. 6K the selected impression taker bar 70 is aligned with proximal bar 10e to insert central post 69 of proximal bar 10e into slot 78 of the selected impression taker bar 70. FIG. 6L shows the impression taker bar 70 reversibly connected to proximal bar 10e through coupling of central post 69 and slot 78. The coupling of central post 69 and slot 78 supports motion of two degree of freedom—pivotal motion and sideways translational motion along the length of the slot. The pivot and translational motion allow fine adjustment of the juxtaposition of the impression taker bar 70 and the proximal bar 10e and provides tolerance for slight off-center placement of the impression taker bar 70 in the proximal preparations during the curing step (shown in FIG. 6H). Once the impression taker bar 70 and proximal bar 10e are suitably positioned proximal bar 10e can be conveniently cut to match the template provided by the cured moldable material ends of the impression taker bar, with the cut product shown in FIG. 6M.

Once the proximal bar 10e is cut to match the impression taker bar 70, the two components are decoupled and the cut proximal bar 10e is ready to be positioned to span the proximal preparations of the abutment teeth as shown in side view in FIG. 6O and equivalent top view in FIG. 6P.

Prior to development of impression taker bar 70 other methods of impression capture were tested and discarded. Initially, a method used currently by many dentists was tested in that the proximal bar was measured and cut manually by hand by trial and error fitting into the proximal preparation. Unfortunately, doing this by hand and trial and error yields inconsistent results, is prone to fitting errors and is time consuming.

A second method tested was to take impression of the proximal tooth preparations with a standard dental impression tray. However this second method wasted too much material and presented problems of proper alignment of the proximal bar against the impression to cut the proximal bar using the impression, again yielding inconsistent results prone to fitting errors.

A third method tested was a simplified version of the impression taker bar 70 that comprised a single elongate bar with moldable material applied to the ends of the single elongate bar and also into the proximal preparations with the ends of the single elongate bar placed into the proximal preparations until the moldable material sets. This approach reduces amounts of moldable material used to capture an impression compared to dental tray techniques—a significant advantage, as moldable material is expensive. Also, the smaller profile or size of a single elongate bar compared to a dental tray provides an improved alignment of the single elongate bar with the proximal bar. However, testing of the third method found that the proximal bar moves when it is being cut against the single elongate bar. To address the problem of movement during the cutting step, coupling of the proximal bar to the single elongate bar in a fixed manner was proposed. Development of the coupling concept to configure corresponding male and female coupling elements (for example, central post 69 and slot 78, respectively) led to development of an impression taker bar that can be reversibly coupled to the proximal bar, as provided for example in impression taker bar 70. Development of the coupling concept, also led to development of a clamp that provides jaw surfaces configured to engage and hold a reinforcement bar (for example, a proximal bar) and an impression taker on opposing jaw surfaces and moving the opposing jaw surfaces to a closed abutting position resulting in alignment of the reinforcement bar with the impression taker as shown for example in FIG. 7.

An impression taker comprises a rigid body supporting first and second longitudinal ends sized to fit loosely into a preparation in an abutment tooth.

By placing soft curable impression material on the ends of the impression taker and letting the material set in place in the preparations one can record the distance and the shape and precise spatial orientation of the preparations of the abutments to each other.

The impression taker with the cured impression material set in shape of the preparations of the abutments can be used to cut a reinforcement bar to size. Considering a proximal bar as an illustrative example of a reinforcement bar, insertion arms of the proximal bar have to be cut to fit the abutment teeth preparations. The central pad of the proximal bar is to be placed as close to the middle of the distance between the two abutment teeth preparations. In order to transfer this spatial orientation of the abutment teeth preparations to the proximal bar so that the reinforcement bar sits in the middle of the distance between the preparations, the longitudinal middle of the proximal bar ie the longitudinal middle of the central pad in the case of a proximal bar, is aligned with and/or placed against the longitudinal middle of the impression taker and held securely in place by manual force or by use of a tool such as a clamp. Once the impression taker and the proximal bar are aligned and secured together, the insertion arms of the proximal bar are cut to the orientation of the cured impression material shaped on the ends of the impression taker.

Alignment of the middle of the impression taker together with the middle of the reinforcement bar can be done by visual inspection and setting together by eye. To make it easier to approximate the parts by eye, reference indicia showing the middle of the parts can be used.

Once the parts are approximated properly then the impression carrier and proximal bar can be held together by hand to cut the proximal bar. However, because holding by hand may allow slight movement and shifting between the two parts during cutting, a method of holding the two parts so they do not shift during cutting would be to use a clamp or any other suitable dental tool for gripping or coupling an impression taker bar and aligning it and holding it stable with a proximal bar for the purpose of cutting the proximal bar.

A clamp to hold the impression taker and reinforcement bar together can be in any shape or form such as even a conventional pair of pliers, such as needle nose pliers. However to improve the ability of the clamp to hold the two parts conveniently and securely in place without shifting the two sides of the clamp can be configured to receive and secure the impression taker on one side of the clamp and the other side of the clamp can be configured to receive and secure the reinforcement bar being cut.

Also, the impression carrier and the reinforcement bar may have features added to them that allow them to better fixed to their respective sides of the clamp. For instance a post handle on the occlusal surface of the impression taker can fit into a female receptacle of one side of the clamp. The opposite side of the clamp can be have a slot placed into it to grip the sides of the reinforcement bar to hold it more fixed in place (for example see FIG. 7D).

Figure 7:
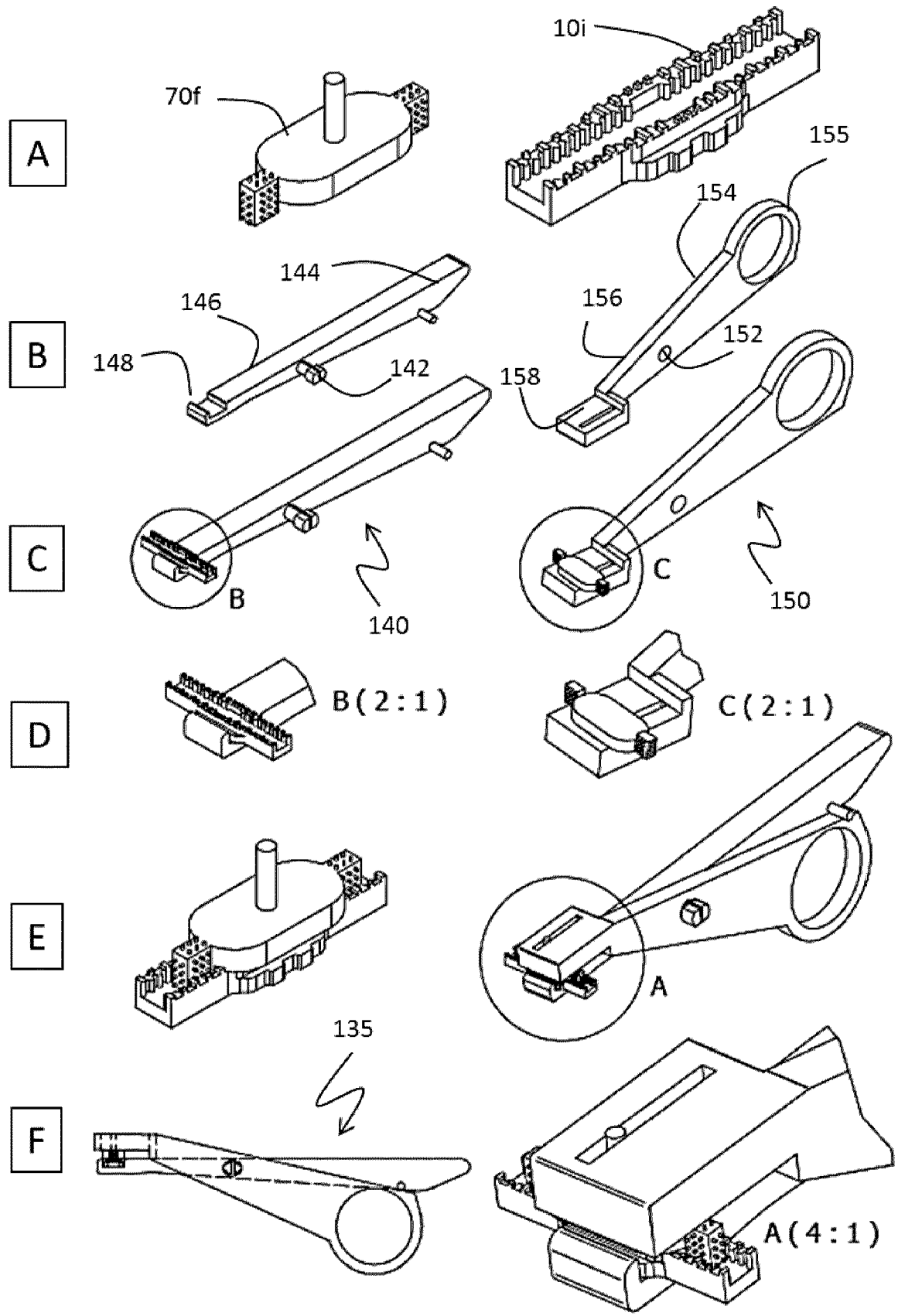
FIG. 7 shows a sequence of views (A to F) schematically illustrating operation of the impression taker bar and a clamp for holding the impression taker bar used to improve cutting of a reinforcement bar to span preparations cut into two abutment teeth.

FIG. 7 shows a sequence of views (A to F) schematically illustrating operation of the impression taker bar and a clamp for holding the impression taker bar used to improve cutting of a reinforcement bar to span preparations cut into two abutment teeth. FIG. 7A shows an impression taker 70*f* comprising a rigid body supporting first and second insertion arms each having an end configured to hold dental impression material with a post handle extending coronally from the rigid body. FIG. 7A also shows a modified proximal bar 10*i* (modified to remove a central post structure) described in greater detail with reference to FIG. 18. FIG. 7B shows a first arm 140 and a second arm 150 of a clamp 135. The first arm 140 has an elongate shape comprising a pivot pin 142 extending laterally from a central location, the pivot pin dividing the first arm 140 into a first handle portion 144 and a first jaw portion 146, the jaw portion having a free end forming a planar jaw tip 148 configured with a trough for interference snap fit of the central planar pad of proximal bar 10*i*. The second arm 150 has an elongate shape comprising a centrally located bore 152 sized for receiving pivot pin 142 to form a pivot joint, the bore 152 dividing the second arm 150 into a second handle portion 154—a finger grip 155 formed at a free end of the second handle portion—and a second jaw portion 156, the jaw portion ending with a planar jaw tip 158 configured with a slot for interference friction fit of the post handle of impression taker 70*f*. The first and second jaw portions combine to form a jaw section while the first and second handle portions combine to form a handle section. Rotational motion on pivot pin 142 controls movement of first and second panar jaw tips (148, 158) from a closed abutting position to an open position. Manual manipulation of clamp 135 rotates first jaw portion 146 relative to second jaw portion 156 so that first and second jaw tips are in an open position and inserts the impression taker 70*f* to engage the second jaw tip 158 and the proximal bar 10*i* to engage the first jaw tip 148 as shown in FIGS. 7C and 7D (shown with first and second arms separated for convenience of illustration; however in operation first and second arms would remain pivotally coupled). Further manual manipulation of clamp 135 counter rotates first and second arms to bring first and second jaw tips into a closed abutting position resulting in alignment of the impression taker 70*f* and the proximal bar 10*i* as shown in FIGS. 7E and 7D.

Figure 8:
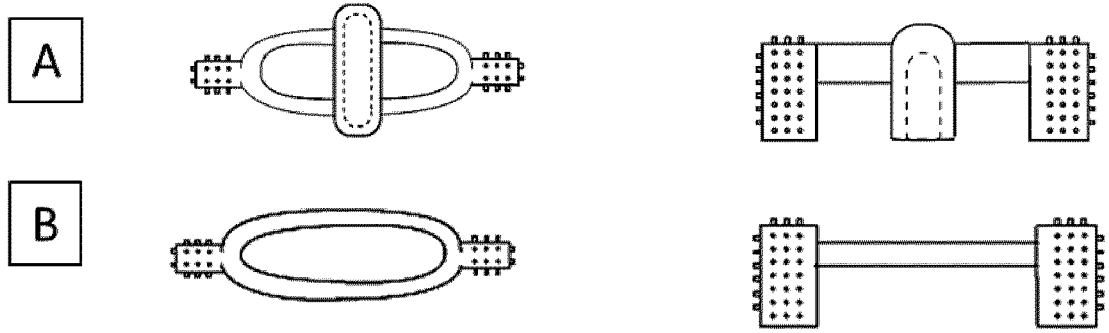
FIG. 8 shows coronal views and side views of a variant of the impression taker bar with (A) a reversible connecter for engaging a proximal bar, and (B) without the reversible connecter for engaging a proximal bar.

The impression taker can be provided in many different configurations provided that first and second ends holding moldable material are maintained. FIGS. 8 to 13 show illustrative examples of variant impression takers that demonstrate potential variation in shape and form that may be accommodated by the impression taker structure. FIG. 8A shows a coronal view and a side view of an impression taker where the rigid body is shaped as an elongate bar comprising a central elliptical ring with first and second arms extending from opposing points of the major (ie., longitudinal) axis of the elliptical ring, a central chamber formed along the minor (lateral) axis of the elliptical ring, the central chamber defining a slot with the opening of the slot provided at an apical orientation of the impression taker. FIG. 8B shows a corresponding impression taker that is the same as the impression taker in FIG. 8A except that the central chamber is removed.

FIG. 9A shows an impression taker where the rigid body is shaped as an elongate bar comprising a central rectangular cube with co-axial first and second arms extending from opposing points of a longitudinal axis of the rectangular cube, a central chamber formed along the lateral dimension of the rectangular cube, the central chamber defining a slot with the opening of the slot provided at an apical orientation of the impression taker. The rectangular cube functions as a solid rigid bite block with a corrugated surface formed on the occlusal face of the cube allowing the patient to gently close down on the corrugated surface to hold the impression carrier still while the impression material is setting. FIG. 9B shows a corresponding impression taker that is the same as the impression taker in FIG. 9A except that the central chamber is removed.

FIG. 10A shows an impression taker that is a modification of the impression taker shown in FIG. 5A with a stabilizing plate extending axially (longitudinally) from each of the longitudinal impression material holding ends. The stabilizing plate functions to sit on the occlusal surfaces of the abutment teeth so as to further stabilize the impression taker while the impression material is setting. FIG. 10B shows a corresponding impression taker that is the same as the impression taker in FIG. 10A except that the central chamber is removed.

Figure 11:
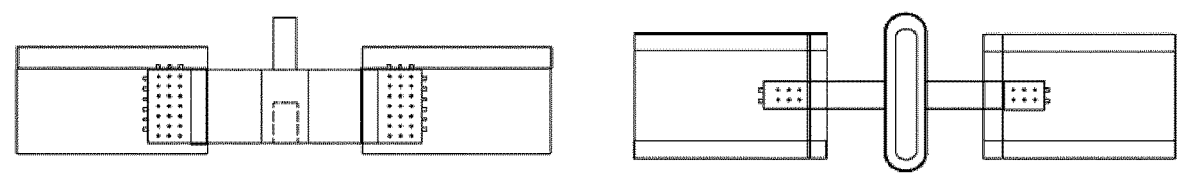
FIG. 11 shows a side view and an apical view of yet another variant of the impression taker bar.
Figure 12:
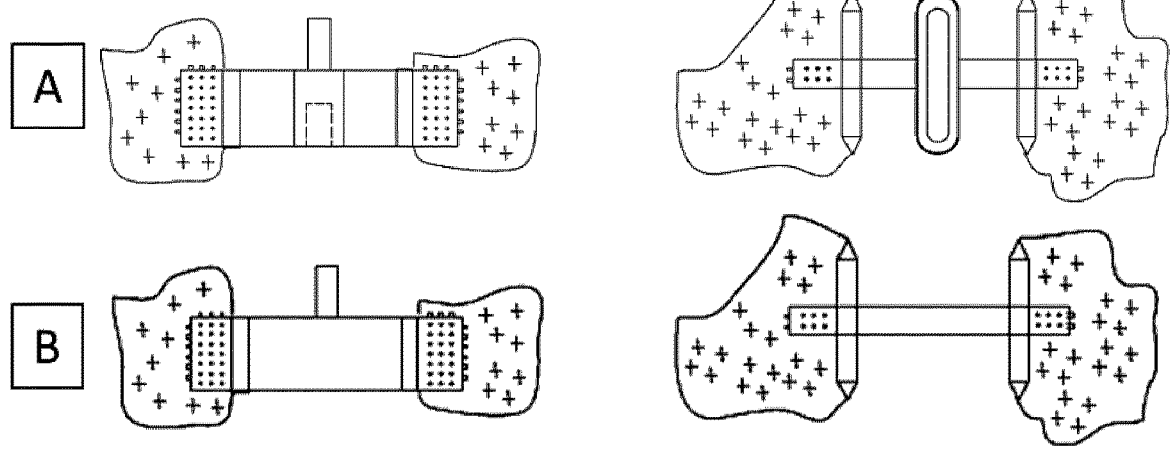
FIG. 12 shows side views and apical views of yet another variant of the impression taker bar with (A) a reversible connecter for engaging a proximal bar, and (B) without the reversible connecter for engaging a proximal bar.

FIG. 11 shows an impression taker that is a modification of the impression taker shown in FIG. 5A with an open ended box extending longitudinally from each of the longitudinal impression material holding ends. The open ended boxes can be filled with impression material and simultaneously take impressions of the proximal preparation and the occlusal preparations and if desired the outer surface of the abutment teeth.

FIG. 12A shows an impression taker that is a modification of the impression taker shown in FIG. 5D with heatable impression materials bonded at the ends. The heatable impression materials may be warmed to soften in hot water and then pressed into preparations of abutment teeth to cool and set and then removed to transfer the spatial arrangement of the preparations to the reinforcement bar. FIG. 12B shows a corresponding impression taker that is the same as the impression taker in FIG. 12A except that the central chamber is removed.

Figure 13:
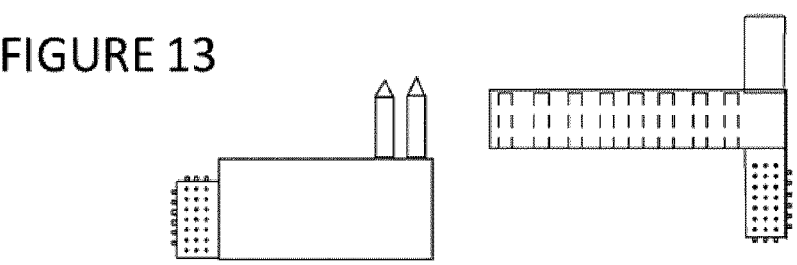
FIG. 13 shows side views of yet another variant of the impression taker bar providing adjustable longitudinal length of the impression taker bar.
Figure 14:
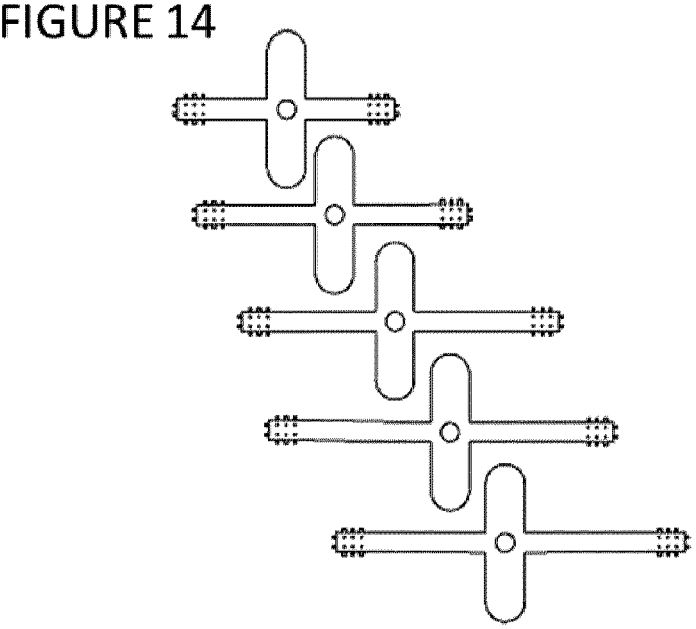
FIG. 14 shows a coronal surface view of a series of a plurality of the impression taker bars shown in FIG. 5A that may be provided in a kit, the plurality of impression taker bars arranged from top to bottom according to increasing longitudinal length.

FIG. 13 shows an impression taker which is provided in two reversibly attached parts that can be assembled together into differing lengths to fit between differing spans of the edentulous space. While in certain examples providing the dentist with a selection of different sizes of impression takers (as shown in FIG. 14 for example) to be selected to fit the length of the edentulous space is convenient, other examples may be suited to the impression taker shown in FIG. 13 provided in separate parts so it can be assembled in varying lengths for differing edentulous spans to serve the purpose of holding the spatial arrangement of the impression ends. This embodiment could function analogous to the reversible connecter part shown in FIG. 34C with each part of the two-part assembly shown in FIG. 13 forming part of the reversible connecter that gets smaller or larger to fit around opposing longitudinal ends of the central pad of the proximal bar as the edentulous space gets smaller or larger, respectively.

FIGS. 8 to 13 illustrate the significant variation in shape and configuration that may be accommodated by the impression taker. Still further variants will be recognized by others skilled in the art in view of the impression taker variations described herein.

Testing and experimentation based on the reinforcement bar combination shown in FIG. 2 has yielded several improvements to the proximal bar and/or the torque bars of the reinforcement bar combination.

Figure 15:
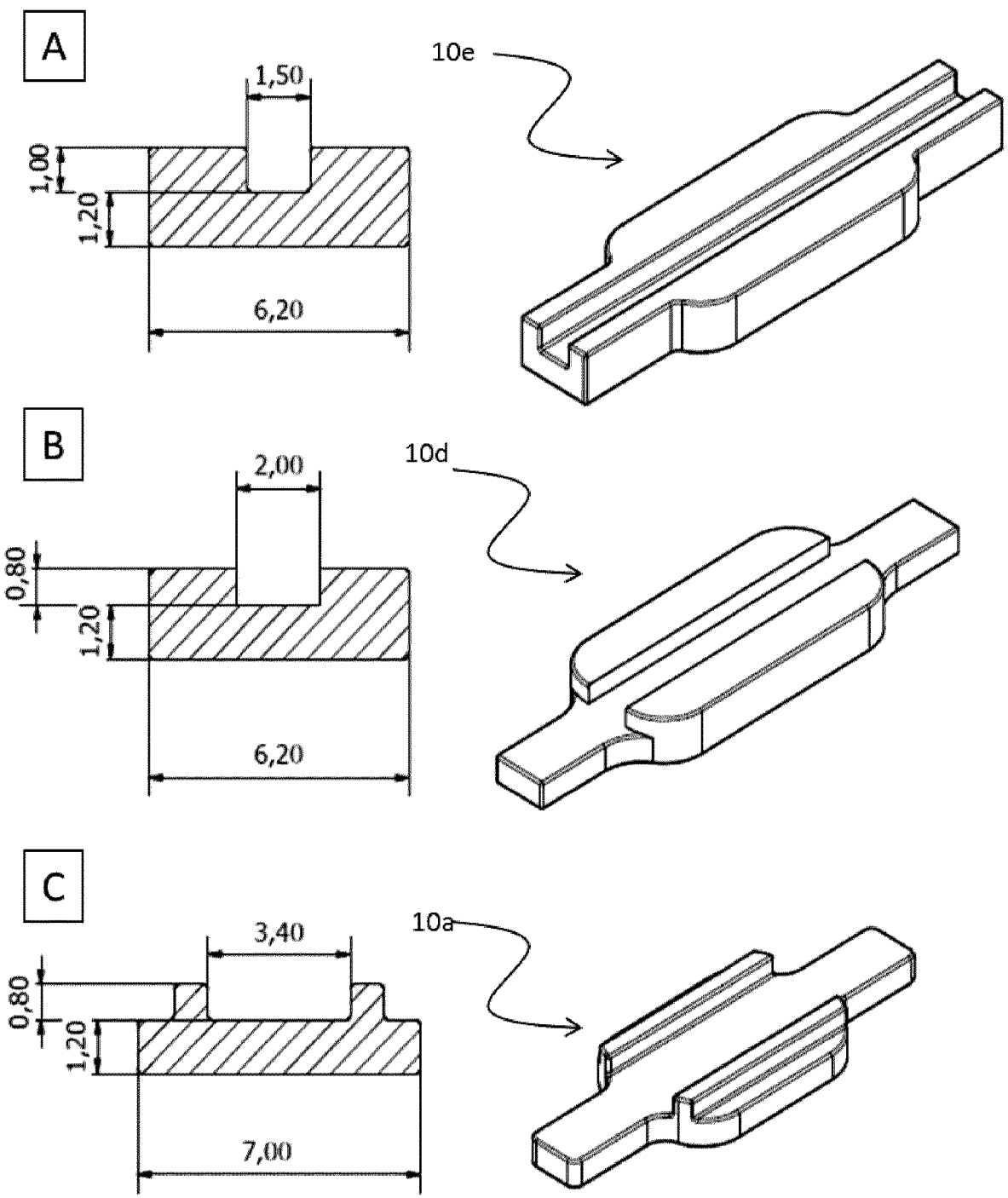
FIG. 15 shows isometric and lateral cross-section views of the proximal bar variant shown in FIG. 3E compared to corresponding views for two further variants of the proximal bar with illustrative dimensions indicated in millimeters.
Figure 19:
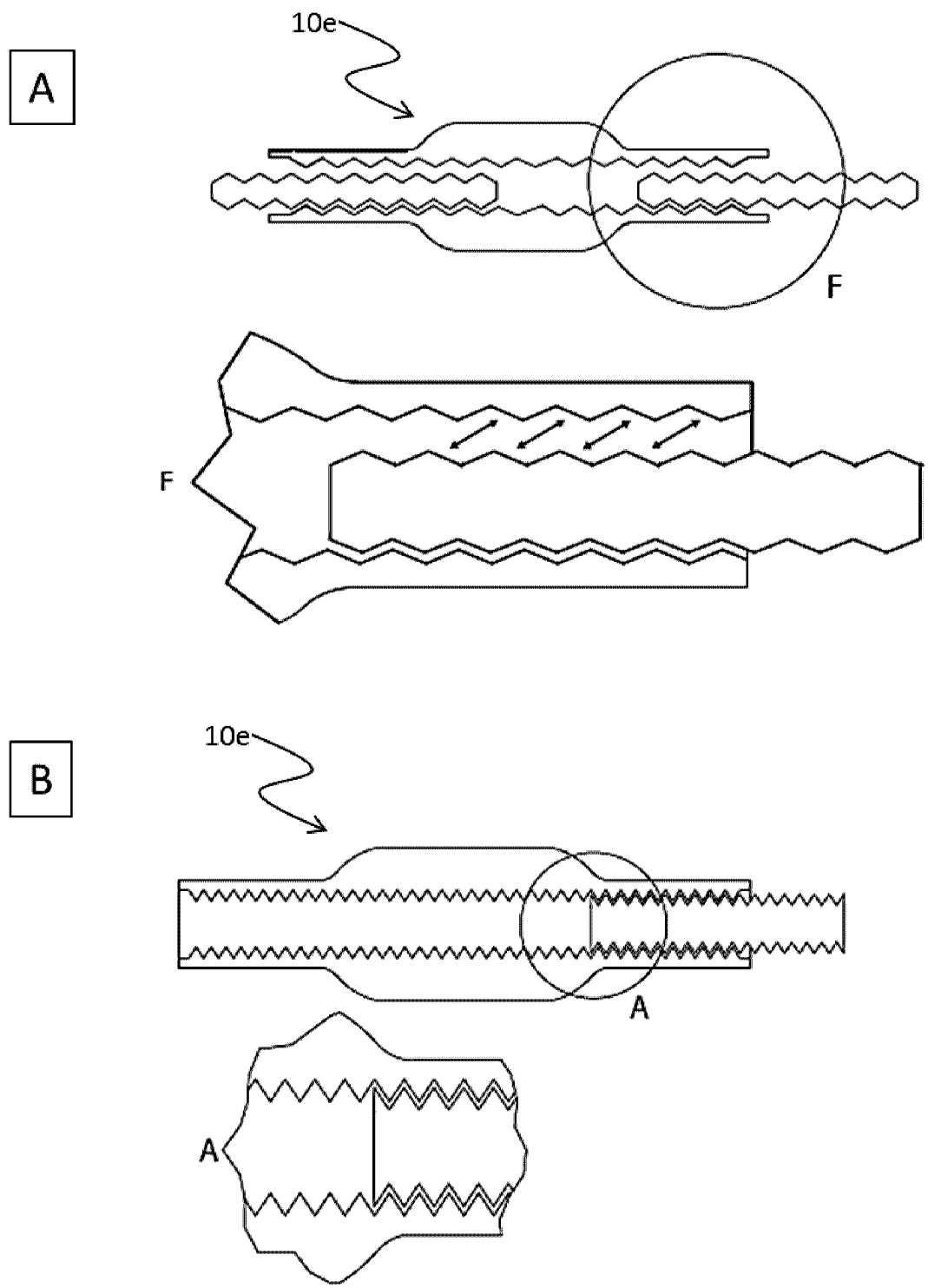
FIG. 19 shows the proximal bar shown in FIG. 15A modified to include surface features that (A) interact without direct contact with a corresponding mating surface features on a torque bar, and (B) directly interact with corresponding mating surface features on a torque bar.

The shape and orientation of vertical sidewalls of the proximal bar can be modified to suit a particular implementation and can readily deviate from the shape and orientation shown in FIG. 1 while not compromising their function as walls that directly or indirectly transfer resistive force to torque bars to provide resistance to torque or twisting forces exerted upon a direct bridge. For example, variant proximal bar 10*a* shown in FIG. 15C, variant proximal bar 10*d* shown in FIG. 15B, and variant proximal bar 10*e* shown in FIG. 15A, all deviate from the shape and/or orientation of vertical extensions in proximal bar 10 shown in FIG. 1 while maintaining function, and perhaps even enhancing function depending on the needs of a particular implementation. Based on testing of the reinforcement bar combination shown in FIG. 2 potential improvements were identified and developed as exemplified in further variants of the reinforcement bar combination described below, including for example modifications of proximal bar 10*e* (examples of modifications shown in FIG. 19).

The reinforcement combination of a proximal bar and two torque bars as shown in FIG. 2 was experimentally evaluated by stress testing a direct bridge constructed with this reinforcement combination.

The reinforcement combination parts shown in FIG. 2 were fabricated as ceramic parts. A porous coating of zirconia powder and pore formers was baked on these parts to produce a porous baked on coating. The purpose of the coating was to provide pores for the fluid bonding resin of the composite resin to flow into. Once the bonding resin that flows into the pores sets hard, it creates a grip between the ceramic reinforcement parts and the composite resin surrounding these parts.

The ceramic reinforcement parts were then placed on real teeth where the real teeth were fixed in acrylic. Composite resin was applied to and wrapped and shaped around the parts to form a dental bridge. The assembly of ceramic reinforcement combination and composite resin on real teeth mounted in acrylic were prepared in duplicate as two separate samples. Then these samples 1 and 2 were subjected to a 3-point bend test at Acuren testing labs in Brampton Ontario Canada.

The 3 point bend test of sample 1 fractured at 1.014 Newtons=228 pounds (lbs).

The 3 point bend test of sample 2 resulted in the assembly of sample 2 breaking at 1.081 Newtons=243 lbs. However during the test the composite resin on the parts cracked at 550 Newtons=123 lbs—and again at 700 Newtons=157 lbs While the test results compared favourably with conventional techniques of installing direct dental bridges, the cracking observed in sample 2 identified a potential to provide further improvements in direct dental bridge installation techniques. Without wishing to be bound by theory, from this experiment it was hypothesized that the cracking observed in the Acuren tests was allowed by the assembled bridge by;

1 the porous coating not providing enough grip on the composite resin and thus allowing the composite resin to slip or shear over the surface of the parts; and/or 2 the different ceramic reinforcement parts having a flat surface of one part opposing or across from flat surfaces of another part which may be allowing the parts to also slip past each other.

These samples tests showed that the coating that was supposed to provide the grip on the composite resin may not be providing sufficient grip.

FIG. 16A is a schematic diagram showing the direction of the shear forces on a dental bridge 220 and reinforcement bar(s) 222 in the bridge. As seen in FIG. 16A, if a pressure 224 is applied in the middle of the bridge 220, it will attempt to cause a flexing of the bridge 220 and its reinforcement bar(s) 222. The slight flex will cause a slight stretching of the bridge causing shear forces 226 and 228 along the long axis of the span of the bridge 220 and/or the reinforcement bar(s) 222.

A way of counteracting these shear forces to prevent slipping of the composite resin on the surface of the reinforcement bar(s) 222 is to create rises in the surface which are perpendicular to the long axis of the bridge.

Figure 16:
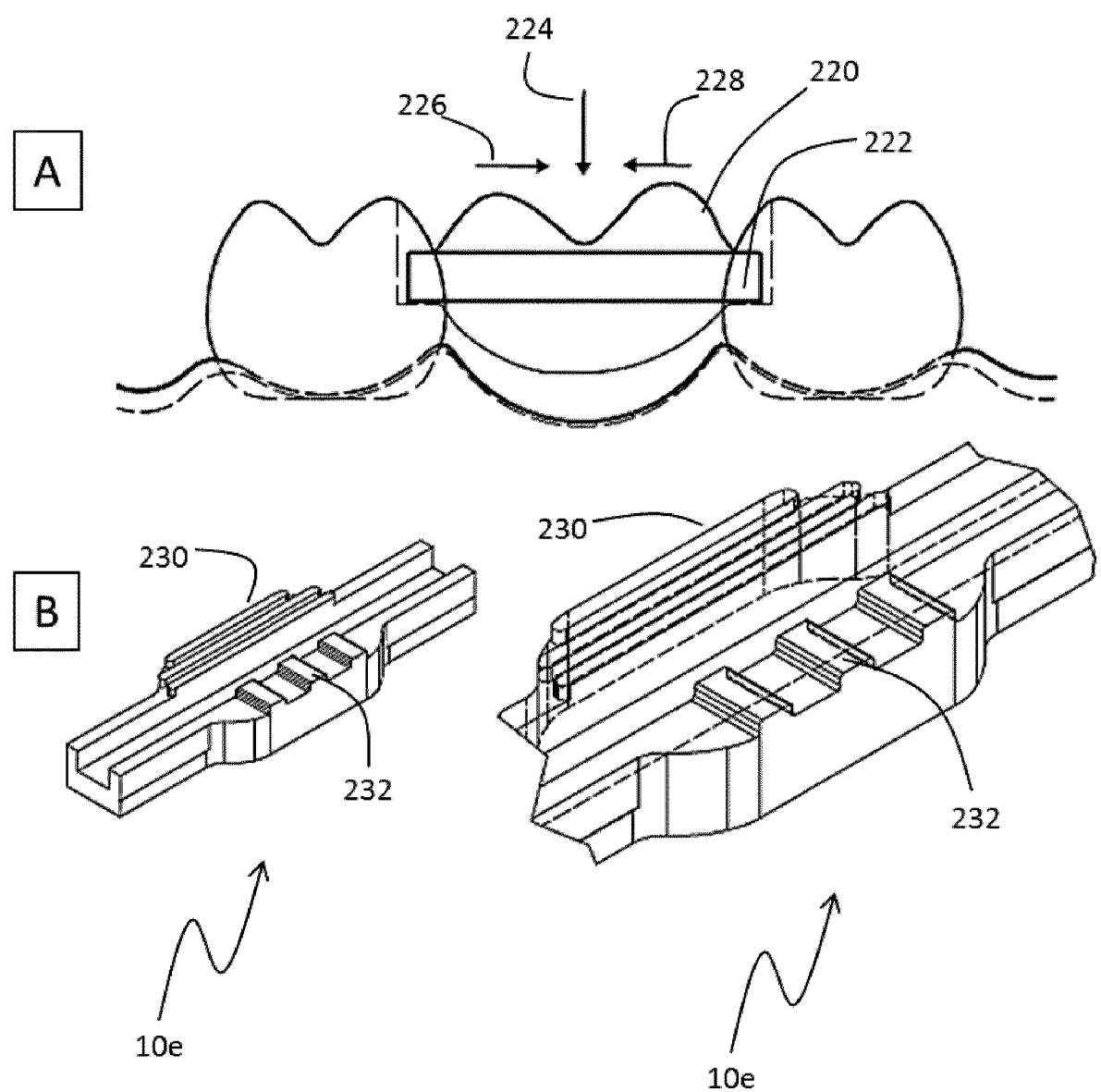
FIG. 16 shows (A) a schematic illustration of shear forces on a dental bridge and (B) a comparison of surface structures to resist shear forces.

FIG. 16 B show a proximal bar 10*e* modified to include two types of riser surface features—parallel risers 230 and perpendicular risers 232 relative to the direction of shear force. Parallel risers that are parallel with the direction of the shear force will not significantly resist the shear forces. Perpendicular risers that are transverse to the direction of the shear force improve resistance to shear forces.

Resistance of shear forces along the long axis of a proximal bar is not limited to riser surface features that have surfaces on the rises which are perpendicular to the long axis—other non-parallel angular orientations may also be effective.

Figure 17:
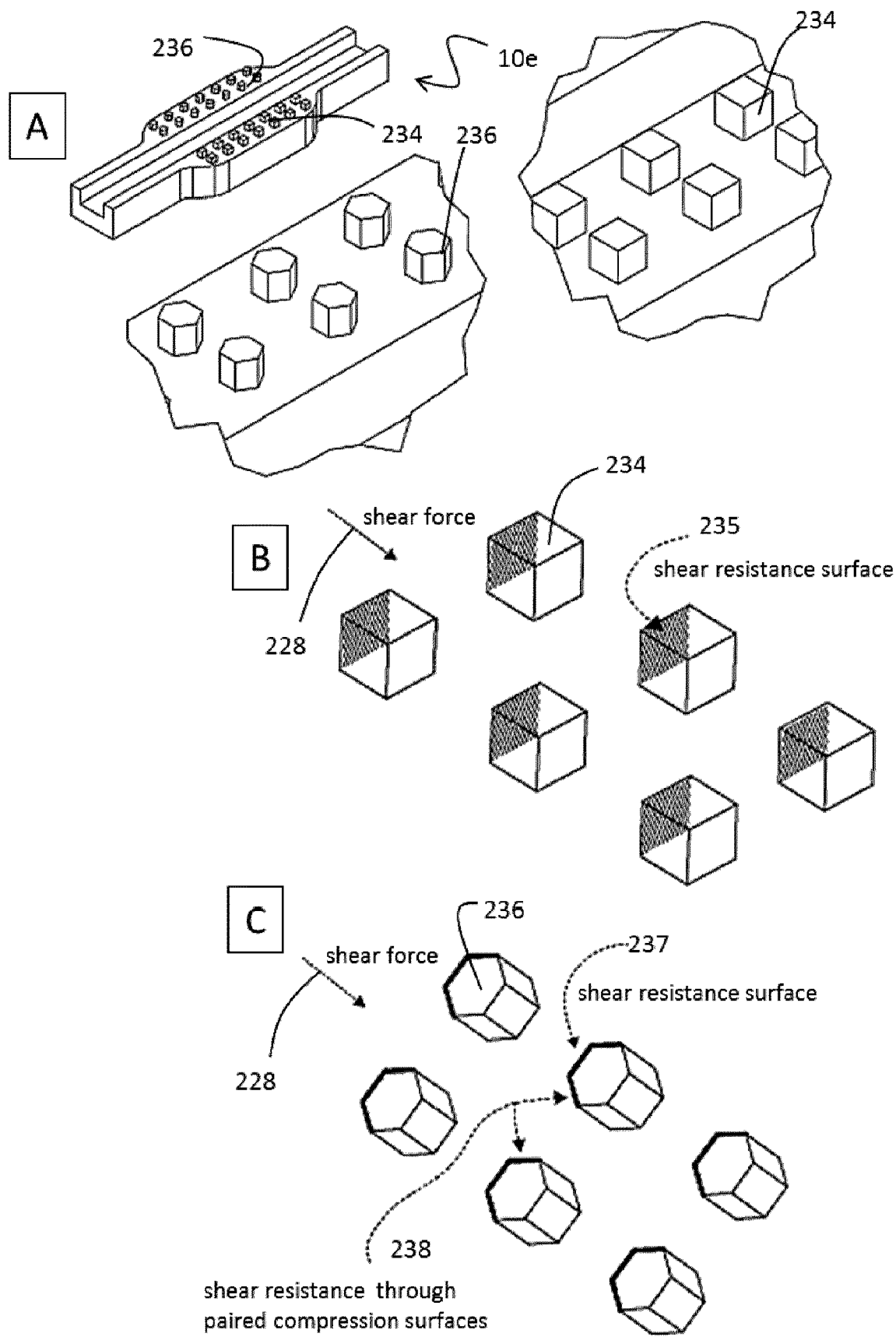
FIG. 17 shows (A) the proximal bar shown in FIG. 15A modified to include surface features useful for resisting shear forces, (B) schematic illustration of shear resistance for surface features perpendicular to the long axis of the proximal bar, and (C) schematic illustration of shear resistance for a pair of surfaces oriented 45 degrees to the long axis of the proximal bar.

Surface rises can be surface rows or ridges 232 as in FIG. 16B (on the proximal bar surface) or can be any other suitable shape including, for example a plurality of flat sided posts or columns as shown in FIG. 17.

FIG. 17 show proximal bar 10*e* modified to provide two types of posts on coronal facing surfaces—square shaped posts/columns 234 and hexagon shaped posts/columns 236. The square shaped posts 234 each have a surface 235 oriented perpendicular to the long axis of the proximal bar and perpendicular to the direction of shear force. Hexagon shaped posts have a surface 237 that is perpendicular to the long axis of the proximal bar as well as surfaces 238 that are 45 degrees to the long axis of the proximal bar.

FIG. 17C demonstrates that even though hexagons have surface angular orientations that are not perpendicular to the shear force, non-perpendicular angled surfaces can contribute to disruption of shear forces. Two angled surfaces, such as surfaces 238, on separate hexagon shaped posts which have narrowing distances between them in the direction of the shear force, will provide resistance to shear by directing the forces of shear onto the compressive strength of the composite resin between the two hexagon shaped posts. Resistance of shear force based on pairs of angled surfaces may be applied to any polygonal shape providing a suitably flat surface area formed in angular orientation to an expected direction of shear force.

Any shear force directed against both the angled surfaces (eg., surfaces 238) will be resisted by the narrowing distances between the angled surfaces by directing or deflecting the shear force against the composite resin between the surfaces, in effect trying to compress the composite resin between the surfaces and then gain shear resistance by deflecting the force onto the compressive strength of the composite resin. FIG. 17 is illustrated with reference to shear force 228; however, similar considerations of perpendicular and non-perpendicular surfaces relative to the long axis of the proximal bar can be applied to counter shear forces expected in opposing directions such as shear forces 226 and 228 depicted in FIG. 16A.

The surface features shown in FIG. 17 may be dimensioned to approach the dimension of surrounding composite resin expected to form a dental bridge. However, often the size of the surface features will be minimized to dimensions that are effective in preventing cracking from the shear forces, but do not approach the surface of the composite resin. Minimizing surface feature dimensions allows for shear resistance, without risk of the surface feature extending out of the surface of the composite resin. A minimum height for surface features for efficacy of shear resistance is about 0.05 mm.

The surface features, for example in the form of posts shown in FIG. 17, should have space for the composite resin to surround all sides of the post. Since the material of the reinforcement (commonly ceramic) is many times stronger than the composite resin, the thickness of the post can be small but the thickness of the composite resin around the post should be larger than the thickness of the post itself. Therefore, the spacing between surface features is often equal to or greater than the smallest dimension of the surface feature.

Not all composite resins have the same physical attributes and qualities. The use of angled surfaces which redirect the forces of shear onto the compressive strength of composite resin are of particularly important value when fabricating the bridge out of a composite resin which has high compressive strength but relatively lower tensile strength because the force is directed onto the compressive strength of the composite resin and reduced on the adhesive or tensile strength of the composite resin.

Not all composite resin in all areas of the world are of the same strength or quality. In countries of lower GDP inferior composites may be used. Therefore, risers providing pairs of surfaces at angular orientation where the distance between the surfaces narrows in the direction of the shear force can be helpful to improve the strength of the bridge when inferior composite resins are used.

Figure 18:
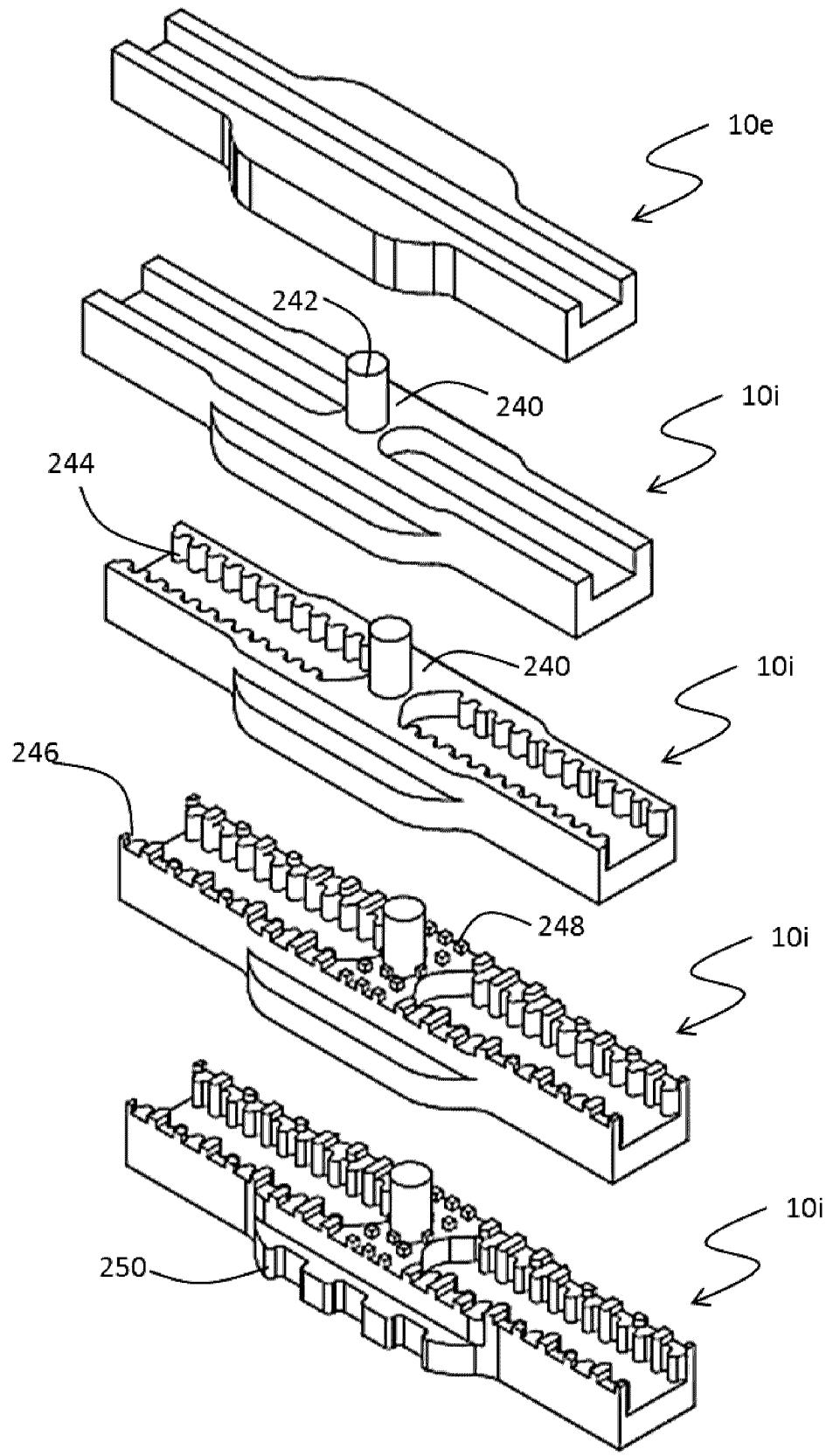
FIG. 18 shows a variant of the proximal bar shown in FIG. 15A and multiple modifications of the variant to include surface features that support improved performance in a dental bridge.

FIG. 18 shows various modifications of surface features that illustrate possibilities of locations of the proximal bar that can be used to provide surface features to disrupt shear forces when assembled in a dental bridge and resist slippage of composite resin across the surface of the proximal bar. Proximal bar 10e is shown as an example of a proximal bar that does not include specific engineered surface features intended to disrupt shear forces. Proximal bar 10i, in its simplest form provides a block 240 on the central planar pad that prevents communication of the coronal surfaces of the first insertion arm and the second insertion arm, thereby providing resistance to shear forces in both directions along the longitudinal axis of the proximal bar. Post 242 extending form block 240 is intended for reversible coupling with an impression taker bar and is not intended to contribute to disruption of shear forces. Proximal bar 10i can be further modified to provide a corrugated surface feature pattern 244 on the interior surfaces of the vertical sidewalls extending from the coronal surfaces of the first and second insertion arms. Repeating units of the corrugated surface feature pattern can take any convenient shape including, for example, patterns of sinusoidal, square, triangle or sawtooth waveforms. Proximal bar 10i can also be modified to form ridges 246 along the length or the coronal surface of the vertical sidewalls. As still another example, proximal bar 10i can be modified to form surface feature columns 248 extending from the coronal surface of block 240 of the central planar pad. As a further example, proximal bar 10i can also be modified to cut portions of the perimeter of the central planar pad to provide ridges 250 that disrupt shear forces when assembled in a dental bridge. Still may other surface feature modifications are contemplated, including surface features along the coronal surface of the first and second insertion arms.

A possible reason for cracking of the composite resin in the 3-point bend test by Acuren testing labs, was that the parts of the reinforcement bar combination shown in FIG. 2 may pull apart from each other or slide over or past each other when a weight is applied in the middle of the bridge causing a flex action which directs forces of stretch or shear along the long axis of the bridge in both directions.

Countering potential sliding or movement of parts of reinforcement bar relative to each other in an assembled dental bridge was identified as an aspect for an improvement of the reinforcement bar combination shown in FIG. 2. Such improvement could have significant impact in practice as anatomically, real teeth sit on periodontal ligaments which can be 1 mm thick, and periodontal ligaments are soft and give the abutment teeth a very slight ability to move independently of each other. Therefore, any unbalanced force on one abutment will attempt to pull on the bridge and apply forces which will attempt to separate the reinforcements and the teeth of the bridge.

It has been found that the reinforcement combination shown in FIG. 2 can be varied to provide an improved reinforcement combination.

With reference to FIGS. 19 to 26 several illustrative embodiments of improvements over the reinforcement combination shown in FIG. 2 are described. These illustrative embodiments provide one or more characteristics of:

1. a physical interaction between parts, for example, through complementary mating surfaces that can be directly engaged to create a joint, such as a ring and post joint or a ball and socket joint;

2a. surface features that disrupt or resist shear forces;

2b. mating surface features on the separate individual parts that do not make direct contact, but provide sufficiently complementary surfaces so that when a force of shear or stretch is applied to the assembled parts, the angles on the surface of the individual parts will direct the shear force onto the compressive strength of the composite resin lying between the parts; or 3. Using fibers to press and lock into teeth with the fibers interacting with surface features of the proximal bar.

An example of the second characteristic from the above list can be seen in FIG. 19A which shows a proximal bar 10e modified to form a corrugated surface feature pattern along the entire length of the interior surfaces of the vertical sidewalls, and a mating corrugated surface feature pattern along the length of the elongate torque bar. The lateral distance between the vertical sidewalls is sufficiently large that direct engagement or contact of the mating corrugated surfaces may not occur. However, even in the absence of direct contact opposing mating surfaces of the torque bars and the vertical sidewalls will direct forces to compress the composite resin between the torque bar and the sidewall. The arrows in the magnified section F show the compressive force that would be directed onto the composite resin in a case of an attempt to pull the torque bar and the proximal bar apart from each other as in the case of a stretch or a shear force on the bridge created when a downward force is placed on the bridge.

Figure 31:
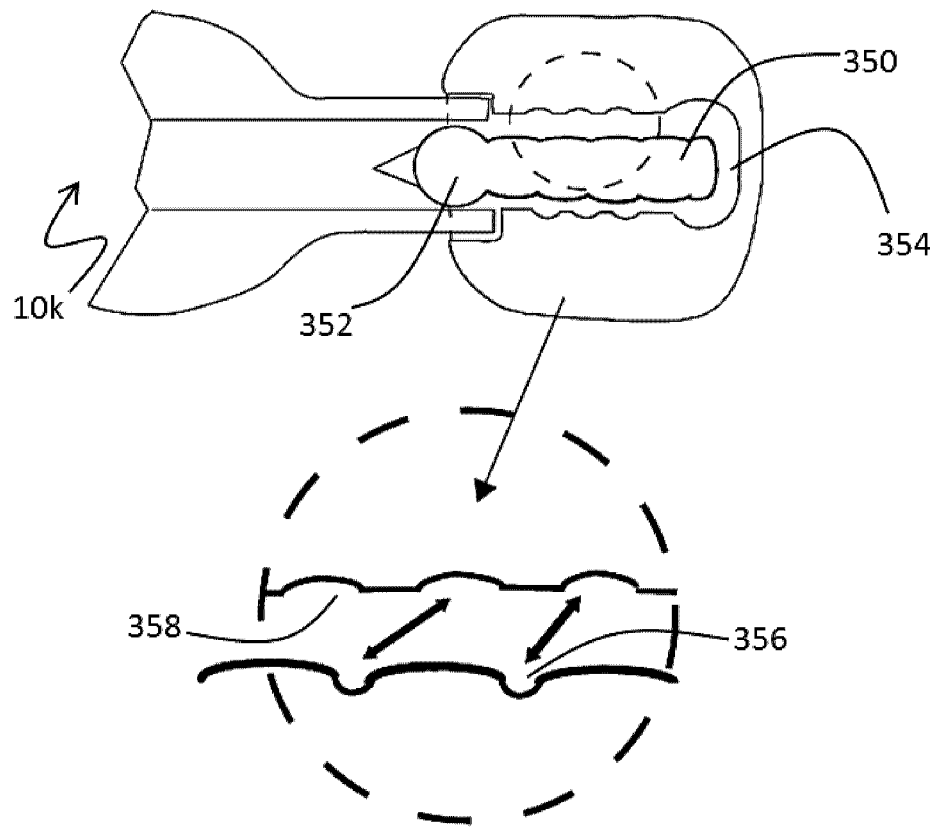
FIG. 31 shows a schematic illustration of a surface feature on a lateral surface of a torque bar that interacts without direct contact with a corresponding mating surface feature formed in an occlusal preparation in an abutment tooth.

Another example of the second characteristic can be seen in FIG. 31 which shows a complementary mating surface between a lateral surface of a torque bar and a corresponding surface of an occlusal preparation. The occlusal preparation may be cut with depressions in the side of the occlusal preparation and a dove tail at the closed end of the occlusal preparation so that the angles on the lateral surface of the elongate torque bar and the angles on the sides of the walls of the occlusal preparation will provide sufficiently complementary surfaces so that when a force of shear or stretch is applied to the assembled parts the angles on the surface the first longitudinal end of the elongate torque bar and the angles on the sides of the occlusal preparation will direct the shear force onto the compressive strength of the composite resin lying between the lateral sides of the elongate torque bar and the sides of the occlusal preparation.

An example of the first characteristic from the above list can be seen in FIG. 19B which shows a proximal bar 10e modified to form a corrugated surface feature pattern along the entire length of the interior surfaces of the vertical sidewalls, and a mating corrugated surface feature pattern along the length of the elongate torque bar. The lateral distance between the vertical sidewalls is sufficiently narrow that direct engagement or contact of the mating corrugated surfaces does occur fixing the torque bar relative to the proximal bar. However, direct engagement of the elongate torque bar to a fixed position may be inconvenient for tipped and misaligned teeth requiring an inconvenient range of bent torque bars to accommodate the variety of misaligned teeth experienced in practice. This inconvenience may be addressed by an elongate torque bar with a central portion that can be adjusted to one of several bent positions, for example adjustable from a straight position to a bent position that matches an angle of a misaligned tooth.

Alternatively, the first characteristic may be achieved by creating a joint between a torque bar and the proximal bar with the joint supporting a limited range of motion, for example rotational motion, of the torque bar relative the proximal bar prior to assembly in a dental bridge.

The challenge of creating a moveable joint between the parts is complicated by the needs of the parts to be able to be cut and fit into the teeth and assembled together into a bridge on teeth where the teeth themselves take on a large number of spatial arrangements due to the potential of tipping and rotating of the abutments.

Before a joint can be made between the proximal bar and the torque bar the following prior steps have to be accomplished.

The proximal bar has to be cut to size to fit into the abutment teeth. Then the torque bar has to fit into and in some way and engage with what is remaining after the proximal bar arm that was cut to size. Then the torque bar has to also be able to be placed in a rotated tooth or a tipped abutment tooth or both rotated and tipped abutment tooth.

Therefore, when creating a joint, the step of cutting of the proximal bar and the ability of orienting the torque bar in differing angles are considerations to be accommodated by the joint.

Figure 20:
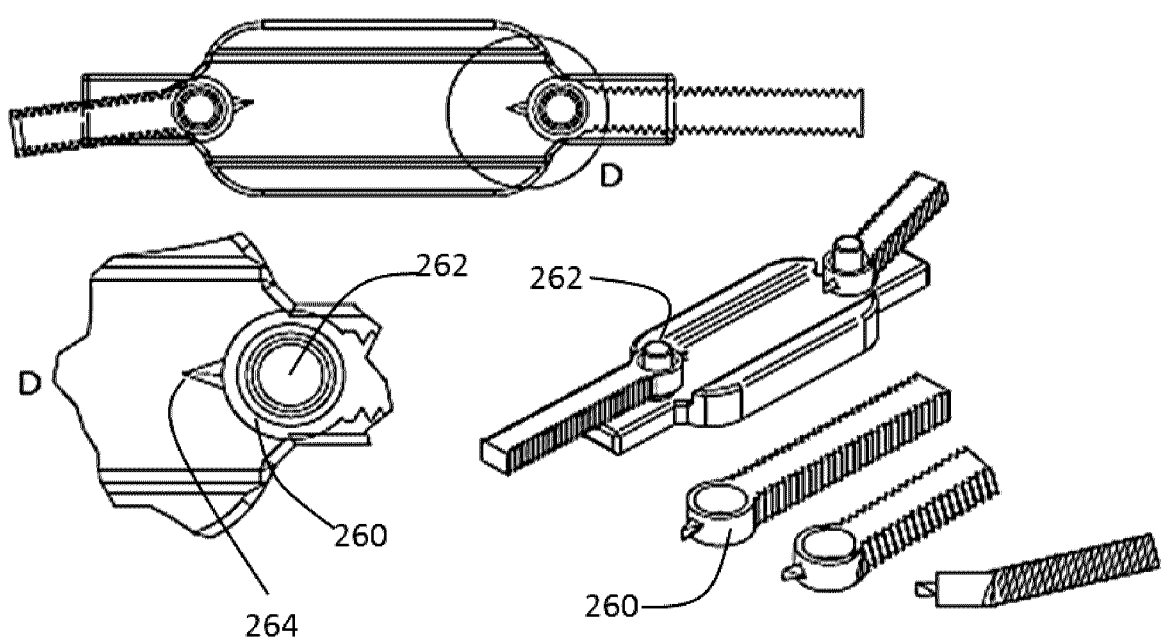
FIG. 20 shows yet another variant proximal bar that forms a ring-and-post pivot joint with a longitudinal end of a torque bar.

An illustrative embodiment considered for creating a joint between the torque bar and proximal bar was a ring and a post as seen in FIG. 20. The ring head 260 on the end of the torque bar receiving the post 262 supports rotational or angular adjustment in the buccal-lingual plane to accommodate for rotated teeth and the torque bar can be made in differing angles where the correct ring and bar angle can be chosen for differing tip angles of the abutments. A small torque resistance cone 264 can be placed on the tip of the ring, projecting radially from the ring. When the parts are assembled in composite resin a torque force may be directed around the post 262 but the torque resistance cone 264 will be engaged into the composite resin preventing the rotation around the ring and thus resist the torque force across the isthmus of the bridge. However, a potential complexity of this embodiment was that many different torque bars would have to be provided to the dentist to accommodate the differing angles of tip possible when building the bridge. To address this complexity, a ball and socket embodiment was considered.

A ball and socket joint for engaging the proximal bar and the torque bar would be advantageous as one single design of torque bar could be manufactured and provided to the dentist where the ball of the end of the torque bar would allow the rotation of the torque bar to be placed in any direction needed to accommodate the rotation and tipping of the abutment teeth.

Figure 21:
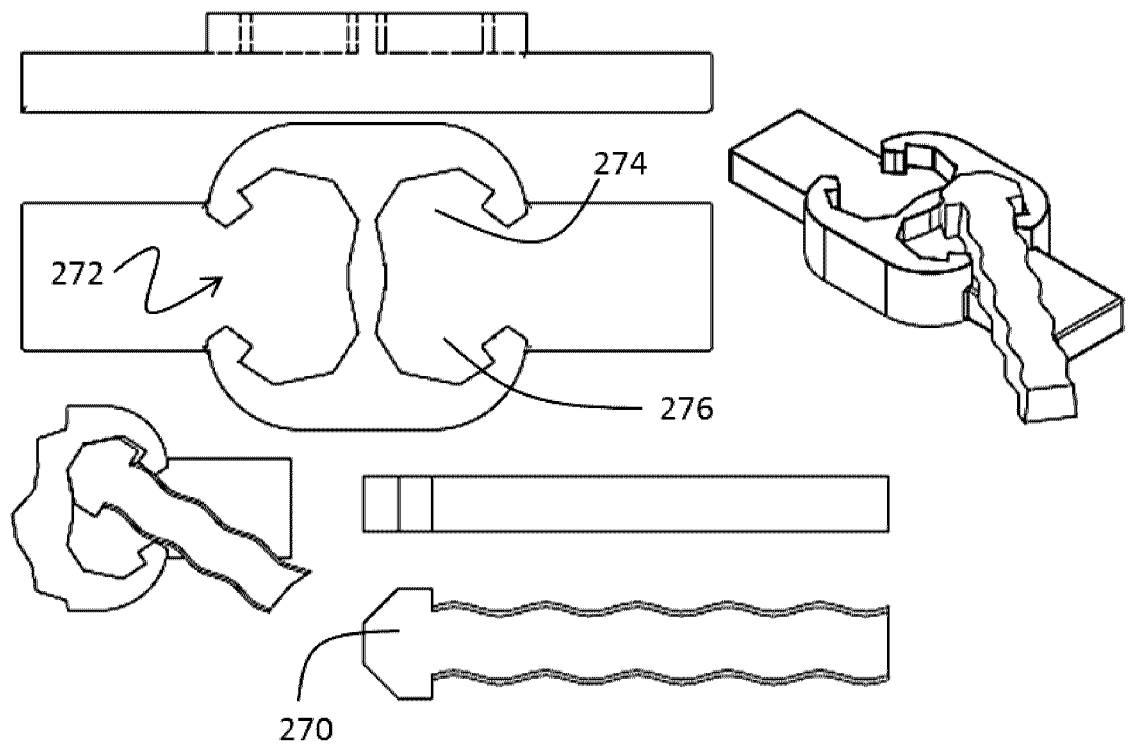
FIG. 21 shows yet another variant proximal bar that forms a ball-and-socket pivot joint with a longitudinal end of a torque bar.

FIG. 21 shows a first illustrative embodiment of this socket formed on the central pad of the proximal bar. The socket 272 is a dual end-position socket comprising two separate partial-sockets, 274 and 276 communicative with each other. The first partial-socket 274 defines a first end angular position for the semi-cylindrical head 270 of the torque bar. The second partial-socket 276 defines a second end angular position for the semi-cylindrical head 270. Due to communicative passage between the first partial-socket 274 and the second partial-socket 276, many different angular positions of semi-cylindrical head 270 and the torque bar can be accommodated in between the first and second end angular positions. Each partial-socket accommodates a range of angular positions.

Figure 22:
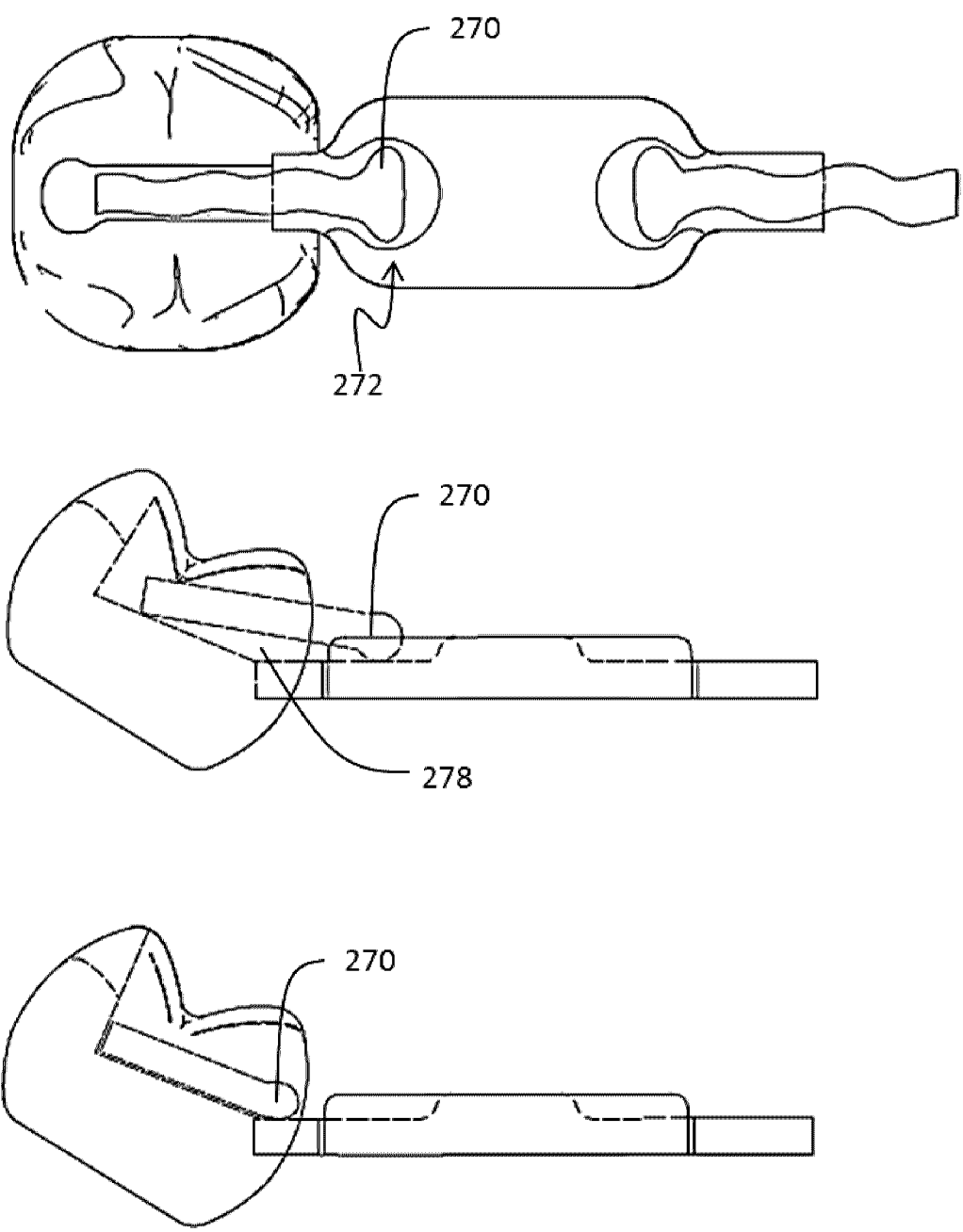
FIG. 22 shows a schematic comparison of the pivot joint shown in FIG. 21 located in the central planar pad versus located at the longitudinal end of the proximal bar.

Further investigation of the reinforcement combination shown in FIG. 21 identified a potential improvement. FIG. 22 schematically illustrates observations of the ball and socket mechanism shown in FIG. 21 in the context of tipped teeth. As shown, a ball and socket joint formed in the central planar pad does not allow optimal sitting of the torque bar in tipped teeth, as a space 278 may be remaining between the torque bar and the floor of the occlusal preparation.

FIG. 22 illustrates that to avoid spacing problems for tipped teeth the ball of the torque bar can be placed right at the start of the floor of the occlusal preparation and thus right on top of the end of the proximal bar insertion arm where the proximal bar insertion arm is cut to fit into the abutment proximal preparation. Therefore, if space 278 is to be optimally reduced the socket of the proximal bar has to be placed in the arm of the proximal bar. From this it was seen that to create a ball and socket that is versatile to fit in any direction of tipping and rotation then the complementary mating surface of the proximal bar could be formed on the insertion arm, for example vertical sidewalls on insertion arms to create a socket for the torque bar.

Figure 23:
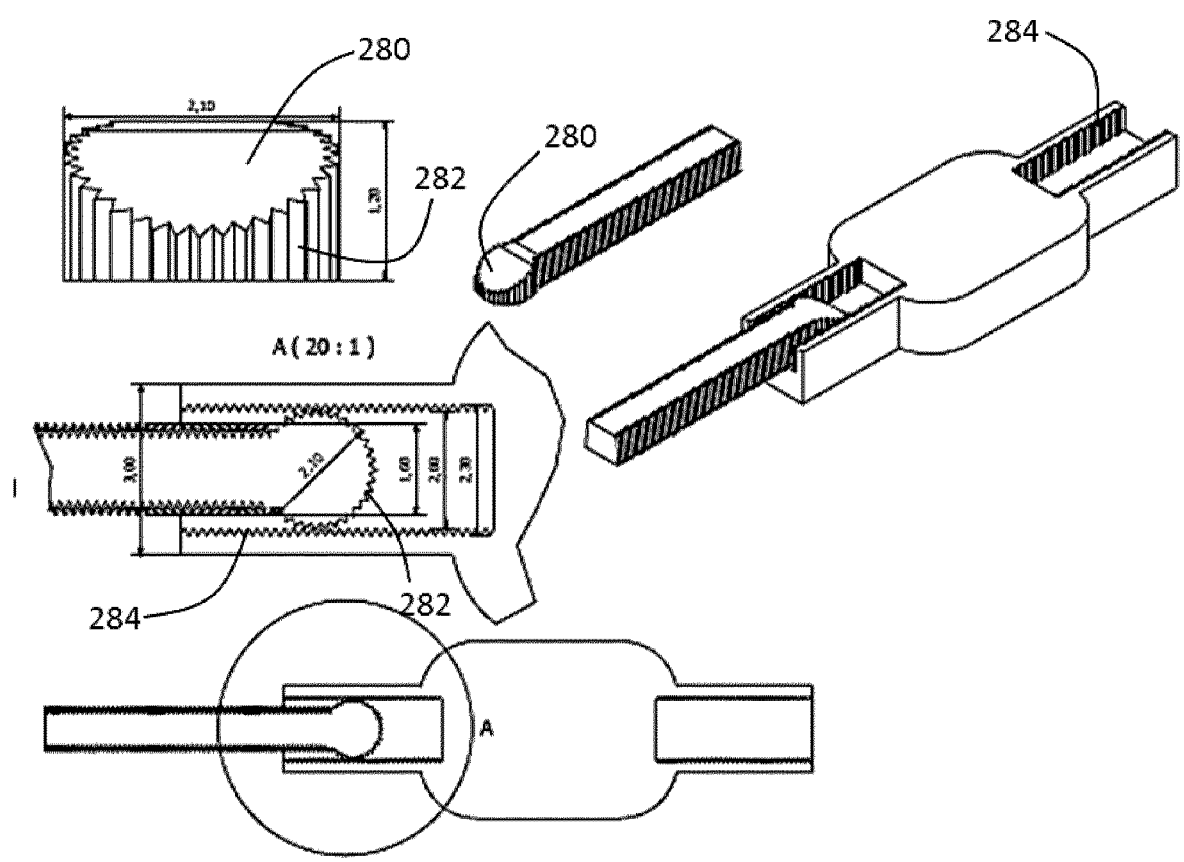
FIG. 23 shows yet another variant proximal bar that forms a multiple-position fixed-gear interaction with a longitudinal end of a torque bar.

FIG. 23 shows a ratchet design with vertical walls in the proximal arm and a torque bar with a cylindrical head 280 with circumferentially arranged triangle teeth edges 282 which allow the torque bar to placed in differing angles in a fixed-gear engagement with a corresponding triangle teeth 284 of a corrugated surface feature pattern of the interior surfaces of the vertical sidewalls, to accommodate rotation of the abutment tooth and engage into the teeth of the vertical walls of the proximal bar regardless of where the proximal bar arm is cut to length. Cylindrical head 280 provides a tapered or angled surface, supporting angular elevation for tipped abutment teeth.

Figure 24:
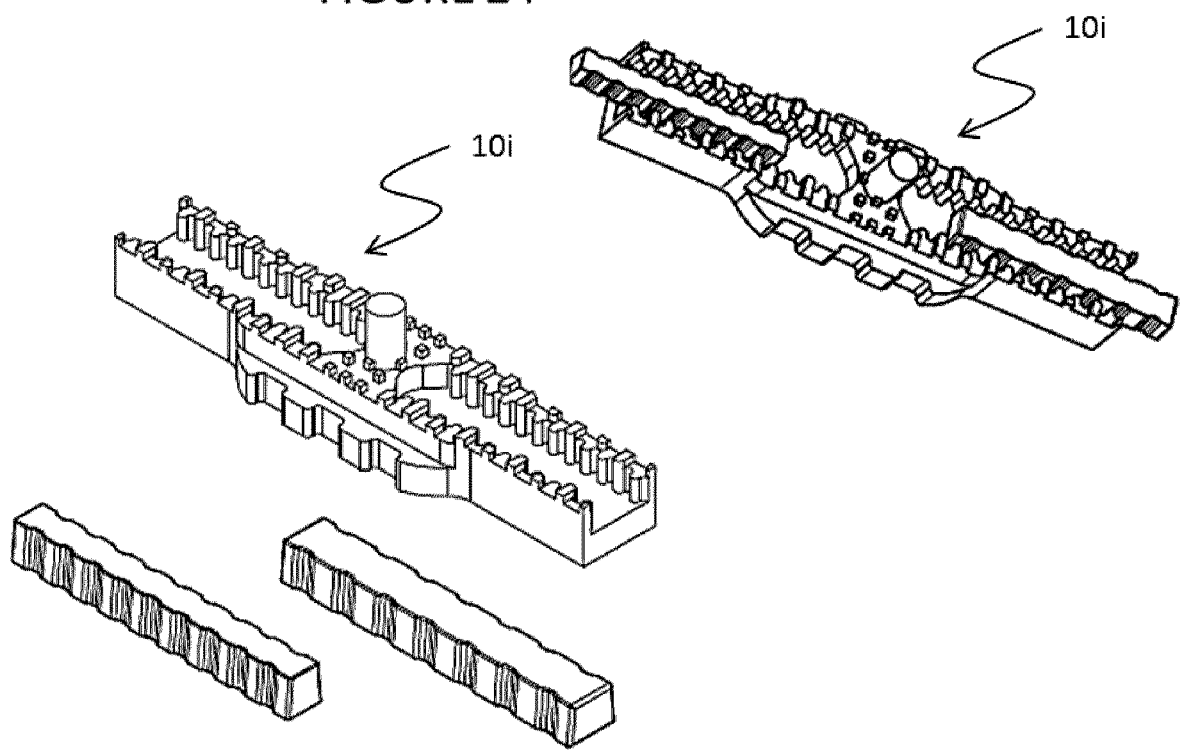
FIG. 24 shows the variant proximal bar shown in FIG. 18 and two corresponding elongate torque bars as used for performance testing in a dental bridge.

FIG. 24 shows a reinforcement bar combination including characteristics of mating surfaces between torque bars and interior surfaces of vertical sidewalls as well as surface features for countering shear force. This reinforcement bar was assembled in a dental bridge installation as several different samples and evaluated in stress tests at University of Toronto.

Table 3 shows comparative test results of samples of the reinforcement combination shown in FIG. 2 subjected to a 3-point bend test at Acuren in Brampton, Canada and the samples of the reinforcement combination shown in FIG. 24 equivalently tested at the University of Toronto (U of T) dental Laboratory in Toronto, Canada.

TABLE 3

Results of Three-Point Bend Tests on Bridge Prototypes

ACUREN BRAMPTON

| | Force at Fracture (N) | Imperial Conversion (lbs) | Notes |
|---|---|---|---|
| SAMPLE 1 | 1014 | 228 | |
| SAMPLE 2 | 1081 | 243 | Sample 2 Cracked at 550 N = 123 lbs & at 700 N = 157 lbs |

UNIVERSITY OF TORONTO

| | Force at Fracture (N) | Imperial Conversion (lbs) | |
|---|---|---|---|
| SAMPLE 2 | 1394 | 313 | No cracking of composite prior to failure |
| SAMPLE 3 | 1865 | 419 | No cracking of composite prior to failure |
| SAMPLE 4 | 1048 | 235 | No cracking of composite prior to failure |
| SAMPLE 5 | 1336 | 300 | No cracking of composite prior to failure |
| SAMPLE 7 | 2240 | 503 | No cracking of composite prior to failure |

The results in Table 3 show that the reinforcement combination shown in FIG. 24 with the surface rises and the torque bars with the angled surface features along the lateral sides were able to resist composite resin fracture at much higher forces on the assembled bridge than the reinforcement combination shown in FIG. 2 with the coating for adhesion. Without wishing to be bound by theory, the surface features of rises on the proximal bar contributed to disruption of shear force and mating angled surface features of the torque bar and vertical sidewalls contributed to create compression of the composite between the torque bars and the vertical sidewalls in the proximal bar during a shear force.

The FIG. 24 related samples tested also had MDP (10-Methacryloyloxydecyl di-hydrogen phosphate) Kuraray ceramic primer as an adhesive enhancer applied to the none coated surface of the reinforcement parts which also provided adhesive enhancement to the structure.

Further samples of the FIG. 24 reinforcement combination received other cyclical testing at U of T.

In one test 400 Newtons of force which is the equivalent of 90 lbs was applied to a sample at U of T dental laboratory 5 times per second for 55 hours for a totally 1,000,000 applications of force and the sample did not fracture and the composite resin did not crack.

In another test at the University of Toronto 1200 Newtons (=270 lbs) of force was applied to another sample every second for one hour for a total of 3600 applications of the force and it did not break or crack. Furthermore, the sample was then subjected to 1300 Newtons (=292 lbs) but fractured after 464 applications of force.

In a further test of the prototypes of FIG. 24, three separate samples were subjected to 450 Newtons (=101 lbs) of force applied 15 times per second for 5,000,000 applications of force and all 3 samples survived.

In an attempt to see what endurance stresses could be endured by prototypes of FIG. 24, three other separate samples were subjected to 20,000 applications of 700 Newtons of force which is equivalent to 157 lbs and all survived. Further stress tests to explore the limits of this prototype are proceeding.

The above tests have proven that the prototype shown in FIG. 24 can endure the forces experienced during use in the mouth.

These tests show that the reinforcement combination shown in FIG. 24 improves strength and resistance to composite resin cracking due, without wishing to be bound by theory, to the surface rises oriented angularly to the long axis of the proximal bar and/or to composite resin compression between mating surfaces of torque bars and vertical sidewalls.

The distance between the gingival seat of the proximal preparation on which the apical surface of the insertion arm sits is 4 mm below the occlusal surface of the pontic. There must be vertical space above the reinforcement bar for the composite resin. Therefore, there is only about 2 to 2.5 mm available for the apical occlusal dimension thickness for the reinforcements. Most of this thickness must be used for a solid reinforcement bar for strength for the bridge. This leaves very little vertical height to make effective surface features which resist shear forces between the composite resin and the reinforcement shown in FIG. 16 as 226 and 228.

The surface features could be made to be 1 mm high or as high as permitted without extending out through the surface of the composite resin, but preferably should be as short as can be to be effective in preventing cracking from the shear forces. The surface features on the occlusal surface of the pad and the occlusal surface of the vertical walls of the insertion arms for the prototypes tested at University of Toronto which resulted in no cracking were 0.3 mm and 0.4 mm high.

These surface features, shown as 248 in FIG. 18, were 0.3 mm high and, shown as 246 in FIG. 18, were 0.4 mm high occlusaly on the tested prototypes shown in FIG. 24. To provide shear resistance a surface feature will be sized to be at least about 0.05 mm in all dimensions. Typically, the surface feature will be greater than 0.1 mm, greater than 0.2 mm, greater than 0.3 mm or greater than any size therebetween in all dimensions.

The surface features in the form of posts should have space for the composite resin to surround all sides of the post. Since the material of the reinforcement (commonly ceramic) is many times stronger than the composite resin the thickness of the post can be small and the thickness of the composite resin around the post is typically larger than the thickness of the post itself.

The posts 248 in FIG. 18 as tested at U of T were 0.4 mm long by 0.4 mm wide and 0.3 mm high. Maintaining spacing between the posts that is larger than at least one dimension of the post reduces risk of the composite resin between the posts breaking under the shear forces. For the U of T testing the composite resin was about 0.4 mm to about 1.0 mm thick on the sides around the posts. Typically, spacing in between surface features is about equal to or greater than half (50%) of at least one dimension of the surface features. In illustrative examples, spacing in between surface features is about equal to or greater than at least one dimension of the surface features.

The third characteristic from the above list relates to using fibers and surface features in the proximal bar to frictionally engage the fibers.

Although fibers can be difficult to apply fibers can be used with a proximal bar to help lock or hold the assembly of the proximal bar and the fibers and tooth together to prevent and reduce the shear forces on the composite resin to reduce cracking.

Figure 25:
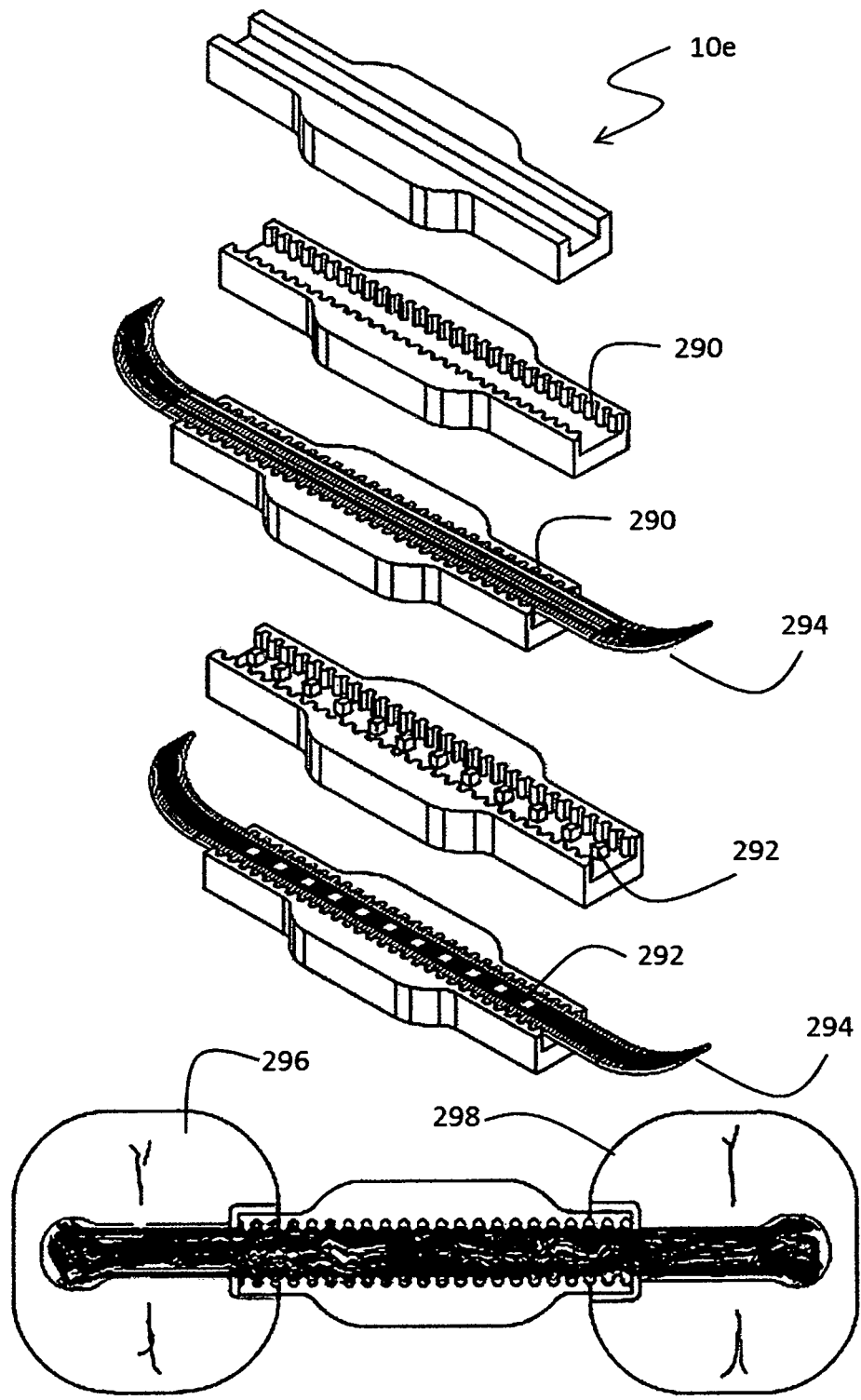
FIG. 25 shows the proximal bar shown in FIG. 15A modified to include surface features that improve a combination of the proximal bar with dental fibers to assemble a dental bridge.
Figure 26:
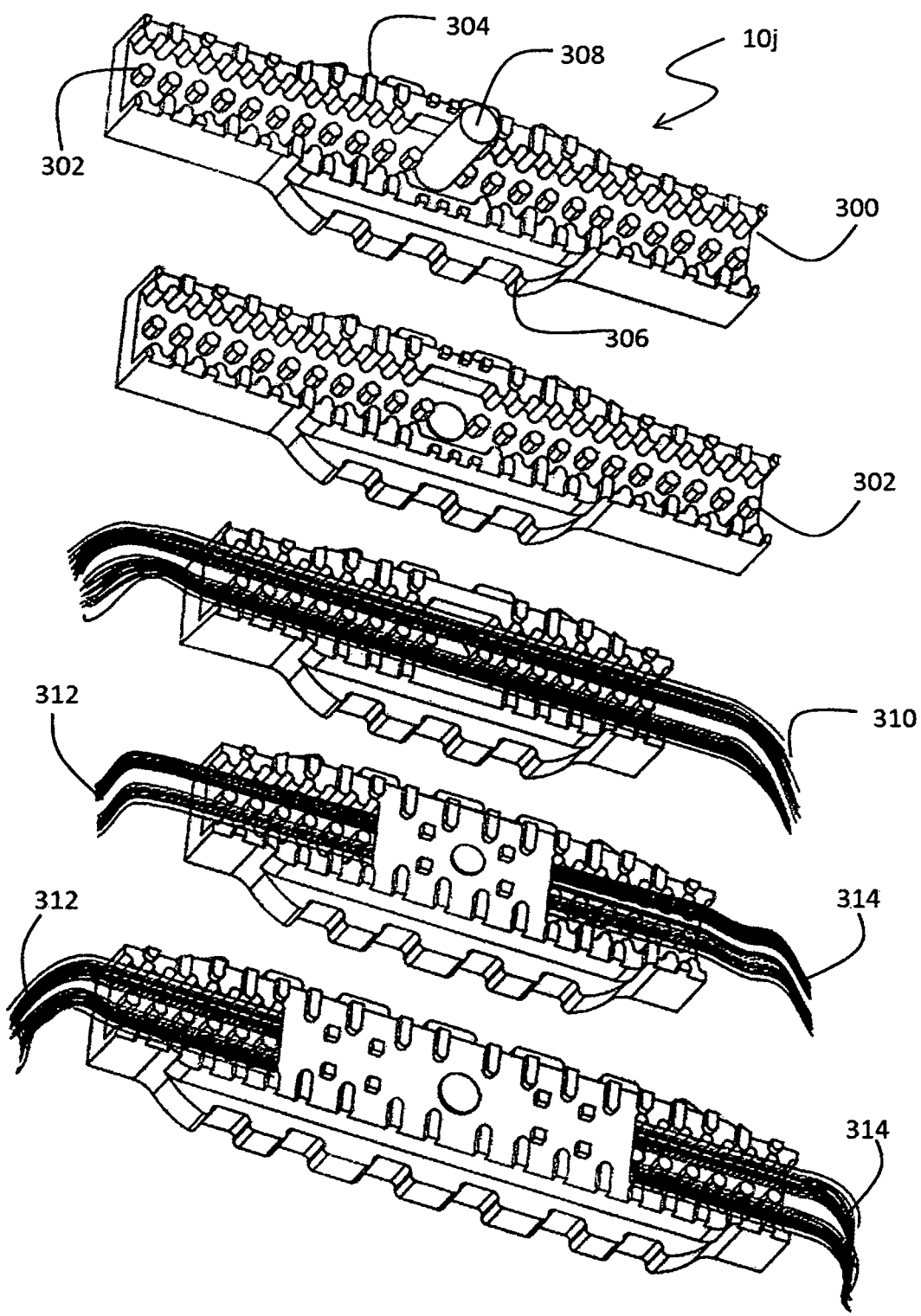
FIG. 26 shows yet another variant proximal bar that includes surface features to improve a combination with dental fibers and illustrates a combination of the proximal bar with a single span of dental fibers acting as an occlusal bar an further illustrates a combination of the proximal bar with two distinct and separate spans of dental fiber acting as to two torque bars.

FIGS. 25 and 26 show the development of a proximal bar with the use of fibers as torque or occlusal bars depending on a desired application.

FIG. 25 shows various modifications of proximal bar 10e that contribute to an advantageous combination with fibers 294—for example, a corrugated surface pattern of teeth 290 along the length of the interior surfaces of the vertical sidewalls and the posts 292 in the floor of the trough that can both independently grip and frictionally engage the fibers 294. FIG. 25 also shows how fibers 294 spread out into dove tails in abutment teeth, 296 and 298, so that the proximal bar and the fibers can be used conveniently used together with engagement the teeth 290 and the posts 292 with the fibers and the dove tail in the tooth serving to lock the entire bridge reinforcement together to prevent the slipping between the torque bar and the fiber which will hold the structure together and thus reduce the cracking of the composite resin.

FIG. 26 shows a proximal bar 10j for use with fibers with various surface feature modifications—for example, corrugated surface pattern teeth 300 along the interior surfaces of the vertical sidewalls, a series of posts 302 extending from the coronal surfaces along the longitudinal axis of the proximal bar, surface risers 304 formed along the coronal end of the vertical sidewalls, and ridge cuts 306 along the lateral perimeter of the central planar pad. The proximal bar can also include a central post 308 for reversible coupling with an impression taker bar. FIG. 26 shows that the surface feature modifications, such as corrugated surface pattern teeth 300, can support use of the proximal bar with either a single length of fiber 310, or two distinct and separate lengths of fiber, 312 and 314, as desired. The single length of fibers 310 provides advantages over use of an occlusal bar as described above in reference to FIG. 3. The two distinct and separate lengths of fibers may be substituted for two torque bars as desired. FIG. 26 also shows that the proximal bar can be filled as a solid block in the center increasing the strength in the center of bridges of longer span.

Proximal bars and torque bars can be sold in a kit to the dentist or a manufacturer can make them and stock them to be ordered as needed. Kits may include a proximal bar, a torque bar, a dental fiber, an impression taker, a clamp, or any combination thereof.

Figure 37:
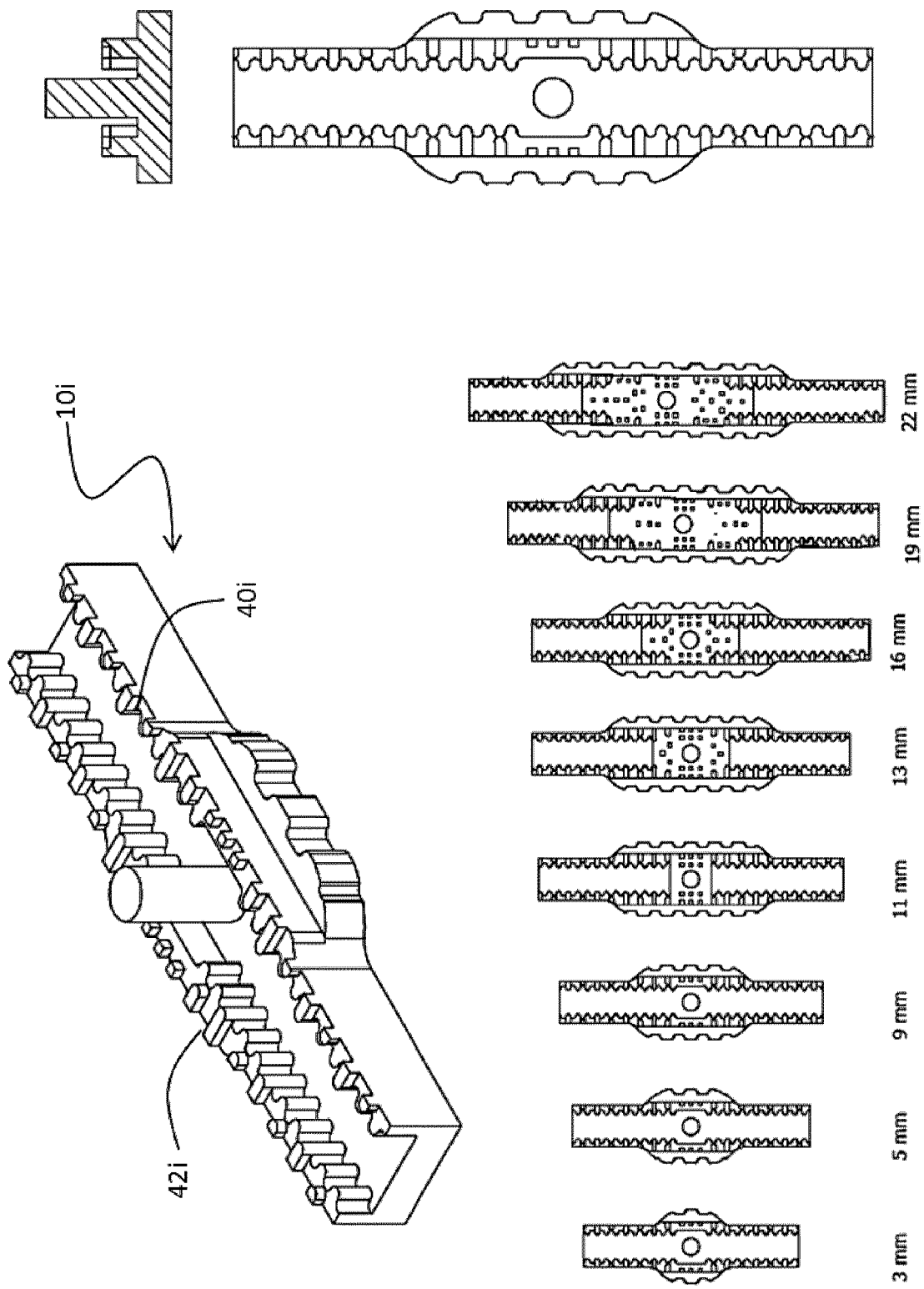
FIG. 37 shows a coronal surface view of a series of a plurality of the proximal bar variant shown in FIG. 18 that may be provided in a kit, the plurality of proximal bars arranged from left to right according to increasing longitudinal length.

A kit may include proximal bars with wide pads to support the pontic and with sufficiently spaced apart vertical sidewalls (when present) being manufactured and provided for the dentist in a kit of increments of length, as shown for example in FIG. 37. For example, a plurality of proximal bar sizes may be provided in a kit for use including proximal bars with pads of varied horizontal length including for example 4 mm, 5 mm, 6 mm, 7 mm, 8 mm etc to 25 mm. In cases of long spans proximal bars may be made with slight variations to increase the strength needed for longer spans, ie. proximal bars of pad length greater than 10 mm. These variations may include, for example, increased thickness of the proximal bar, blocks formed on the central pad, and/or additional longitudinal ribs placed along the length under the proximal pad towards the gingiva. Variations may also include posts projecting in an apical direction to hold onto and support the composite resin during and after bridge fabrication A kit may include torque bars of sizes for molar torque bars and of sizes for bicuspid torque bars that can be provided for the dentist to cut to length for placement in each proximal bar and pontic combination where the dentist can select the torque bar for either the molar or bicuspid depending on the abutment tooth.

A kit may include bent torque bars to be used in cases of tipped abutments and cases where the width of the vertical sidewalls of the proximal bar and the direction of the torque bar determined by the pulp horns of the abutment teeth do not accommodate the straight torque bar due to the more than normally experienced rotation and of the abutment teeth. The kit may include a plurality of torque bars having different bend angles as shown for example in FIGS. 40 and 42.

A kit may include one or more impression takers. For convenience a kit may include a plurality of impression takers of incremental sizes as shown, for example, in FIG. 14. A kit may include a clamp for securing an impression taker in alignment with a reinforcement bar.

Several illustrative variants have been described above. Further variants and modifications are described below. Moreover, guiding relationships for configuring variants and modifications are also described below. Still further variants and modifications are contemplated and will be recognized by the person of skill in the art.

Many variations in the shape and orientation of vertical extensions can be accommodated by the proximal bar. The vertical extensions, shown in FIG. 18 for example, function as vertical walls and therefore the term vertical extension may be used interchangeably with the terms vertical wall or vertical sidewall. The shape and orientation of vertical sidewalls can be modified to suit a particular implementation and can readily deviate from the shape and orientation shown in FIG. 18 while not compromising their function as walls that directly or indirectly transfer resistive force to torque bars to provide resistance to torque or twisting forces exerted upon a direct bridge.

The vertical extensions, shown in FIG. 18 for example, function as vertical walls and therefore the terms vertical extension and vertical sidewall may be used interchangeably. The vertical extensions shown in FIG. 18 are in parallel alignment with each other and parallel with the longitudinal axis of the proximal bar. However, non-parallel alignment can be tolerated with independent deviation of each vertical bar of up to 30 degrees from parallel alignment with the longitudinal axis of the proximal bar readily tolerated and perhaps found to be advantageous depending on the implementation.

Each vertical extension shown in FIG. 18 is a continuous elongate strip. Vertical extensions can readily be modified to include gaps so as to be discontinuous.

Each vertical extension shown in FIG. 1 is confined within the perimeter of the pad; however, longitudinal ends of each vertical extension need not be limited within the perimeter of the pad, and may advantageously extend beyond the perimeter of the pad as shown for example in FIG. 18. A vertical extension overhanging the perimeter of the pad or longitudinally extending beyond the perimeter of pad can be tolerated. Moreover, vertical extensions formed on part or all of the insertion arms may benefit operation of certain embodiments, for example when bent torque bars are used; or as another example when the interaction of the torque bar with the proximal bat occurs at or near the longitudinal end of the proximal bar. Furthermore, in certain embodiments vertical extensions need not be formed on the central planar pad.

Vertical extensions can be primarily located on insertion arms of a proximal bar, and need not be formed on the central planar pad. For example, FIG. 23 shows a block formed on the central planar pad covering the majority of the coronal facing surface area of the central planar pad. The proximal bar shown in FIG. 23 can readily be modified so that the vertical extensions are located exclusively on the insertion arms by expanding the block to cover the entire central pad. The block may cover any percentage of the coronal facing surface of the central planar pad as suited to a particular implementation; for example, the proximal bar shown in FIG. 24 shows a much smaller proportion of the central planar pad covered by a block compared to FIG. 23.

Interior facing surfaces of first and second vertical extensions can act as opposing lateral sidewalls and combine with a coronal surface of the central planar pad and/or one or both insertion arms to form a channel or trough. The surfaces of the vertical sidewalls that define the trough may be perpendicular to the coronal surface of the proximal bar. However, angular orientations that deviate from a perpendicular alignment can be tolerated and may even be advantageous, for example as seen with the dovetailed shape trough illustrated in FIG. 3Q. Angular deviations of 30 degrees from a perpendicular alignment can readily be accommodated. Interior facing surfaces of first and second vertical extensions can also act as opposing lateral sidewalls shaped to provide surface features to frictionally engage fibers, to counteract shear forces or can be shaped to provide one or more mating surfaces for direct engagement with a complementary mating surface on a torque bar or indirect engagement through compression of composite resin. When the interior facing surfaces are shaped to form desired surface features the interior facing surfaces may deviate extensively from verticality and may provide any angular orientation relative to the coronal surface depending on the specific shape of the surface feature.

In certain embodiments, first and second vertical extensions may be avoided altogether, such as when complementary mating surfaces of the proximal bar and the torque bar are coupled to form a joint. For example, the reinforcement combination shown in FIG. 20 can readily be modified to remove both vertical extensions while still maintaining operability.

As shown in the drawings, for example FIG. 1, the coronal facing surface of pad located between the first and second vertical extensions forms a continuous and co-planar surface with at least one of the first and second insertion arms. However, this co-planar arrangement can be modified and deviations from a co-planar arrangement can be tolerated, for example where a shape of a torque bar matches the deviation from a co-planar alignment.

The lateral spacing of the interior facing surfaces of first and second vertical extensions can be modified to suit a particular implementation. As shown in FIG. 1, a lateral spacing of the interior facing surfaces of the first and second vertical extensions is greater than the width of at least one of the first and second insertion arms. However, as shown in FIG. 18 for variant proximal bar 10e and 10i the interior lateral spacing of first and second vertical extensions may be less than both of the insertion arms. Similarly, while FIG. 1 shows lateral spacing of the interior facing surfaces of the first and second vertical extensions to be at least three fold greater than the width of at least one of the first and second elongate torque bars, this dimensional relationship is not a requirement as shown for example in FIG. 19 and FIG. 23. The lateral spacing can be less than the width of an insertion arm, for example where bent torque bars are used to accommodate angular irregularities presented by rotated teeth. k another example, as shown in FIG. 24, the lateral spacing can be less than the width of an insertion arm where direct or indirect interaction between complementary mating surfaces of a vertical extension and a torque bar is contemplated. In another example, as shown in FIG. 23, the lateral spacing of the interior surfaces of the first and second vertical extensions will typically be less than the width of an insertion arm where vertical extensions are formed on the insertion arms.

Shape and orientation of elongate torque bars can be varied. Torque bars can have any desired lateral cross-sectional shape including circular, triangular and trapezoid shapes, and may also include other polygonal shapes defining its lateral cross-section. The orientation of each torque bar can be varied in terms of angular orientation as well as longitudinal overlap with the proximal bar. Factors influencing variance in angular orientation can include degree of misalignment of an abutment tooth as well as choice of straight versus bent torque bars and the degree of bend of a bent torque bar. Longitudinal overlap of a torque bar with a proximal bar will be less than the full length of the proximal bar as a single torque bar will never be used to span the proximal bar to be seated in both mesial and distal occlusal preparations. Thus, generally a first longitudinal end of a first elongate torque bar is positioned within a first occlusal cavity preparation but not in a second occlusal cavity preparation, and a first longitudinal end of a second elongate torque bar is positioned within the second occlusal cavity preparation, but not in the first occlusal cavity preparation.

The longitudinal overlap of the torque bar with proximal bar can accommodate variation, including examples providing overlap with the central planar pad as well as other examples where the overlap does not include the central planar pad and is limited to a single insertion arm. Where first and second vertical extensions are present a longitudinal end of a torque bar will often be positioned between the vertical extensions. For example, given that the first ends of the first and second elongate torque bars are to be positioned in first and second occlusal preparations, respectively, then the second longitudinal end of the first elongate torque bar is positioned in between the first and second vertical extensions, and the second longitudinal end of the second elongate torque bar is positioned in between the first and second vertical extensions.

The torque bars need not contact the vertical extensions, as resistance to torque forces can be transferred from the vertical extensions to the torque bars through intervening restorative material in the absence of direct contact between torque bar and vertical extension. However, direct contact between a torque bar and a vertical extension is readily tolerated and may be likely where lateral spacing of the interior facing surfaces of the vertical extensions is narrower than the insertion arms. In such cases the second longitudinal end of the first elongate torque bar may contact a surface of at least one of the first and second vertical extensions, and/or the second longitudinal end of the second elongate torque bar may contact a surface of at least one of the first and second vertical extensions.

Longitudinal overlap of each torque bar with a proximal bar will typically include overlap with a single insertion arm or with a single insertion arm in combination with all or part of the central planar pad, and will typically avoid overlap with both insertion arms. For example, the first elongate torque bar may have at least one longitudinal flat side receiving abutting support from the first insertion arm and less than 75% of the longitudinal distance of the coronal facing surface of the pad. In another example, the second elongate torque bar may have at least one longitudinal flat side receiving abutting support from the second insertion arm and less than 75% of the longitudinal distance of the coronal facing surface of the pad. In other examples, longitudinal overlap of each torque bar may be limited to a single insertion arm and may not overlap with the central pad.

Just as torque bar shapes can accommodate extensive variation, torque bars can also include various types of bends. Bends may vary with respect to angle, accommodating any desired acute angle, typically ranging from 5 degrees to 60 degrees. Bends can also vary in terms of shape, for example sharp bends that form a vertex at the bend ranging to smooth bends that form a curve first and second elongate torque bars includes a bend. Typically, the bend of a torque bar is located in a portion of the torque bar so that the bend can be positioned at or near the isthmus. First and second torque bars can be independently selected to be straight or include bends, and if bent then independently selected for a desired angle, depending on the abutment teeth alignment of a particular implementation.

A kit can be prepared that includes at least one size of proximal bar and at least one size of torque bar and instructions for configuring and aligning the proximal bar and the torque bar as a reinforcement bar combination to provide structural support and to create a direct dental bridge. Typically, kits will include more than one size of proximal bar and more than one size of torque bar. As shown in FIG. 37, kits may include a plurality of different sizes of proximal bars, where each of the plurality of different sizes correspond to a particular type of edentulous space or a particular sized pontic for replacing a particular missing tooth. For example, the proximal bar can be provided in a plurality of different sizes, each of the plurality of different sizes providing a different sized pad with the perimeter of the pad corresponding to a different posterior tooth. Kits will typically include torque bars in a plurality of different sizes and/or a plurality of different shapes. For example, torque bars may be categorized as molar torque bars and bicuspid torque bars depending on the intended occlusal preparation that is to receive a torque bar. Molar torque bars may be provided with larger cross-sectionals areas than bicuspid torque bars.

Figure 9:
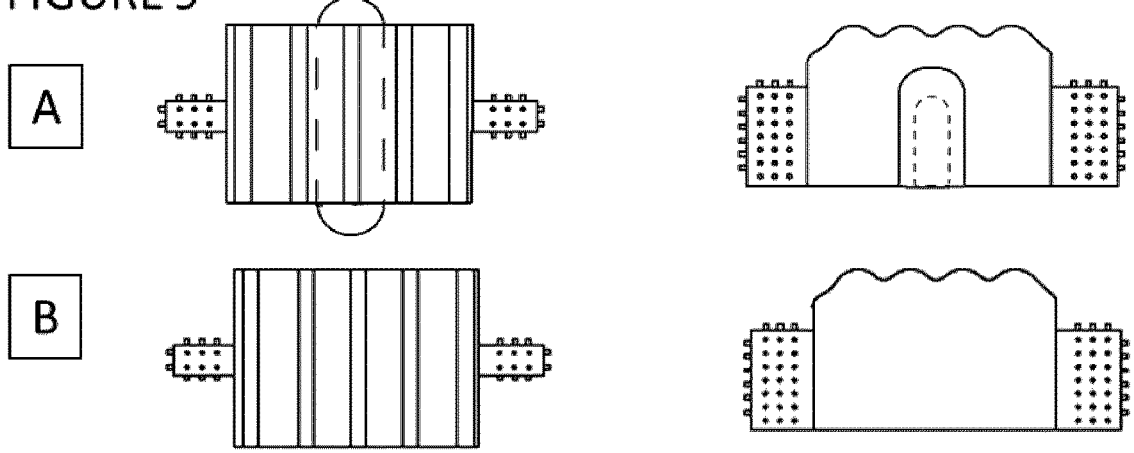
FIG. 9 shows coronal views and side views of another variant of the impression taker bar with (A) a reversible connecter for engaging a proximal bar, and (B) without the reversible connecter for engaging a proximal bar.
Figure 10:
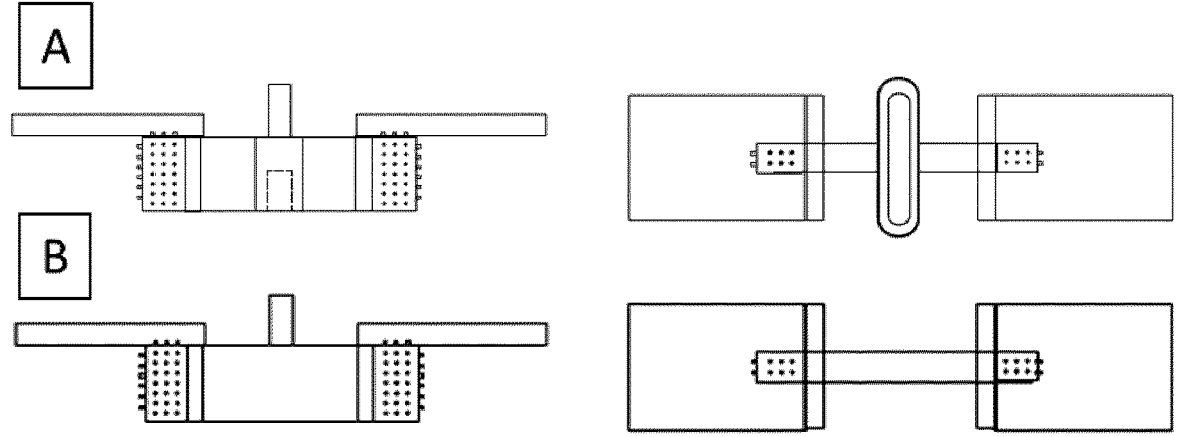
FIG. 10 shows side views and apical views of yet another variant of the impression taker bar with (A) a reversible connecter for engaging a proximal bar, and (B) without the reversible connecter for engaging a proximal bar.

A kit may include proximal bars with wide pads to support the pontic and with sufficiently spaced apart vertical extensions being manufactured and provided for the dentist in a kit of increments of length. For example, a plurality of proximal bar sizes may be provided in a kit for use including proximal bars with pads of varied longitudinal/horizontal length including for example 4 mm, 5 mm, 6 mm, 7 mm, 8 mm etc to 25 mm, as illustrated in FIG. 8 or 9. In cases of long spans proximal bars may be made with slight variations to increase the strength needed for longer spans, ie. proximal bars of pad length greater than 10 mm.

A kit may include torque bars of sizes for molar torque bars and of sizes for bicuspid torque bars that can be provided for the dentist to cut to length for placement in each proximal bar and pontic combination where the dentist can select the torque bar for either the molar or bicuspid depending on the abutment tooth. Torque bar size and shape variation schemes may be distinguished on the basis of any convenient category with a molar versus bicuspid categorization being an illustrative example.

A kit may include bent torque bars to be used in cases of tipped abutments and cases where the width of the vertical sidewalls of the proximal bar and the direction of the torque bar determined by the pulp horns of the abutment teeth do not accommodate the straight torque bar due to the more than normally experienced rotation and of the abutment teeth. Kits may include a plurality of bent torque bars providing a selection of angular increments for the dentist as shown for example in FIGS. 40 and 42. Bent torque bars may be provided in a plurality of different angles including, for example, one or more angles selected from about 5 degrees, about 10 degrees, about 15 degrees, about 20 degrees, about 25 degrees, about 30 degrees, about 35 degrees, about 40 degrees, about 45 degrees, about 50 degrees, about 55 degrees, about 60 degrees, or any angle therebetween. Bent torque bars may also be categorized as molar torque bars and bicuspid torque bars, with molar torque bars typically providing a larger lateral cross-sectional area than bicuspid torque bars.

The proximal bar and the torque bars are an assembly that act in combination and co-operate to form a structural reinforcement for a direct dental bridge. The reinforcement is a framework that provides a supporting scaffold for placing and shaping a restorative material to replace at least one missing tooth.

Torque bars are typically not joined or coupled to the proximal bar until the torque bars are positioned with the proximal bar during a direct dental bridge restoration and the proximal bars and torque bars reinforcement combination is fixed in position by application and curing of a restorative material such as a photo-curable composite resin restorative material having properties for replacement of a posterior tooth or properties for replacement of a canine anterior tooth. The reinforcement bar combination may be used with any suitable dental restorative material. The restorative material is often chosen to be a composite resin restorative material, but other restorative materials may also be used. Composite resins are often composed of Bis-GMA and other dimethacrylate monomers (TEGMA, UDMA, HDDMA), a filler material such as silica and in most current applications, a photoinitiator. As examples of composite resin restorative material that may be useful, the composite resin restorative material may include a photoinitiator and one or more compounds from the group consisting of glass, silica, zirconia, ceramic, quartz, and aluminum.

Manufacturing of the proximal bars and torque bars can be accomplished using any suitable technique, including any suitable mold, machining or extrusion technique. Each proximal bar is typically an integral unit and each torque bar is typically an integral unit.

The proximal bar and the first and second elongate torque bars can be varied in size and shape depending on the requirements of a direct restoration as dimensions of occlusal cavity preparation and edentulous space differ among posterior teeth, for example bicuspids provide a smaller occlusal surface compared to molars. Size and shape may also vary depending on the type of proximal bar and torque bar variants selected for a particular implementation; for example, a torque bar that forms a jointed coupling within the central planar pad is sized differently compared to a torque bar that forms a jointed coupling at a longitudinal end of a proximal bar. Tables 1 and 2 provide illustrative examples showing differences in longitudinal and lateral dimensions comparing single tooth replacements with a direct dental bridge based on the reinforcement combination shown in FIG. 24.

TABLE 1

Examples of longitudinal dimensions for direct bridge structural elements shown in FIG. 24 for producing direct restorations to replace a single missing tooth.

| Missing tooth | Proximal bar-central pad length (mm) | Mesial torque bar length (mm) | Distal torque bar length (mm) |
|---|---|---|---|
| 1st bicuspid | 3-5 | n/a | 5-6 (2nd Bicuspid) + 4-6 (proximal bar) |
| 2nd bicuspid | 3-5 | 5-6 (1st Bicuspid) + 4-6 (proximal bar) | 8-9 (1st molar) + 4-5 (proximal bar) |
| 1st molar | 5-9 | 5-6 (2nd Bicuspid) + 4-6 (proximal bar) | 8-9 (2nd molar) + 5-6 (proximal bar) |
| 2nd molar | 5-9 | 8-9 (1st molar) + 5-6 (proximal bar) | 8-9 (3rd molar) + 5-6 (proximal bar) |
| 3rd molar (wisdom tooth) | n/a | n/a | n/a |

TABLE 2

Examples of lateral dimensions for direct bridge structural elements shown in FIG. 24 for producing direct restorations to replace a single missing tooth.

| Missing tooth | Lateral spacing of Vertical sidewalls of Proximal bar:interior width (mm) | Mesial torque bar width (mm) | Distal torque bar width (mm) |
|---|---|---|---|
| 1st bicuspid | 1.0-2.5 | n/a | 1.0-1.4 |
| 2nd bicuspid | 1.0-2.5 | 1.0-1.4 | 1.2-1.8 |
| 1st molar | 1.0-2.5 | 1.0-1.4 | 1.2-1.8 |
| 2nd molar | 1.0-2.5 | 1.2-1.8 | 1.2-1.8 |
| 3rd molar (wisdom tooth) | n/a | n/a | n/a |

Manufacturing of the proximal bars and torque bars can be accomplished using any suitable technique, including any suitable mold, machining or extrusion technique. Each proximal bar is typically an integral unit and each torque bar is typically an integral unit. Proximal bars and torque bars can be made from the same or different material as desired. Proximal bars and torque bars can be made of any suitable dental material used for reinforcement bars such as dental ceramic materials including for example zirconia, alumina toughened zirconia, yttria stabilized zirconia, stainless steel, titanium, or Ceria-doped tetragonal zirconia polycrystal/alumina (Ce-TZP/$Al_2O_3$).

The proximal bar has small insertion arms/ends that fit into proximal preparations in the abutment teeth where the proximal preparations have a flat bottom or gingival seat, and where the flat proximal gingival seat is cut as wide as is biologically beneficial where this width is up to about 5 mm wide but frequently less than about 4 mm wide.

The insertion arm of the proximal bar can be flat where it inserts into the abutment tooth and sits on the flat gingival seat so it can resist rotational forces around the long axis of the bridge. In certain examples, when bent torque bars are used in combination with the proximal bar or interaction of complementary mating surfaces of an interior surface of a vertical extension with a torque bar surface is intended to occur on the insertion arm, one or both of the insertion arms can be configured with substantially parallel first and second vertical extensions or sidewalls and therefore the range of vertical dimension of the insertion arm can be increased by the added thickness of the vertical extension. Regardless of whether the insertion arm includes vertical sidewalls or is devoid of vertical sidewalls, the apical surface of the insertion arm will typically be flat to sit on a flat gingival seat of a proximal preparation.

The insertion arm of the proximal bar typically ranges from about 2 mm wide to about 5 mm wide. The insertion arm width should be sufficiently narrow to preserve the embrasure space for tooth and gum cleansing and is frequently less than about 4 mm, with widths closer to 5 mm wide suitable in some cases of large teeth.

Figure 38:
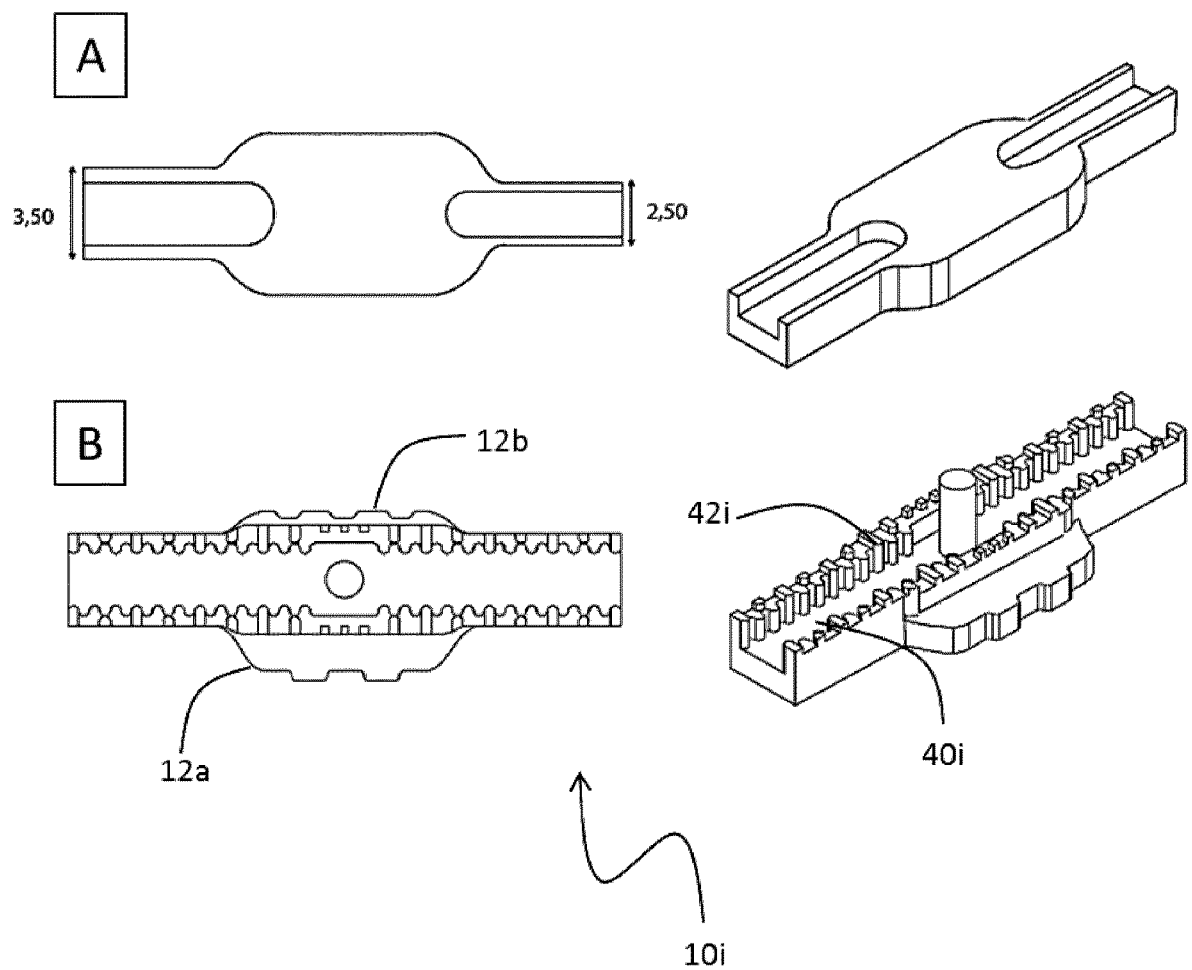
FIG. 38 shows yet another variant proximal bar providing asymmetric sizing of (A) lateral dimension of first and second insertion arms and (B) lateral positioning of the central planar pad.

The sizes of the first and second insertion arms of the proximal bar may be asymmetrical as benefiting particular implementations. For example, a first insertion arm may be narrower than a second insertion arm as shown in FIG. 38A. As illustrated in Table 2, lateral sizing may differ based on considerations of a specific missing tooth and specific abutment teeth.

The proximal preparation is cut deep enough gingivally to allow for the placement of the torque bar in the occlusal preparation coronal to the proximal bar, where the occlusal preparation is cut reasonably no more than 2 mm deep into the occlusal surface.

To accommodate the proximal bar and the torque bar the proximal preparation must be cut a minimum of 3 mm deep or even 4 mm deep thus allowing the vertical depth of the proximal preparation to accept a proximal bar gingivaly in the proximal preparation and torque bar sitting coronal to the proximal bar in the proximal preparation.

If the proximal preparation is cut 3 mm deep then the proximal bar can be 1 mm thick with the occlusal preparation being cut the 2 mm deep. If the proximal preparation is cut 4 mm deep then the insertion end of the proximal bar can be 2 mm thick and the occlusal preparation can be cut 2 mm deep.

Typically the proximal preparation will not be cut more than 4 mm deep because the abutment tooth narrows towards the root area and so cutting the proximal bar deeper than the 4 mm results in the proximal preparation getting closer to the nerve of the tooth.

Based on steric and spatial constraints observed in mouths, size ranges of various portions of the proximal bar may be established. For example, the insertion arm of the proximal bar functions well in the shape of a rectangular bar that has a flat bottom to sit on a flat gingival seat of a proximal preparation, where the flat bottom insertion arm is most often 2 to 4 mm wide and 1 to 2 mm vertically high. One or both of the insertion arms can be configured with substantially parallel first and second vertical extensions or sidewalls, and therefore the range of vertical dimension of the insertion arm can be increased by the added thickness of the vertical extension.

The central planar pad of the proximal bar is a thin flat plate or platform designed to support the width (buccolingual) and length (mesio-distal) of a replacement pontic tooth where the perimeter of the pad is of circular or oval shape or has rounded corners, and the pad typically ranges from 1 to 2 mm in thickness. The pad can be up to 3 mm thick but over 2 mm the pad gets difficult to use in numerous cases in the mouth as there is commonly only 5 mm of space between the gingiva of an edentulous space and an occlusal surface of a corresponding tooth extending from the opposing jaw. The coronal surface of the central planar pad will typically be flat. The apical surface of the central planar pad may be flat or may optionally be modified to mimic and facilitate a pontic shape. For example, to mimic a desired pontic shape the apical surface of the pad may be rounded on its lateral edges, or the apical surface could be rounded as a partial cylinder surface or partial domed surface so that a lateral cross-section of the pad shows a substantially flat coronal surface and a rounded apical surface, thereby providing an apical surface that mimics the base of the pontic as it contacts the gingival surface. It should be noted that even if the apical surface is optionally rounded, the apical surface of the insertion arms will remain flat.

The apical surface of the proximal pad can be flat or can have any configuration that may add strength to the length of the span such as longitudinal ridges. Furthermore, the apical surface may be configured to interact with the composite resin, including for example posts to help hold or brace the composite resin. Apical extensions in general are not more than 3 mm high as the proximal bar has to fit universal vertical dimensions of the edentulous space and in some cases there is only 0.5 mm available between the apical surface of the pad and the gingiva, and in other cases there may be 10 mm or more available. Customized apical extensions may have dimensions anywhere within this size range, however for more universal applications vertical extensions will typically extend less than 3 mm, less than 2 mm, less than 1 mm or less than 0.5 mm in the apical direction.

The maximum width of most teeth is about 10 mm. However the pontic has to be made with a covering of composite resin surrounding the proximal bar so space is needed on both sides of the proximal bar pad for the composite covering over the sides of the proximal pad. Therefore, the width of the central pad portion of the proximal bar can typically range from about 5 mm to about 9 mm, and frequently ranges from about 6 mm to about 7 mm.

Thus, a useful structure of the proximal bar is a flat pad in a central portion of the proximal bar, the flat pad ranging from about 5 mm to about 9 mm wide and from about 1 mm to about 2 mm thick with round corners to mimic the round shape of a tooth with proximal insertion arms which extend as rectangular bars from the opposing sides of the flat pad where the insertion arm ends are about 2 mm to about 4 mm wide and from about 1 mm to about 3 mm thick. The insertion arms can be provided with a length from about 5 mm to about 6 mm so the dentist can cut them to length and fit them into the proximal preparations across the span. One or both of the insertion arms can be configured with substantially parallel first and second vertical extensions or sidewalls—for example, when bent torque bars are used in combination with the proximal bar—and therefore the range of vertical dimension of the insertion arm can be increased by the added thickness of the vertical extension.

Insertion arms/ends can be sized to fit in any convenient manner including, for example, sized to predetermined dimensions as manufactured or sized by a dentist that cuts and/or shapes mesial and distal insertion arms to fit mesial and distal proximal preparations, respectively, when creating a specific direct dental bridge. As an example of a dentist cutting a proximal bar during a direct dental bridge procedure, proximal bars can be manufactured with each insertion arm having a minimum 6 mm length/longitudinal dimension, with each arm cut and/or shaped by the dentist so that arms fit mesial and distal proximal preparations and fit the span. In this example, about 3 mm on each insertion arm can be cut away leaving 3 mm of each insertion arm sitting in the mesial and distal proximal preparation.

A central planar pad is a platform or plate in a central location of the proximal bar. The central planar pad is wider than both the first insertion arm and the second insertion arm. An advantage of the central pad being wider than first and second insertion arms is that the central pad can provide improved pontic support compared to a prior art proximal bar that has a single and consistent lateral cross-section area along its entire longitudinal length. Another advantage is that central pad does not extend within an embrasure space between a pontic and an abutment tooth as compared to embrasure encroachment seen in a prior art proximal bar.

Lateral positioning of the central planar pad on the proximal bar is often symmetrical. However, in certain embodiments asymmetrical lateral positioning of the central planar pad with respect to the long axis of the proximal bar may be suitable. More specifically, with respect to the longitudinal axis of the proximal bar, the lingual side of the central planar pad can be smaller laterally than the buccal side of the pad, or vice versa. For example, in certain cases of bicuspids a reduction in the lingual lateral size of the pad can be advantageous. Asymmetry of lingual versus buccal sides of the central planar pad may include lateral and/or longitudinal size differences.

FIG. 38B shows an example of a lateral asymmetry of the central pad. Proximal bar 10*i* is modified such that the lingual portion 12*b* of the central pad is much smaller than the buccal portion 12*a* of the central pad.

The reinforcement combination bars can provide mating surfaces between the proximal bar and corresponding torque bars. For example, a reinforcement combination for supporting a direct dental bridge, the reinforcement combination comprising an elongate proximal bar that provides first and second mating surfaces, the first mating surface having a complimentary shape to a corresponding third mating surface formed on an elongate torque bar, and the second mating surface having a complimentary shape to a corresponding fourth mating surface formed on a second elongate torque bar. In certain examples, the elongate proximal bar includes: a central planar pad bound by a perimeter, a coronal facing surface and an apical facing surface, a first insertion arm extending in a mesial direction from the perimeter of the pad, a second insertion arm extending in a distal direction from the perimeter of the pad, a first mating surface formed on the first insertion arm (for example, on a coronal facing surface of the first insertion arm) and a second mating surface formed on the second insertion arm (for example, on a coronal facing surface of the second insertion arm). The first elongate torque bar may have a first longitudinal end positioned external to the proximal bar and a second longitudinal end positioned internal to the proximal bar (for example, on the coronal facing surface of the first insertion arm), a third mating surface formed on the first elongate torque bar, the first mating surface and the third mating surface having complimentary shapes. The second elongate torque bar may have a first longitudinal end positioned external to the proximal bar and a second longitudinal end positioned interact to the proximal bar (for example, on the coronal facing surface of the second insertion arm), a fourth mating surface formed on the second elongate torque bar, the second mating surface and the fourth mating surface having complimentary shapes. In other examples, the proximal bar can be configured to provide surface features that engage and interact with dental fibers so as to provide a reinforcement combination that comprises the proximal bar and one or more dental fibers.

With reference to FIGS. 27 to 31 several further illustrative embodiments relating to surface features of proximal bar and/or torque bars are provided. These illustrative embodiments provide one or more characteristics of:

1. a physical interaction between parts, for example, through complementary mating surfaces that can be directly engaged to create a joint, such as a ring and post joint or a ball and socket joint;

2a. surface features that disrupt or resist shear forces;

2b. mating surface features on the separate individual parts that do not make direct contact, but provide sufficiently complementary surfaces so that when a force of shear or stretch is applied to the assembled parts, the angles on the surface of the individual parts will direct the shear force onto the compressive strength of the composite resin lying between the parts; or 3. Using fibers to press and lock into teeth with the fibers interacting with surface features of the proximal bar.

Figure 27:
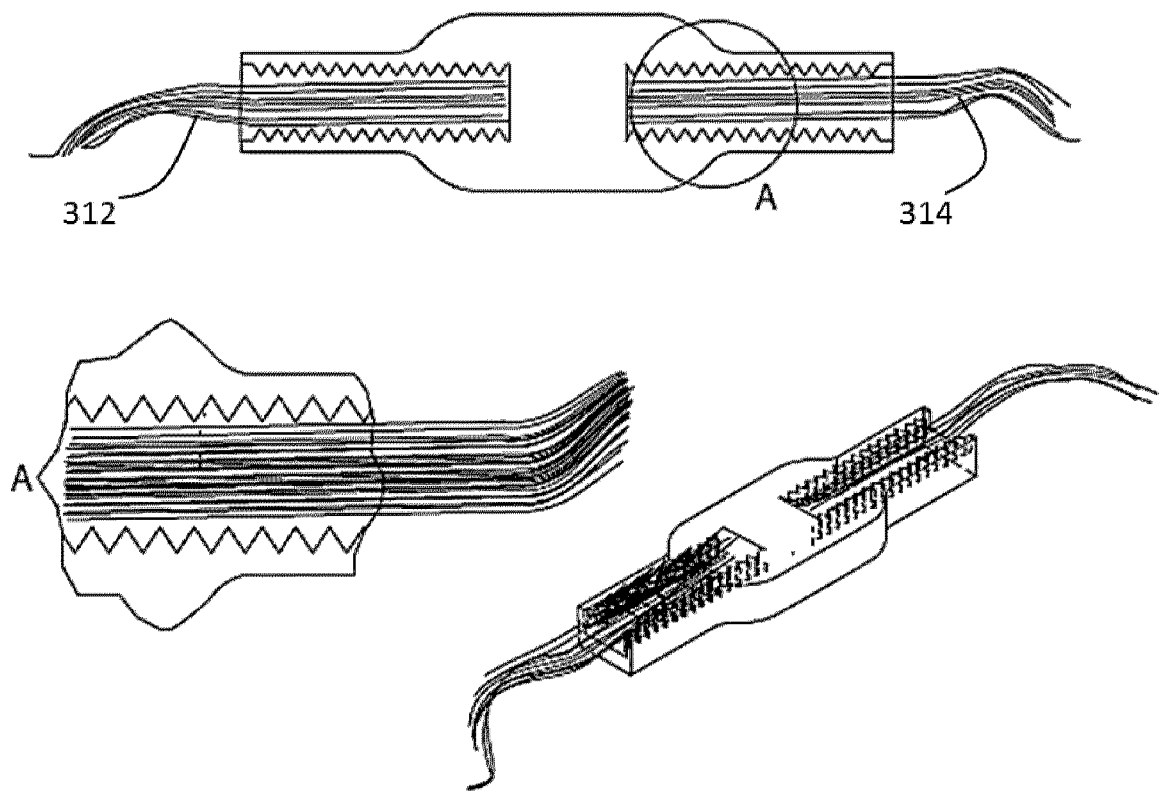
FIG. 27 shows yet another variant proximal bar providing surface features that can benefit a combination of the proximal bar with dental fibers.

For example, FIG. 27 provides a further variant of a proximal bar with two distinct and separate lengths of fibers, 312 and 314, showing that a corrugated surface pattern of triangle teeth along the interior surfaces of the vertical sidewalls are sufficient to frictionally engage fibers and advantageously combine fibers in assembly of a dental bridge. FIGS. 25 and 26 described above provide posts extending vertically (corono-apical direction) from the coronal surface of the proximal bar to engage dental fibers. In the absence of vertical posts, other surface features of the proximal bar, such as a corrugated surface pattern along one or both of interior surfaces of vertical sidewalls (as shown, for example, in FIG. 27) can sufficiently engage dental fibers.

Figure 28:
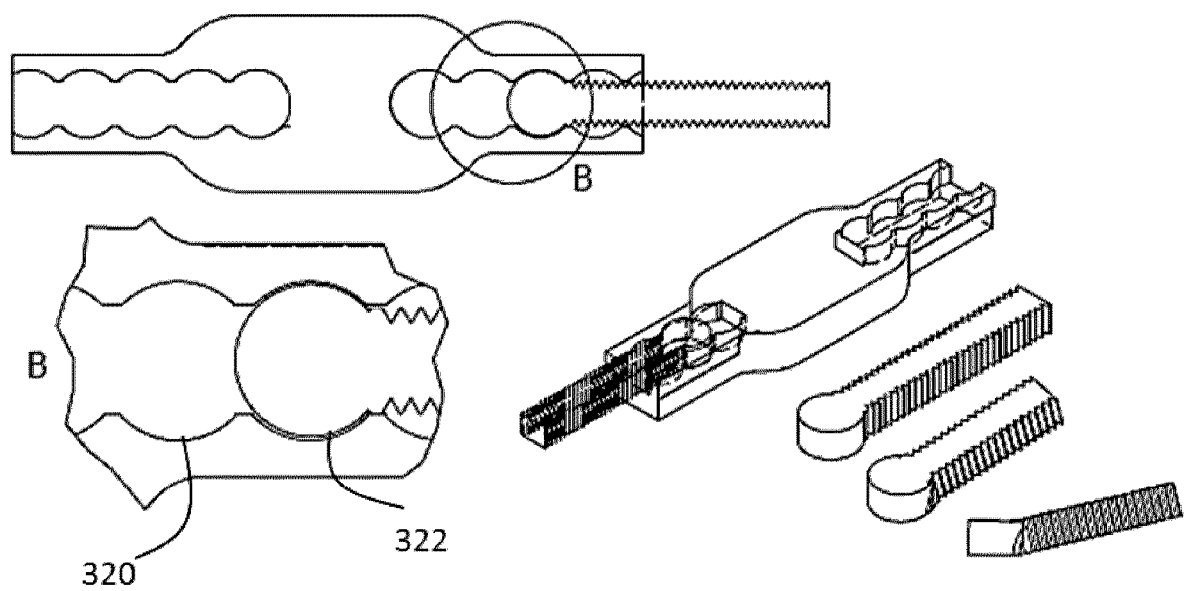
FIG. 28 shows yet another variant proximal bar that form a bolt-and-socket pivot joint with a longitudinal end of a torque bar.

FIG. 28 shows a further example of a reinforcement combination including a mechanism of a first mating surface formed on an insertion arm of a proximal bar and a complementary third mating surface formed at a longitudinal end of a torque bar reversibly coupled as a pivot joint. The first mating surface is a cylindrical socket 320 formed on the coronal facing surface of the first insertion arm and the complementary third mating surface is a cylindrical head 322 formed at the second longitudinal end of the first torque bar, the cylindrical head 322 sized to be pivotally received in the socket 320. Optionally, the first mating surface is one of a plurality of equivalent cylindrical sockets formed on the coronal facing surface of the first insertion arm. The plurality of equivalent cylindrical sockets may be serially aligned on the coronal facing surface of the insertion arm along the longitudinal direction of the proximal bar. As such, any cut of the insertion arm, independent of amount cut, provides a socket near the cut end of the insertion arm. Optionally, a cone extension can protrude radially from the cylindrical head to function to resist torque forces when assembled in a dental bridge. The second insertion arm of the proximal bar may be similarly configured to provide a second mating surface that interacts with a fourth mating surface formed on a second elongate torque bar. The second mating surface is a cylindrical socket (equivalent to socket 320) formed on the coronal facing surface of the second insertion arm and the complementary third mating surface is a cylindrical head (equivalent to head 322) formed at the second longitudinal end of the second torque bar, the cylindrical head sized and shaped to be pivotally received in the socket.

Figure 29:
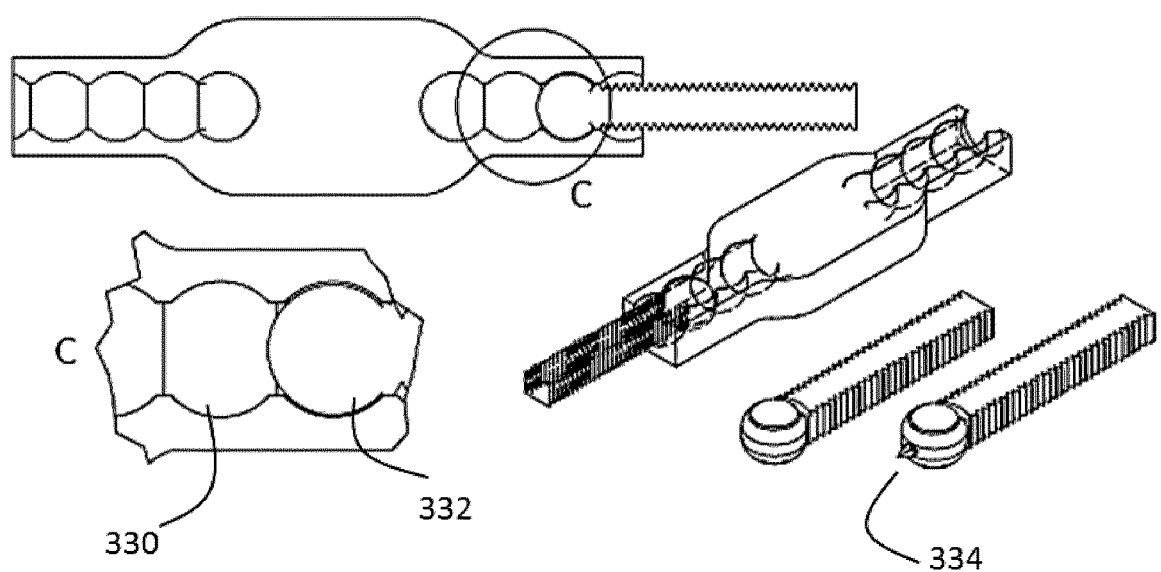
FIG. 29 shows yet another variant proximal bar that form a ball-and-socket pivot joint with a longitudinal end of a torque bar.

FIG. 29 shows a further example of a reinforcement combination including a mechanism of a first mating surface formed on a first insertion arm of a proximal bar and a complementary third mating surface formed at a longitudinal end of a torque bar reversibly coupled as a pivot joint. In FIG. 29, the first mating surface is a partially spherical socket 330 formed on the coronal facing surface of the first insertion arm of the proximal bar and the third mating surface is a spherical head 332 formed at the second longitudinal end of the first elongate torque bar, the spherical head sized to be pivotally received in the partially spherical socket. Optionally, the first mating surface may be one of a plurality of equivalent partially spherical sockets formed on the coronal facing surface of the first insertion arm. The plurality of equivalent partially spherical sockets may be serially aligned on the coronal facing surface of the first insertion arm along the longitudinal direction of the proximal bar. As such, any cut of the insertion arm, independent of amount cut, provides a socket near the cut end of the insertion arm. Optionally, a cone shaped protrusion 334 can extend radially from the cylindrical head to function to resist torque forces when assembled in a dental bridge. The second insertion arm of the proximal bar may be similarly configured to provide a second mating surface that interacts with a fourth mating surface formed on a second elongate torque bar. The second mating surface is a partially spherical socket (equivalent to socket 330) formed on the coronal facing surface of the second insertion arm of the proximal bar and the fourth mating surface is a spherical head (equivalent to head 332) formed at the second longitudinal end of the second elongate torque bar, the spherical head sized to be pivotally received in the partially spherical socket.

Figure 30:
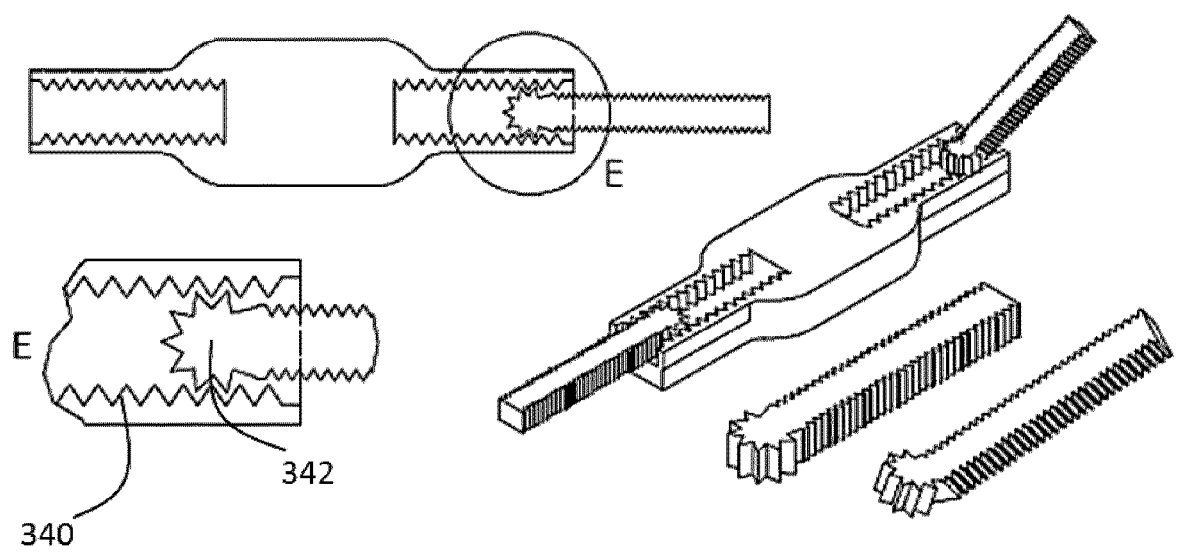
FIG. 30 shows yet another variant proximal bar that forms a multi-position fixed-gear pivot interaction with a longitudinal end of a torque bar.

FIG. 30 shows a further example of a reinforcement combination including a mechanism of a first mating surface formed on an insertion arm of a proximal bar and a complementary third mating surface formed at a longitudinal end of a torque bar interacting in a ratchet mechanism. A trough is defined by the coronal facing surface of the first insertion arm of the proximal bar and interior surfaces of first and second vertical sidewalls extending from the coronal facing surface of the first insertion arm. The first mating surface is formed as a first corrugated surface pattern of a rack of teeth 340 on at least one of the interior surfaces of the first and second vertical sidewalls and the third mating surface formed as a third surface pattern along a cylindrical head 342 formed at the second longitudinal end of the first elongate torque bar, the third surface pattern along the cylindrical head forming teeth for a ratchet interaction with the first surface pattern. The second insertion arm of the proximal bar may be similarly configured to provide a second mating surface that interacts with a fourth mating surface formed on a second elongate torque bar. The second mating surface is formed as a second corrugated surface pattern of a rack of teeth (equivalent to rack of teeth 340) on at least one of the interior surfaces of the first and second vertical sidewalls and the fourth mating surface formed as a fourth surface pattern along a cylindrical head (equivalent to head 342) formed at the second longitudinal end of the second elongate torque bar, the fourth surface pattern along the cylindrical head forming teeth for a ratchet interaction with the second surface pattern. The ratchet mechanism is unlike a conventional ratchet mechanism in that engagement of corresponding mating surfaces prevents further motion of the torque bar. The ratchet designation is based on incremental rotational or angular positioning of the torque bar with the number of increments and the graduation of increments determined by the spacing of teeth in the corresponding mating surfaces. As such the ratchet mechanism can be considered a multi-position or multi-stepped fixed-gear pivot.

Reinforcement combinations shown in FIGS. 23 to 30 all provide an advantage of the proximal bar being able to be cut shorter to fit tooth preparations, yet independent of the amount of cut of the insertion arm of the proximal bar, a complementary first mating surface for engaging a corresponding and complementary third mating surface on the torque bar remains near the cut end of the insertion arm. Moreover, as the first mating surface can be one of a plurality of equivalent mating surfaces serially formed along the longitudinal length of the proximal bar, the third mating surface of the torque bar can be positioned at an end or a more central portion of the proximal bar as desired for a specific implementation. The reinforcement combination shown in FIG. 20 as a ring and single post mechanism, can readily be modified to form a plurality of posts at incremental distances along the longitudinal length of the proximal bar, to similarly allow for tolerance of cutting length while maintaining choice of a first mating surface near a cut end as well as more centrally in the proximal bar.

Reinforcement combinations shown in FIGS. 23, and 25 to 27 and 29, the torque bar can advantageously be placed in any rotation or tipping to accommodate any angle of abutments. With fibers this is accomplished easily as the fiber can be placed in any rotation or tipping found in the abutment. The ball and socket mechanism shown in FIG. 29 allows the torque bar to fit into the closest socket remaining in the cut and trimmed proximal bar and rotate into any angle presented by rotated or tipped abutment teeth. In the cylinder head and socket mechanism shown in FIG. 28 and the ratchet head mechanism shown in FIG. 30, the torque bar can rotate horizontally (buccal-lingual plane) to accommodate rotated abutments and bent torque bars can be provided in differing angles to be used for tipped abutments.

FIG. 31 shows an example of a reinforcement combination that incorporates a characteristic of complementary mating surfaces directly interacting to form a joint as well as complementary surface features interacting by directing shear forces towards compression of composite resin. FIG. 31 shows a proximal bar 10k with a first mating surface on the insertion arm of the proximal bar and a complementary third mating surface formed at a second longitudinal end of a torque bar 350 reversibly coupled as a pivot joint. The first mating surface is a bore (not shown) formed in the insertion arm with an opening to the bore formed in the coronal surface of the insertion arm. The third mating surface is a cylindrical head 352 at the second longitudinal end of the torque bar with a bolt extending co-axially from the cylindrical head, the bolt (not shown) being received in the bore to form a pivot joint. A first longitudinal end of the elongate torque bar is positioned within the occlusal preparation 354.

Typically, the lateral (bucco-lingual) sides of an occlusal preparation are straight. However, the dentist can be given instructions to cut depressions in to the side of the occlusal preparation and to create a dove tail at the end of the occlusal preparation so that the angles on the lateral surface 356 near the first longitudinal end of the elongate torque bar and the angles on the lateral sides 358 of the occlusal preparation will provide sufficiently complementary surfaces so that when a force of shear or stretch is applied to the assembled parts the angles on the surface near the first longitudinal end of the elongate torque bar 350 and the angles on the sides of the occlusal preparation will direct the shear force (indicated by double-ended arrows inside magnified circle) onto the compressive strength of the composite resin lying between the lateral surface near the first longitudinal end of the elongate torque bar and the sides of the occlusal preparation.

Shear resistance of the lateral surfaces near the first longitudinal end of the elongate torque bar with the sides of the occlusal preparation added to the shear resistance of the first mating surface on the insertion arm of the proximal bar and a complementary third mating surface formed at the second longitudinal end of the torque bar provides an example of combining two different types of shear resistance mechanisms to disrupt or counter longitudinal shear forces, such as shear force 228 shown in FIG. 16. When the second insertion atm (not shown) of the proximal bar 10k includes a second mating surface that forms a pivot joint with a fourth mating surface disposed at a longitudinal end of a second elongate torque bar (equivalent to corresponding first and third mating surfaces between proximal bar 10k and torque bar 350) then the entire structure of proximal bar 10k and first and second elongate torque bar and the occlusal preparations of the abutment teeth will act to prevent longitudinal movement of the parts and the abutment teeth, thus increasing the occlusal force, such as 224 shown in FIG. 16, that can be withstood without causing cracking in composite resin of the bridge.

Figure 39:
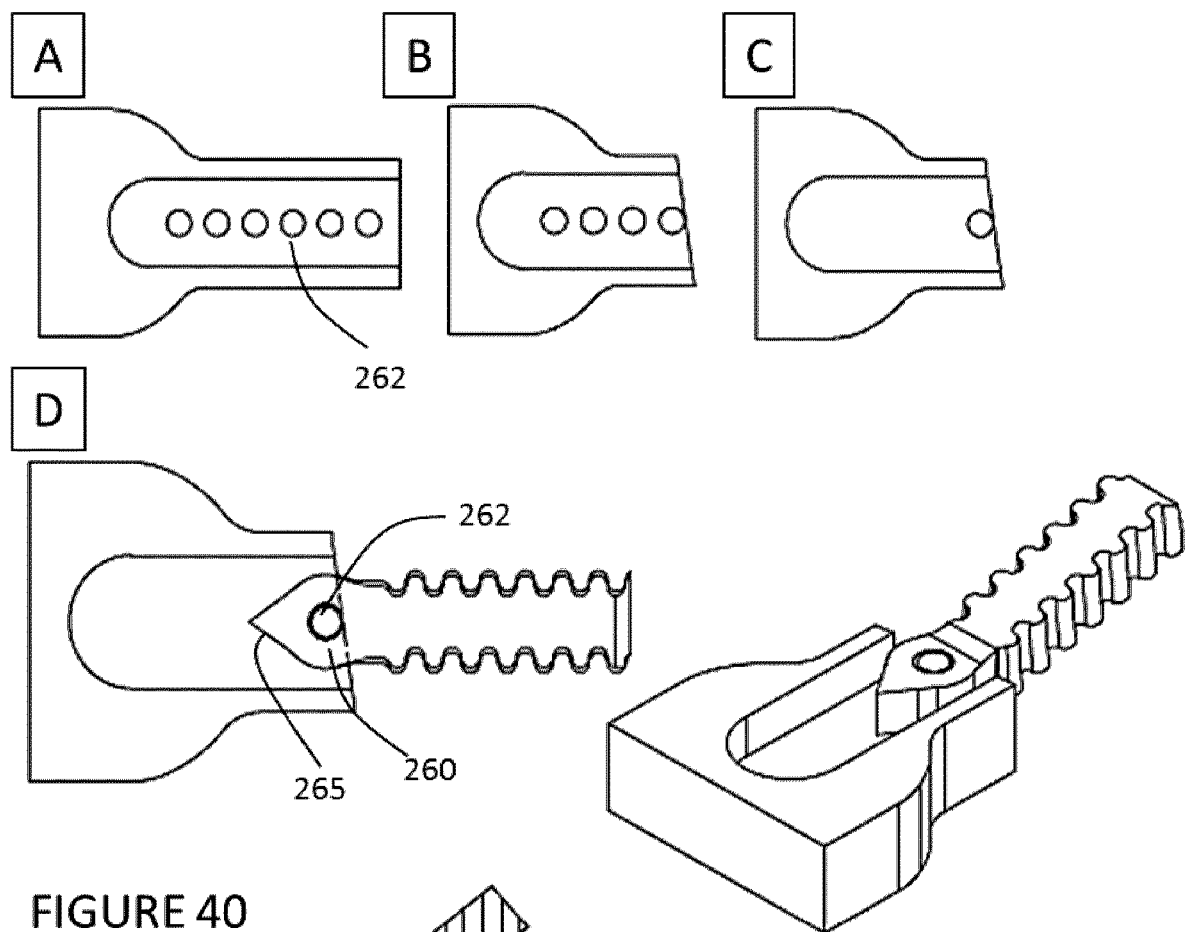
FIG. 39 shows yet another variant proximal bar that forms a ring-and-post pivot joint with a longitudinal end of a torque bar in a sequence (A to D) for adjusting the proximal bar to a suitable size and coupling the torque bar to the proximal bar.

FIG. 39 shows a modified version of proximal bar and torque bars combination shown in FIG. 20 and a sequence of steps (A to D) for adjusting the proximal bar to a suitable size and coupling the torque bar to the proximal bar.

Figure 40:
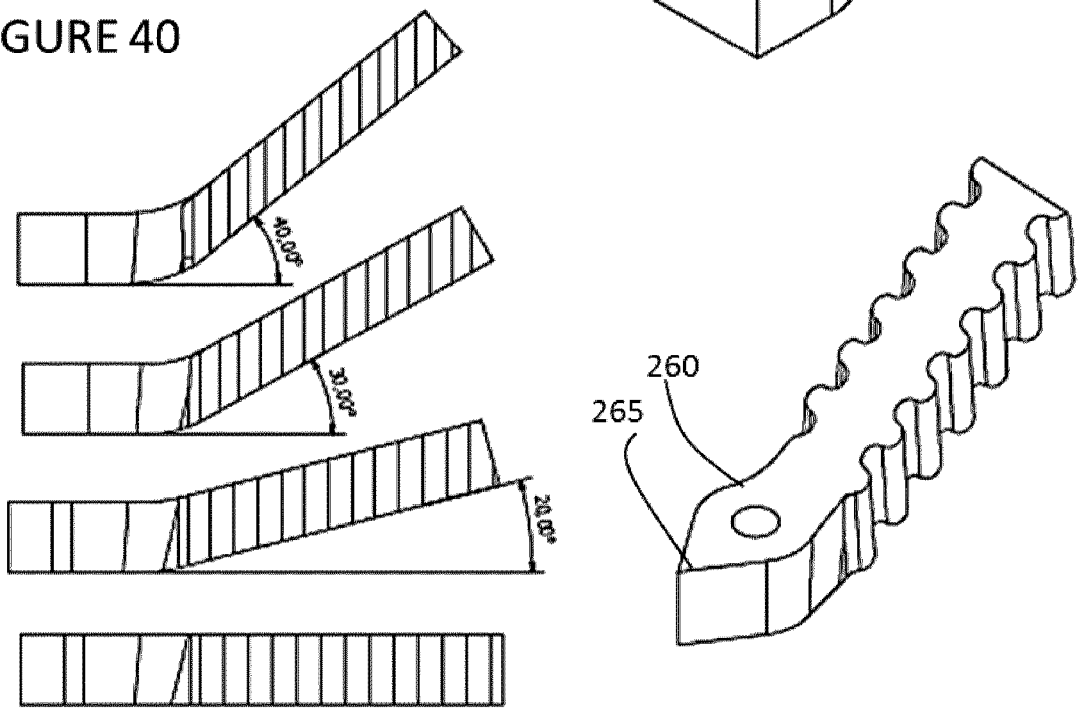
FIG. 40 shows an illustrative series of a plurality of bent torque bars that may be provided in a kit with the variant proximal bar shown in FIG. 39.

The ring head 260 formed on the end of the torque receives the post 262 and supports rotational or angular adjustment in the buccal-lingual plane to accommodate for rotated teeth. Furthermore, as shown in FIG. 40 the torque bar can be made in differing angles where the suitable ring and bar angle can be chosen for differing tip angles of the abutments. A small torque resistance wedge 265 can be placed on the tip of the ring, projecting radially from the ring. When the parts are assembled in composite resin a torque force may be directed around the post 262 but the torque resistance wedge 265 will be engaged into the composite resin preventing the rotation around the ring and thus resist the torque force across the isthmus of the bridge. FIG. 39A shows a single insertion arm (for convenience of illustration a partial longitudinal view of the proximal bar is shown) of a proximal bar as it is supplied in a kit to a dentist. FIG. 39B shows the cut in the insertion arm the dentist would make to fit to the preparations formed in the abutment tooth. Once the cut is made to size the insertion arm is made only a single one of the plurality of posts is needed to form a pivot joint with a torque bar. All remaining posts other than the selected post 262 may be cut away. Typically, the post closest to the free end of the insertion arm is selected, but any other post could be selected as desired. FIG. 39C shows the selected post 262 remaining after all other posts that could be in the way are cut out and removed by the dentist. Of course, removal of all posts may not be needed and posts that are sufficiently spaced from the selected post (for example, a post closest to the central pad) may be retained as desired. FIG. 39D shows the ring head 260 of the torque bar seated on the remaining selected post at the mouth of the cut proximal bar insertion arm.

Figure 41:
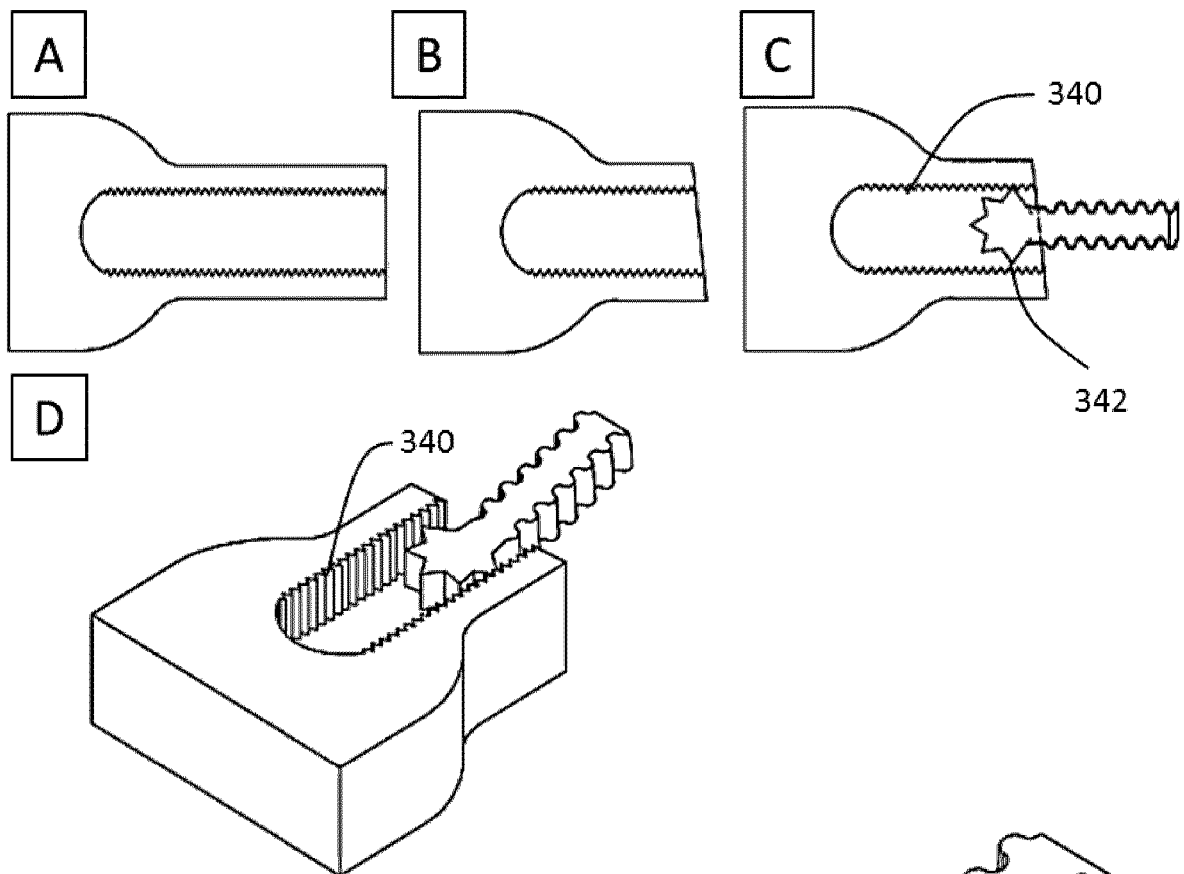
FIG. 41 shows yet another variant proximal bar that forms a multi-position fixed-gear pivot interaction with a longitudinal end of a torque bar in a sequence (A to D) for adjusting the proximal bar to a suitable size and coupling the torque bar to the proximal bar.

FIG. 41 shows a modified version of proximal bar and torque bars combination shown in FIG. 30 and a sequence of steps (A to D) for adjusting the proximal bar to a suitable size and coupling the torque bar to the proximal bar.

Figure 42:
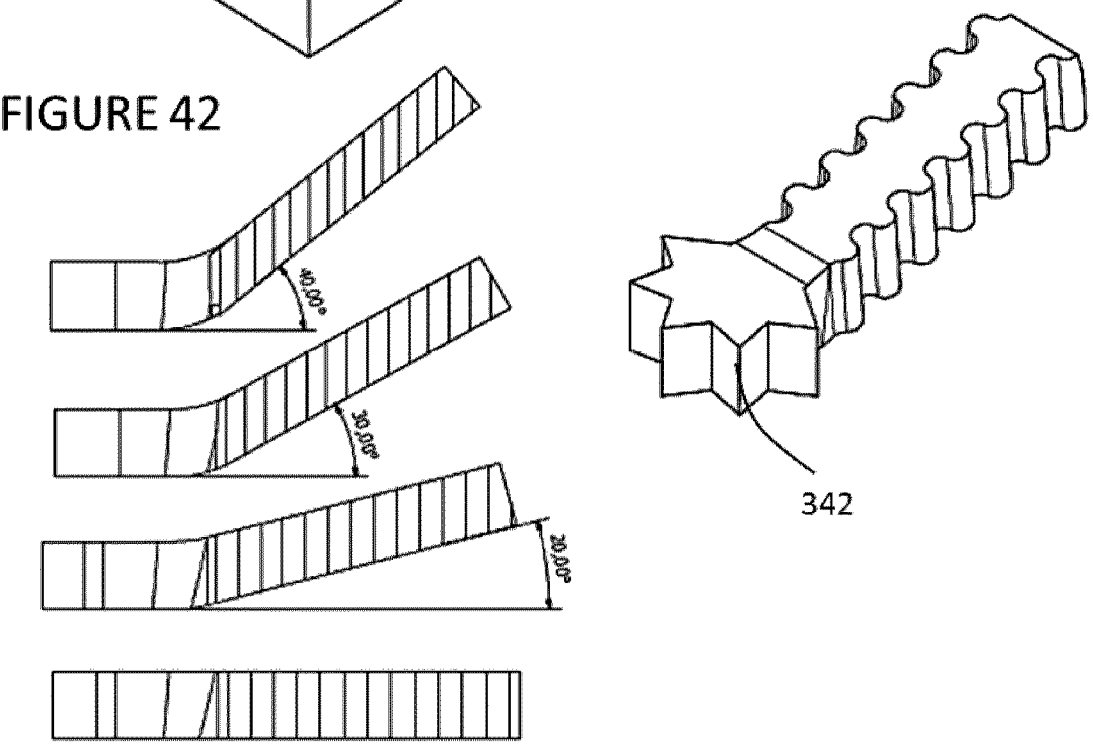
FIG. 42 shows an illustrative series of a plurality of bent torque bars that may be provided in a kit with the variant proximal bar shown in FIG. 41.

A trough is defined by the coronal facing surface of the first insertion arm of the proximal bar (for convenience of illustration only a partial longitudinal view of the proximal bar is shown) and interior surfaces of first and second vertical sidewalls extending from the coronal facing surface of the first insertion arm. A first mating surface is formed as a first corrugated surface pattern of a rack of teeth 340 on at least one of the interior surfaces of the first and second vertical sidewalls and a corresponding mating surface is formed as a corresponding mating surface pattern along a cylindrical head 342 formed at the second longitudinal end of the elongate torque bar, the corresponding surface pattern along the cylindrical head forming teeth for a ratchet interaction with the rack of teeth 340. Furthermore, as shown in FIG. 42 the torque bar can be made in differing angles where the suitable torque bar angle can be chosen for differing tip angles of the abutments.

FIG. 41A shows the insertion arm of a proximal bar as it is supplied to a dentist. FIG. 41B shows the cut in one of the insertion arms the dentist would make to fit to the preparations formed in the abutment tooth. FIGS. 41C and 41D shows the ratchet cylinder torque bar seated at the mouth of the cut proximal bar arm adjusted to a suitable longitudinal overlap and adjusted to a suitable angle and engaged in a fixed-gear interaction with the rack of teeth.

Figure 43:
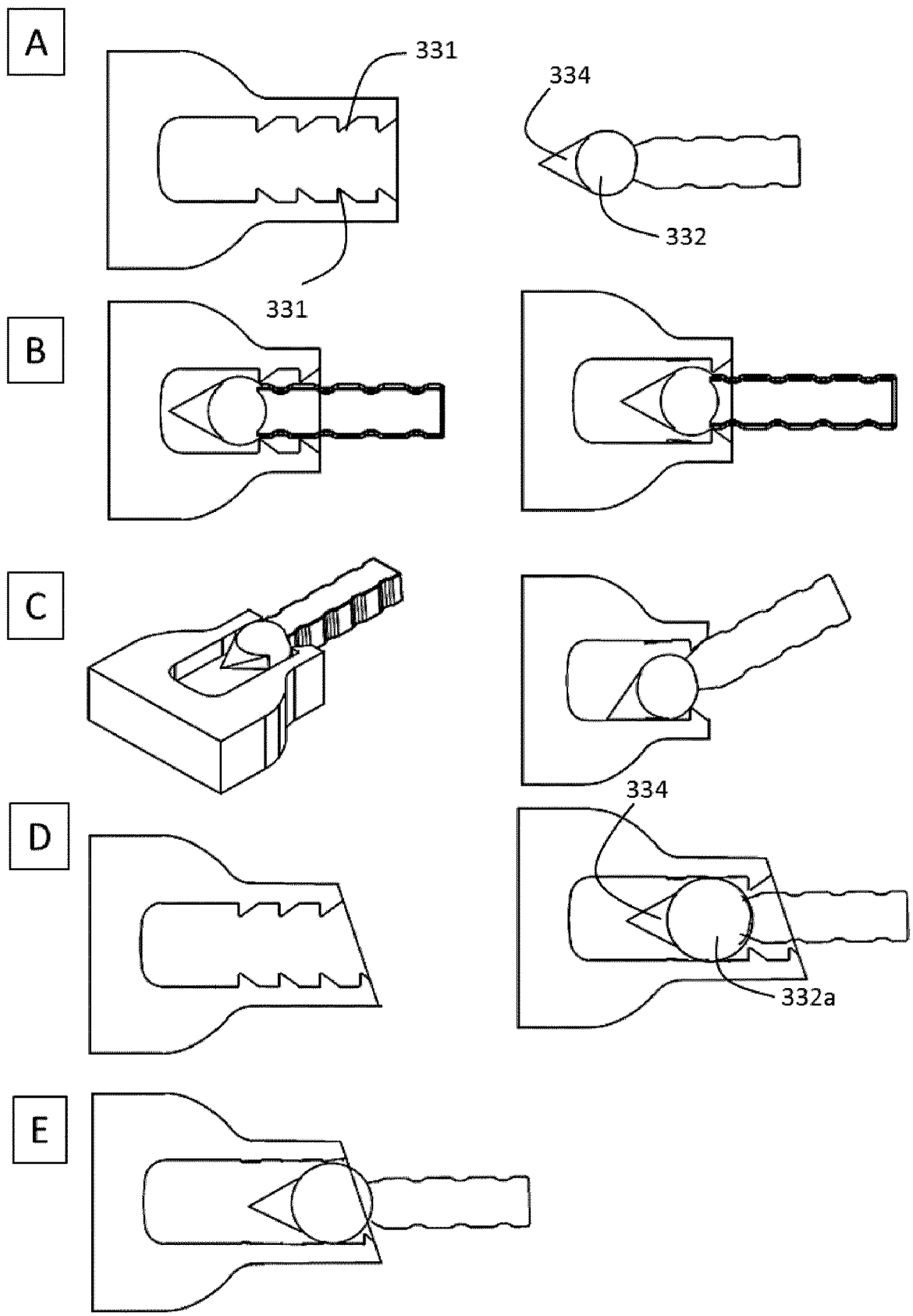
FIG. 43 shows yet another variant proximal bar that forms a ball-and-socket pivot joint with a longitudinal end of a torque bar with the size of the socket being adjustable; two sequences (A to C and D to E) for adjusting the proximal bar to a suitable size and coupling the torque bar to the proximal bar are shown.

FIG. 43 shows yet another variant proximal bar that forms a ball-and-socket pivot joint with a longitudinal end of a torque bar with the size of the socket being adjustable; two sequences (A to C and D to E) for adjusting the proximal bar to a suitable size and coupling the torque bar to the proximal bar are shown.

The series of spherical sockets shown on the proximal bar arm in FIG. 29 can be improved upon to provide a ball and socket mechanism with greater adjustability. Using the proximal bar shown in FIG. 29, when the arm is cut to fit the abutment tooth preparations, the next fully available uncut spherical socket may be so far longitudinally displaced from the cut end of the insertion arm that space 278 shown in FIG. 22 may still exist. For this reason, a modified proximal bar arm is provided where the dentist creates a socket closer to the cut end of the insertion arm after the arm has been cut to size. The function of a full socket is replaced by removable ridges 331 on the inside of the vertical side walls, where these ridges 331 can be removed as needed and the ball head 332 on the torque bar can be inserted within a socket formed by the combination of ridges 331 and vertical sidewalls at the cut end of the insertion arm after it has been cut providing a pivot joint formed with the ball/sphere head 332 of the torque bar close to the mouth of the cut arm.

FIG. 43A shows the insertion arm of a proximal bar and ball/sphere headed torque bar as separate pieces in a kit as supplied to a dentist. FIG. 43B shows a cut insertion arm and the ball torque bar in place as it would be placed if the abutment tooth is not rotated or tipped. FIG. 43C shows the ball torque bar in place at the mouth of the cut insertion arm in cases of a tipped abutment tooth eliminating space 278 of FIG. 22 where the placement is made possible by the dentist cutting away ridges 331 leaving only the ridges closest to the mouth of the cut insertion arm. FIG. 43C also shows how the torque bar can move laterally (compare left and right column) with a range of angular motion limited by the ridge and sidewall structures. FIG. 43D shows a problem where an angular cut of the insertion arm may remove one of a pair of ridges needed to provide a boundary for the socket to form a joint with the torque bar. FIG. 43D (right column) shows how the ball 332*a* may be placed further inside the insertion arm if the arm is cut at an angle and thus again may have a space 278 in FIG. 22. FIG. 43A shows how a larger ball head 332*a* can be used in cases of a missing ridge and only one ridge is needed to form a socket to lock the ball/sphere torque bar.

An impression taker, as shown for example in FIGS. 5 and 6, can be used for capturing an impression of preparations cut in abutment teeth. The impression taker may be configured to capture an impression of any preparation cut in abutment teeth including a proximal preparation, an occlusal preparation or both a proximal preparation and an occlusal preparation. As shown in FIG. 5 the impression taker typically comprises: a rigid body supporting a first longitudinal end and a second longitudinal end; at least a portion of the first longitudinal end configured to form a textured surface feature to promote adherence of moldable material; at least a portion of the second longitudinal end configured to form a textured surface feature to promote adherence of moldable material; and a first reference marker formed on the rigid body. The first reference marker is disposed at a predetermined reference point on the impression taker and is designed to correspond to a second reference marker disposed at a predetermined reference point on a reinforcement bar or a second reference marker on a clamp surface. When corresponding reference points are configured between an impression taker and a reinforcement bar, a physical alignment of the impression taker directly with the reinforcement bar can occur and held together by manual manipulation or by a clamp. When corresponding reference points are configured between an impression taker and a jaw surface of a clamp, a physical alignment of the impression taker with the jaw surface of the clamp occurs before the impression taker is brought into juxtaposition with the reinforcement bar by clamping action. In certain examples, corresponding reference points are configured between the impression taker and the reinforcement bar as well as the impression taker and the jaw surface of the clamp providing possibility for redundancy of alignment of the impression taker with both the reinforcement bar and the clamp.

In one example, the first reference marker could be one or more indicia marked on the rigid body which aligns with a corresponding second reference marker on a reinforcement bar to provide for proper alignment of the impression taker with the reinforcement bar. The first and second reference markers, in their simplest form may be first and second corresponding indicia including for example, graduated markings of lateral and/or longitudinal lines, alphanumeric characters, symbols, or any combination thereof. In another example, the first and second reference markers could be first and second corresponding mating surface features that can engage in a friction fit. In a further example, the first reference marker can be a first connecter part of a reversible connecter, the first connecter part formed on the rigid body, and the second reference marker can be a second connecter part of the reversible connecter, the second connecter part formed on the reinforcement bar. Any combination of reference marker types may be used together—for example, reversible connecter parts could be used in combination with indicia or corresponding mating surface features.

Figure 32:
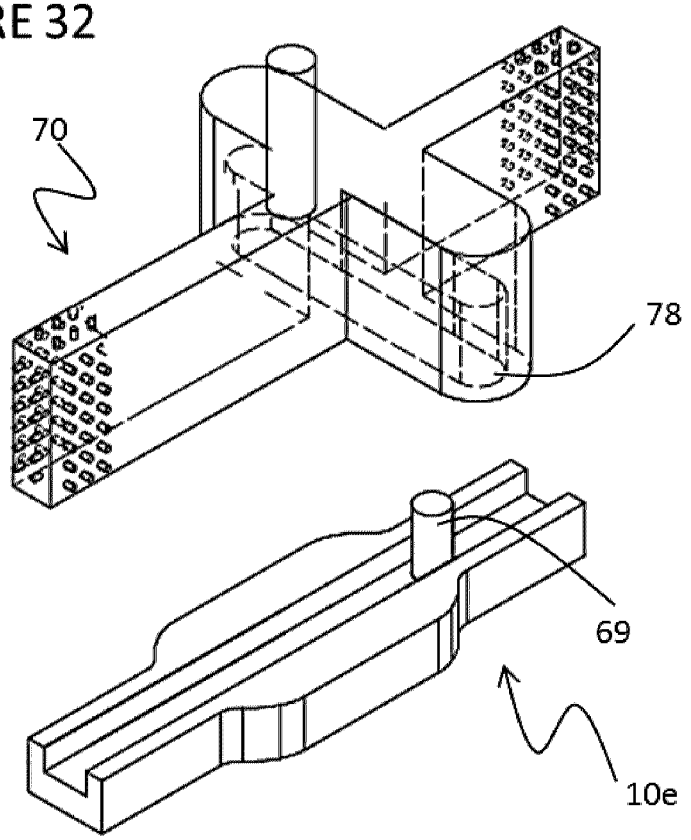
FIG. 32 shows the impression taker bar and proximal bar combination shown in FIG. 5A modified to position a reversible connecter asymmetric and off-center with respect to the longitudinal axis.

The first reference marker may be formed at any convenient location on the impression taker as long as the corresponding second reference marker is located at an equivalent and corresponding position of the reinforcement bar so that alignment of the first and second reference markers achieves alignment of the impression taker with the reinforcement bar or the clamp surface. For example, a first indicia or a first mating surface or a first connecter part of a reversible connecter could be formed within a central portion of the rigid body. The central portion includes the center of the rigid body as well as a larger area symmetrically surrounding the center of the rigid body. When the impression taker is used in combination with a proximal bar, the central portion of the rigid body or any form of the rigid body such as the elongate bar of the impression taker can be considered as equivalent to the corresponding area covered by the central planar pad. The central portion of the rigid body of the impression taker may consist of up to 70% of the longitudinal length of the rigid body approximately symmetrically positioned with respect to the center of the rigid body. The first reference marker need not be located at the center or even symmetrically positioned with respect to the center of the rigid body. The first reference marker may be located asymmetrically off-center with the second reference marker correspondingly located asymmetrically off-center in the reinforcement bar so that alignment can occur. For example, FIG. 32 shows the impression taker bar and proximal bar combination shown in FIG. 5A modified to locate the first connecter part (slot 78) asymmetrically off-center and to correspondingly locate the second connecter part (post 69) asymmetrically off-center so as to achieve proper alignment of the impression taker bar and the proximal bar when the first and second connecter parts are reversibly coupled.

The first reference marker may be placed on any of the lateral surfaces of the impression taker—ie., any one of coronal, apical, buccal or lingual surfaces or any combination thereof—and still function as an effective mechanism for alignment provided that the second reference marker is appropriately positioned on the reinforcement bar. For example, when a juxtaposition of the apical surface of the impression taker and the coronal surface of the reinforcement bar is desired then indicia reference markers placed on the buccal and/or lingual surfaces may be effective for alignment, whereas when a juxtaposition of the buccal surface of the impression taker and the lingual surface of the reinforcement bar is desired then indicia reference markers placed on the apical and/or coronal surfaces may be effective for alignment. Just as location of reference markers can accommodate variation, juxtaposition of surfaces can also be subject to variation with juxtaposition of coronal surface of the impression taker facing the apical surface of the reinforcement bar, or apical surface of the impression taker facing the coronal surface of the reinforcement bar, or lingual surface of the impression taker facing the buccal surface of the reinforcement bar, or the buccal surface of the impression taker facing the lingual surface of the reinforcement bar, all providing possible options for alignment depending on use of a suitable type of reference marker and appropriate positioning of the reference marker.

Most examples of the impression taker comprise first and second longitudinal impression ends that are configured to hold moldable material such as any conventional dental impression material, a rigid body to orient the impression ends in a fixed spatial alignment, and a reference marker disposed on the rigid body at a predetermined reference point, the reference marker configured to interact with a reinforcement bar surface or a clamp surface.

The impression ends can have any physical structure or properties which assist in holding the molded impression material. A potential embodiment of the impression ends is where they hold a heat able impression material which is heated usually in hot water and then the impression ends are inserted into the proximal preparations where the heated impression material cools to set firm and then can be removed.

The impression taker comprises a rigid body which can have any physical form as long as it serves to hold the impression ends fixed and rigid in the spatial arrangement being carried to the reinforcement bar. An elongate bar is an illustrative example of a rigid body; however any physical structure in shape or form can be used in place of the elongate bar. FIGS. 8 to 13 show a few potential variations of the rigid body. Often the spatial alignment of the impression ends will be linear or straight or co-axial; however, angular or curvilinear spatial alignment may be desired depending on the set of abutment teeth available for a bridge installation, for example when replacing a canine tooth. When the impression ends are not co-axial and angular alignment is desired typically the angular orientation of the impression ends will be less than 90 degrees. For example, angular orientation of axes defined by first and second impression material holding ends will be less than 80 degrees, less than 70 degrees, less than 60 degrees, less than 50 degrees, less than 40 degrees, less than 30 degrees, less than 20 degrees, less than 10 degrees or less than any angle therebetween. For example, angular deviation of first and second impression ends from co-axial alignment will often be less than 60 degrees. In a further example, angular deviation of first and second impression ends from co-axial alignment will often be less than 30 degrees.

The reference marker may be any marking reference indicia or mating surface feature or reversible connecter or can be any suitable arrangement that facilitates mating alignment of the impression taker with a reinforcement bar surface or a clamp surface. For example, corresponding reference points with the proximal bar where the marking reference feature sets the impression taker to the reinforcement bar to be cut where both can then be clamped. Alternatively, mating surface features can allow the impression taker to be held in a relatively fixed arrangement with the reinforcement bar without a clamp while the reinforcement bar is being cut to fit the spatial arrangement being carried by the impression taker.

Moldable materials deposited to and adhering to longitudinal ends of the impression taker include any suitable dental impression material. Dental impression materials that may be used with the impression taker include, but are not limited to, impression materials of the following classes; silicone, poly vinyl, poly siloxane, poly sulfide rubber, and poly ether rubber. Any consistency of light, medium or heavy body of the above materials are useable. In other examples, dental impression materials include thermos-impression materials. Usable thermos-impression materials deform at higher temperatures tolerated by human tissues and set firm at lower temperatures. Thermo-impression material has an accepted use in the dental industry, for example as whitening trays—a tray made of thermos impression material is heat up to a suitable deforming temperature and then bit into to make an impression for a bleaching tray.

Figure 33:
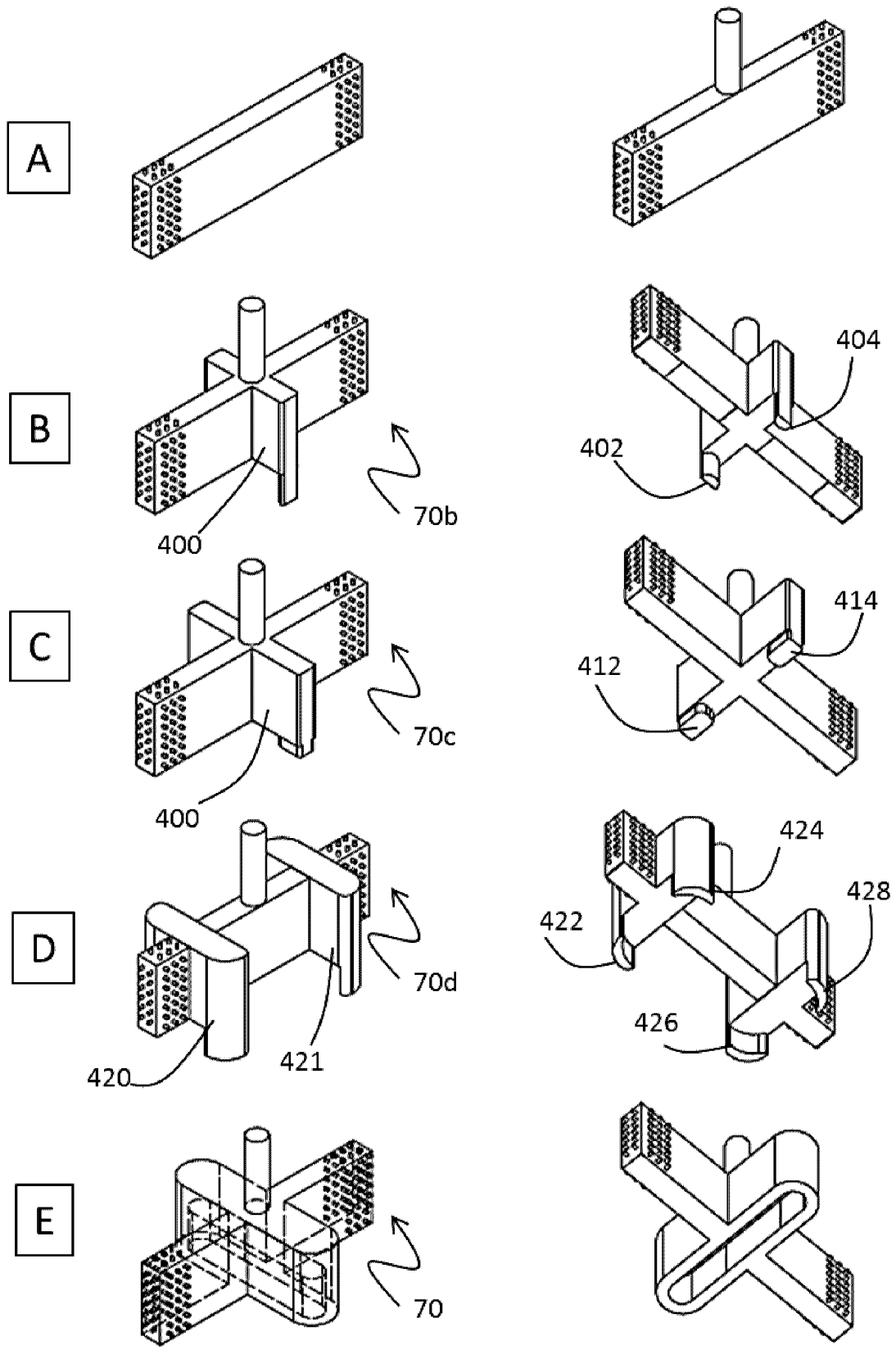
FIG. 33 shows a comparison of reversible connecter parts for an impression taker bar with (A) devoid of a reversible connecter, (B) a pair of longitudinal center positioned semi-cylinders, (C) a pair of longitudinal center positioned rectangular columns, (D) a quartet of bracket corners with facing concave surfaces positioned off-center on the longitudinal axis but symmetric with the center, and (E) slot as shown in FIG. 5.

FIG. 33 shows various examples of first connecter parts formed of varying shapes and at various locations along the length of the elongate bar. First connecter parts are intended to directly contact and physically interact with a corresponding second connecter part on a reinforcement bar to for a reversible connection. The first and second connecter parts may be designed as components of any conventional reversible coupling mechanism including, for example, clamp, clip, brackets, bolt-bore, bolt-slot configurations. Furthermore, first and second connecters may be designed to incorporate combinations of reversible coupling mechanisms—for example, a clip mechanism and a bot-bore mechanism could be used together. Often the first and second connecter parts may be designed as corresponding male and female connecter parts. Either the first or second connecter part could form the female connecter part as desired. A female connecter part typically defines an aperture or lumen or open volume of space that is sized to receive a corresponding male connecter part. Typically, the male connecter is sized to approximate at least one dimension of the aperture or open volume of space. FIG. 33 shows a variety of male or female connecter types. FIG. 33A which shows examples that are devoid of first connecter parts and FIG. 33E which shows the impression taker bar shown in FIG. 5, are included as comparative examples to elucidate the first connecter part variations shown in FIG. 33(B-D).

Figure 34:
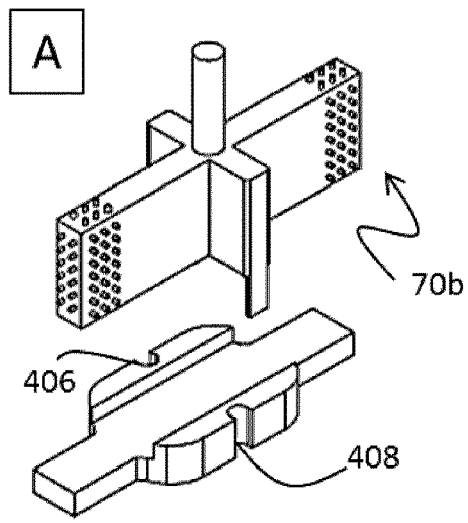
FIG. 34 shows (A) variant impression taker bar shown in FIG. 33B in combination with a corresponding proximal bar, (B) another variant impression taker bar shown in FIG. 33C in combination with a corresponding proximal bar, and (C) yet another variant impression taker bar in combination with a corresponding proximal bar.
Figure 34:
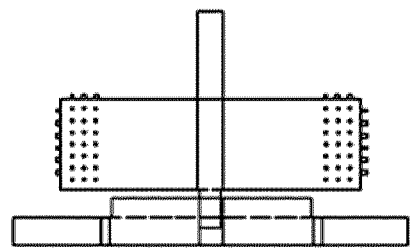
Figure 34:
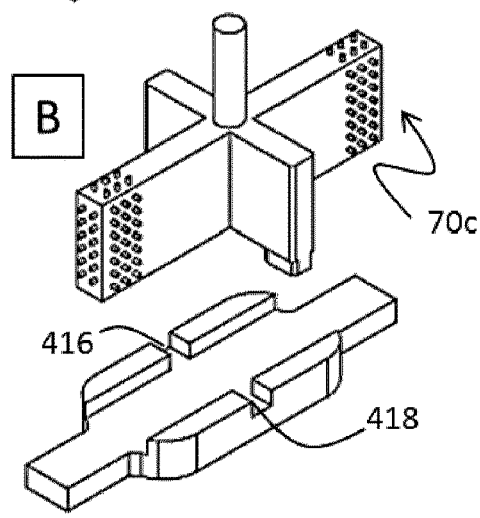
Figure 34:
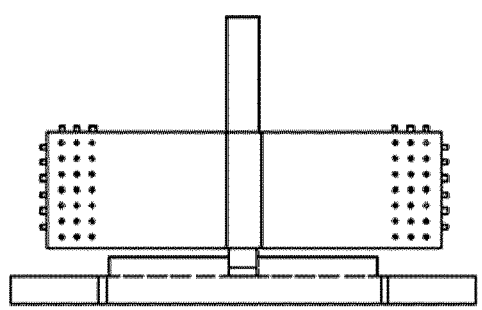
Figure 34:
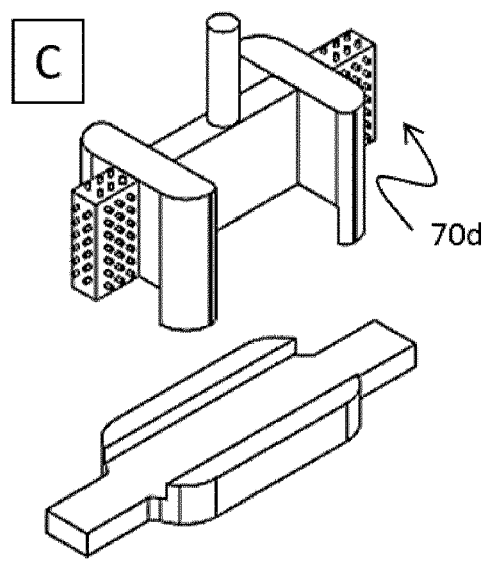
Figure 34:
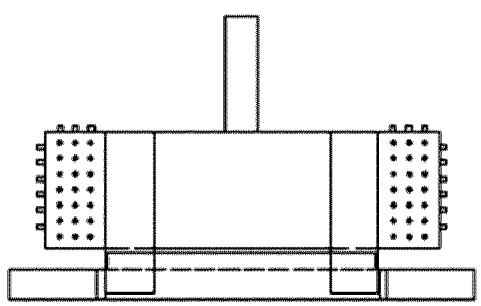

FIG. 33B shows an impression taker bar 70b comprising an elongate bar and a lateral bar 400 symmetrically formed at the center of the elongate bar and extending perpendicularly and symmetrically from opposing lateral surfaces of the elongate bar. First and second semi-cylindrical posts, 402 and 404, extend in an apical direction from an apical surface of the lateral bar 400. The first connecter part includes first and second semi-cylindrical posts, 402 and 404, as male connecter parts which can engage corresponding female connecter parts of first and second cavities, 406 and 408, formed at the center of the proximal bar on the opposing buccal and lingual lateral sides of the central planar pad as shown in FIG. 34A. FIG. 33B and FIG. 34A provide an example of the first connecter comprising a post and the second connecter comprising a cavity shaped to receive the post and reversibly couple to the post, typically with a friction fit.

FIG. 33C shows an impression taker bar 70c comprising an elongate bar and a lateral bar 400 symmetrically formed at the center of the elongate bar and extending perpendicularly and symmetrically from opposing lateral surfaces of the elongate bar. First and second rectangular column posts, 412 and 414, extend in an apical direction from an apical surface of the lateral bar 400. The first connecter part includes first and second rectangular column posts, 412 and 414, as male connecter parts which can engage corresponding female connecter parts of first and second open slots, 416 and 418, formed at the center of the proximal bar in the vertical sidewalls opposing buccal and lingual lateral sides of the central planar pad as shown in FIG. 34B. FIG. 33C and FIG. 34B provide an example of the first connecter comprising a post and the second connecter comprising an open slot shaped to receive the post with a friction fit.

FIG. 33D shows an impression taker bar 70d comprising an elongate bar and first and second lateral bars, 420 and 421, formed at opposing ends of the central portion of the elongate bar and positioned symmetrically or equidistant from the center of the elongate bar, each lateral bar extending perpendicularly and symmetrically from opposing lateral surfaces of the elongate bar. First and second lateral bars, 420 and 421, form brackets to define a female connecter to receive and engage the periphery of a central planar pad to form a friction fit with a central planar pad of a proximal bar. First and second bracket corners, 422 and 424, extend in an apical direction from an apical surface of the first lateral bar 420, while third and fourth bracket corners, 426 and 428, extend in an apical direction from an apical surface of the second lateral bar 421. The first connecter part includes first, second, third and fourth bracket corners, 422, 424, 426 and 428, as a female connecter part which can engage a corresponding male connecter part of the periphery of the central planar pad of the proximal bar as shown in FIG. 34C. FIG. 33D and FIG. 34C provide an example of the first connecter comprising a plurality of brackets configured to receive and frictional engage the second connecter comprising the perimeter of the central planar pad.

Examples shown in FIG. 33(B-D) involve multiple points of contact between first and second connecters that support a fixed alignment one connecter parts are coupled, and do not support further rotational or translational motion in the coupled state, Examples shown in FIG. 5 and FIG. 33E provide a post and slot coupling mechanism that support rotational and/or translational motion when the impression taker bar and the proximal bar are in a coupled state. The example shown in FIG. 33E could readily be modified to support only rotation or only translation as desired. For example, replacing a slot with a bore shaped to have an internal diameter the approximates the diameter of a cylindrical post allows the bore to pivotally engage the post and reversibly couple to the post and support only rotational motion in a coupled state. As another example, replacing a cylindrical post with a rectangular cubic post and shaping the rectangular cubic post to have a thickness equivalent to the lateral spacing of the slot allows the rectangular cubic post to be received in the slot and reversibly couple to the slot and support only translational motion in a coupled state. As such, reversible coupling of the first connecter part and the second connecter part can, as desired, immovably fix the impression taker bar and the reinforcement bar together. In other examples, the reversible coupling of the first connecter part and the second connecter part can support rotation motion, translation motion or both rotation and translation motion, between the impression taker bar and the reinforcement bar.

Once an impression taker bar is aligned with a reinforcement bar a clamp could be used to hold the impression taker bar and the reinforcement bar in fixed relation. A clamp may be particularly useful when using indicia as first and second reference markers. However, even when using corresponding first and second reversible connecter parts as shown in FIG. 5 that support physical engagement of the impression taker bar and reinforcement bar, a clamp could be used to maintain the impression taker bar and the reinforcement bar in affixed relation once manipulation of rotational and/or translational motion supported by the reversible connecter achieves an optimized alignment.

The impression taker bar may be used in combination with any type of reinforcement bar as desired, including for example, a proximal bar, a torque bar, or an occlusal bar. For example, the reinforcement bar may be a proximal bar comprising a central planar pad, first and second insertion arms extending from opposing ends of the central planar pad and the second connecter part of the reversible connecter formed on the central planar pad. In another example, first and second reference markers In further examples, the impression taker bar may even be adapted to cut dental fibers.

The impression taker bar may comprise a handle formed on the elongate bar. The handle can be formed of any convenient shape and at any convenient location on the elongate bar. For example, the handle may be formed at a central portion of a coronal surface of the elongate bar. In another example, the handle could easily be formed near an end of the elongate bar. In other examples, a handle could be avoided altogether, particularly where a tool is designed to hold a surface of the impression taker bar.

The impression taker bar can comprise barriers that extend radially near the longitudinal ends of the impression taker bar. For example, in an impression taker bar comprising an elongate bar having first and second longitudinal ends configured to hold moldable material for taking dental impressions, a first barrier extends radially from the elongate bar near the first longitudinal end and a second barrier extends radially from the elongate bar near the second longitudinal end. The first barrier and second barrier can independently take any desired shape that functions to resist moldable material exuding from a preparation cut in an abutment tooth. In certain examples, the barriers are shaped as a plate, a bowl, one or more rods, one or more vanes, and the like.

Figure 35:
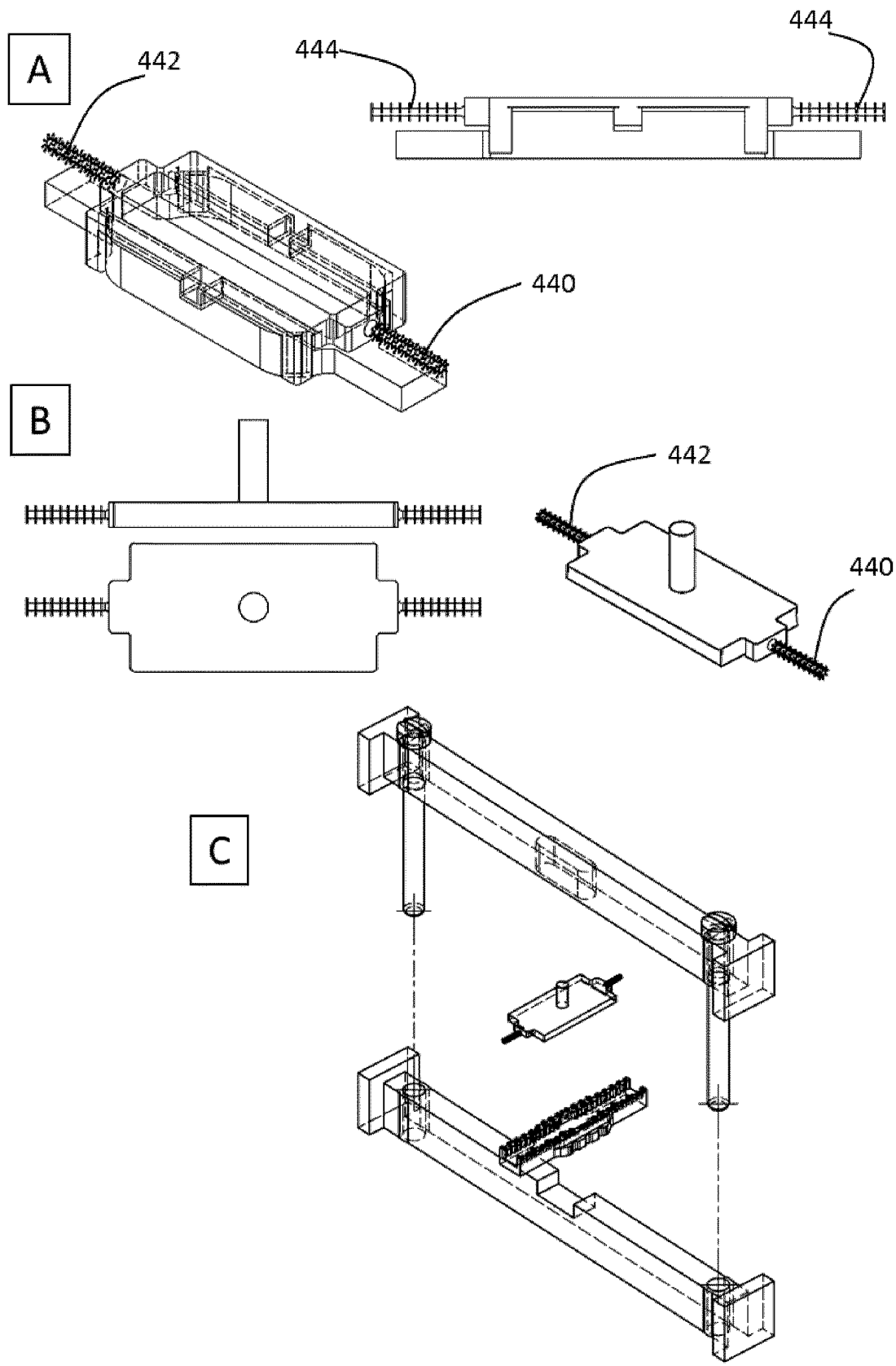
FIG. 35 shows yet another variant of an impression taker bar in combination with a corresponding proximal bar, (B) the impression taker bar shown in FIG. 35A modified to remove a reversible connecter for engaging a proximal bar and to add a reversible connecter to engage a clamp, and (C) an exploded view of a clamp assembly holding the impression taker bar shown in FIG. 35B in alignment with a proximal bar.
Figure 36:
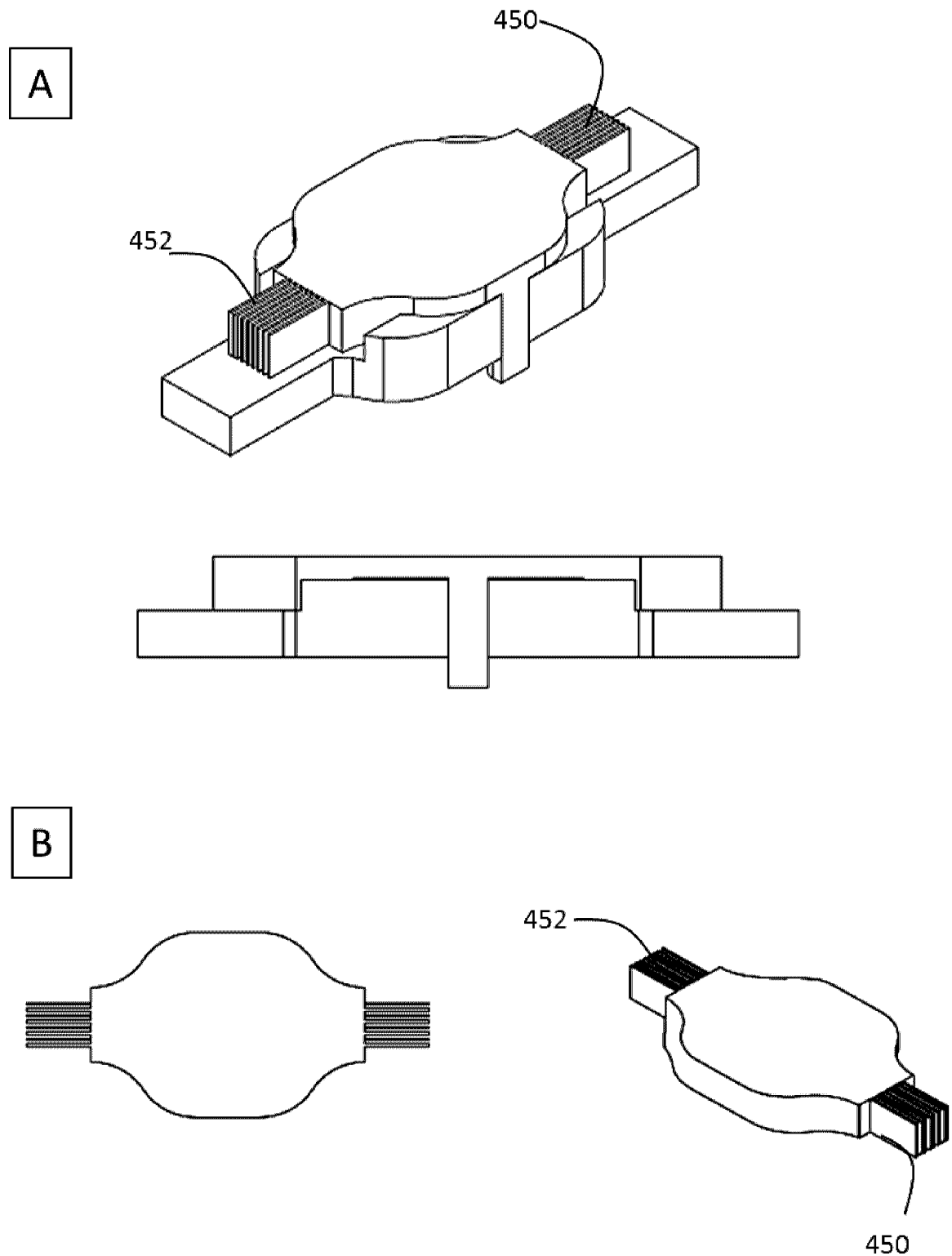
FIG. 36 shows (A) yet another variant of an impression taker bar in combination with a corresponding proximal bar, (B) the impression taker bar shown in FIG. 36A modified to remove a reversible connecter for engaging a proximal bar.

The surface features at longitudinal ends of the elongate bar of the impression taker bar may take any convenient shape to provide a tactile or textured surface useful for promoting adherence of dental moldable material at or near the longitudinal ends. Illustrative examples, of the textured surface feature may include protruding or receding features such as, nibs, pegs, ribs, ridges, spikes, blades, vanes, fins, protrusions, bolts, filaments, dimples, cavities, bores, slots, gratings, serrations, corrugations, and cross-hatches. FIG. 35 shows a further variation of a surface feature at a longitudinal end compared to examples illustrated in FIG. 33. FIG. 35 shows a first bolt 442 extending axially from a first longitudinal end of an elongate bar of the impression taker and second bolt 440 extending axially from a second longitudinal end of the elongate bar of the impression taker. A plurality of flanges 444 extend circumferentially from first and second bolts, 440 and 442. The plurality of flanges are incrementally spaced at regular intervals along the axial length of the bolts providing the appearance of a threaded bolt. Yet another example of a textured surface feature is shown in FIG. 36 with a first set of parallel and co-extensive fins 450 extending axially from a first longitudinal end of an elongate bar of an impression taker and a second set of parallel and co-extensive fins 452 extending axially from a second longitudinal end of the impression taker. FIG. 35A and FIG. 36 also provide examples of impression taker bars without handles that can be effectively used to capture an impression and placed in alignment with a reinforcement bar in a cutting step. Impression taker bars without handles may be designed to be readily gripped or reversibly coupled to a conventional dental tool. Alternatively, a corresponding dental tool for gripping or coupling to impression taker bar without handles may be provided, for example in a kit that includes an assortment of different sized impression taker bars.

FIG. 35B shows a modification of the impression taker bar shown in FIG. 35A, the modification involving addition of a post handle extending from the coronal surface and removal of reversible connecter parts extending from the apical surface. FIG. 35C shows a clamp assembly configured to hold the impression taker bar shown in FIG. 35B in alignment with a proximal bar to facilitate a step of cutting insertion arms of the proximal bar. The clamp comprises first and second jaw arms, the first jaw arm forming a first planar jaw surface and the second jaw arm forming a second planar jaw surface, the first and second planar jaw surfaces oriented in facing opposition and abutting each other in a closed position and being displaced from each other in an open position. Jaw arms are a type of paired clamp arms, and therefore first and second jaw arms can be more generally substituted by first and second clamp arms, with first and second jaw surfaces more generally corresponding to first and second clamp surfaces disposed on first and second clamp arms, respectively. First and second jaw arms further comprise corresponding first and second bores formed at opposing longitudinal ends of each jaw arm, the first and second bores sized to respectively receive first and second bolts as reversible fasteners. Optionally, bores and bolts may be correspondingly threaded for reversible threaded mating engagement. The first planar jaw surface defines a slot for receiving and engaging the post handle of the impression taker, coupling of the slot to the post handle optionally permitting rotational and/or translational motion of the impression taker bar relative to the first planar jaw surface. The second planar jaw surface defines a trough for interference snap fit with the proximal bar. The trough and slot are formed at predetermined corresponding positions within the first and second planar jaw surfaces so that when the planar jaw surfaces are manually manipulated to be in facing and abutting opposition the impression taker is aligned with the proximal bar, with optional fine level adjustment by rotation and/or translation of the impression taker supported by the slot and post coupling of the impression taker to the first planar jaw surface. Slot and trough features formed in the first and second planar jaw surfaces are merely illustrative, and may be replaced with any convenient surface feature or reversible connecter mechanism for supporting reversible engagement of the impression taker or a reinforcement bar.

Slot and post coupling of the impression taker to the clamp is an illustrative example; many other types of reversible connecters may be used to achieve a coupling including all types of reversible connecters described herein for reversible connection of the impression taker to the proximal bar. Furthermore, reference markers such as visible indicia, mating surfaces, reversible connectors or combinations thereof may be used to align and/or engage an impression taker or a reinforcement bar with a clamp surface. Furthermore, when the impression taker and the reinforcement bar are coupled through interaction of corresponding reference markers a conventional clamp without dedicated reference markers (for example, a needle nose plier) may be used to help secure the impression taker and reinforcement bar coupling.

Reinforcement bars, such as proximal bars and torque bars, as well as fibers, clamps and impression takers described herein may be used in any desired combination to produce a direct dental bridge. Methods to produce direct dental bridges comprise steps of positioning a proximal bar to span from a mesial proximal preparation to a distal proximal preparation and positioning at least one torque bar in an occlusal preparation and covering the proximal bar and torque bar with a restorative material. The step of positioning at least one torque bar can include a first torque bar contacting a mesial occlusal preparation but not contacting a distal occlusal preparation, and a second torque bar contacting a distal occlusal preparation, but not contacting a mesial occlusal preparation. A further step can include for example cutting a proximal bar and cutting at least one torque bar to be suitably sized for a proximal and occlusal preparations, respectively. A further step can include selecting a suitable proximal bar from a plurality of different sized and/or shaped proximal bars. A further step can include selecting a suitable torque bar from a plurality of different sized and/or shaped torque bars. A further step can include selecting a suitable impression taker from a plurality of different sized and/or shaped impression taker and registering an impression of a preparation of at least one abutment tooth. A further step can include securing an impression taker and a reinforcement bar with a clamp. A further step can include curing and shaping of restorative material.

Directional terms such as vertical, horizontal, coronal, occlusal, apical, gingival, buccal, lingual, mesial, and distal are intended in the context of a reinforcement bar as placed in a direct bridge in a mouth, but use of these directional terms does not require that reinforcement bar be installed in a mouth and can describe structural features of a reinforcement bar while outside the mouth.

Embodiments described herein are intended for illustrative purposes without any intended loss of generality. Still further variants, modifications and combinations thereof are contemplated and will be recognized by the person of skill in the art. Accordingly, the foregoing detailed description is not intended to limit scope, applicability, or configuration of claimed subject matter.

What is claimed is:

1. An impression taker for capturing an impression of proximal preparations cut in abutment teeth, the impression taker comprising;
   a rigid body supporting a first arm and a second arm, the first arm having a first longitudinal end configured to take an impression of a proximal preparation cut in a first abutment tooth;
   the second arm having a second longitudinal end configured to take an impression of a proximal preparation cut in a second abutment tooth, the rigid body spanning a space separating the proximal preparations cut in the first and second abutment teeth; wherein the impression taker further comprises a reference marker located on the rigid body to align the impression taker with a corresponding reference marker located on a reinforcement bar or a clamp, wherein the reference marker on the rigid body is a first reversible connector part which reversibly connects to a corresponding second reversible connector part, the corresponding second reversible connector part located on the reinforcement bar to hold the reinforcement bar in alignment with the impression taker or the corresponding second reversible connector part located on the clamp to hold the clamp in alignment with the impression taker.

2. The impression taker of claim 1, wherein reversible coupling of the first reversible connecter part and the corresponding second reversible connecter part supports at least one of rotational or translational motion between the impression taker and the reinforcement bar or between the impression taker and the clamp.

3. A method of preparing a reinforcement bar, comprising:
   providing an impression taker for capturing an impression of proximal preparations cut in abutment teeth, the impression taker comprising:
   an elongate bar having a first longitudinal end and a second longitudinal end;
   a portion of the elongate bar at the first longitudinal end configured to form a textured surface feature to promote adherence of moldable material;
   a portion of the elongate bar at the second longitudinal end configured to form a textured surface feature to promote adherence of moldable material;
   wherein providing the impression taker comprises providing the impression taker with moldable material held at both the first longitudinal end and the second longitudinal end and that has been cured in place in the proximal preparations of the abutment teeth and set in a shape of said proximal preparations of the abutment teeth;
   providing a reinforcement bar for spanning the proximal preparations of the abutment teeth;
   aligning a longitudinal middle of the reinforcement bar with a
   longitudinal middle of the impression taker in order to transfer
   a spatial orientation of the proximal preparations of the abutment teeth to the reinforcement bar so that the reinforcement bar sits in a middle of a distance between the proximal preparations of the abutment teeth;
   securing in place the impression taker with the reinforcement bar; and
   cutting ends of the reinforcement bar to the spatial orientation of the cured moldable material shaped on the first and second longitudinal ends of the impression taker.

4. The method of claim 3, wherein aligning, securing, or both aligning and securing comprises holding the impression taker and the reinforcement bar with a clamp.

5. The method of claim 3, wherein aligning and securing comprises holding the impression taker and the reinforcement bar on opposing clamp surfaces configured to engage and hold the reinforcement bar and the impression taker, and moving the opposing clamp surfaces to a closed position resulting in alignment of the reinforcement bar with the impression taker.

6. The method of claim 3 further comprising a first connecter part of a reversible connecter, the first connecter part formed on the elongate bar,
   wherein securing the impression taker with the reinforcement bar comprises reversibly coupling the impression taker to the reinforcement bar.

7. The method of claim 6, further comprising a second connecter part of the reversible connecter formed on the reinforcement bar, wherein reversible coupling of the first connecter part and the second connecter part supports rotation motion and/or translation motion between the impression taker and the reinforcement bar, wherein the reinforcement bar is a proximal bar, the proximal bar comprising a central planar pad, first and second insertion arms extending from opposing ends of the central planar pad and the second connecter part of the reversible connecter is formed on the central planar pad.

* * * * *